United States Patent
Oh et al.

(10) Patent No.: US 9,307,129 B2
(45) Date of Patent: Apr. 5, 2016

(54) TERMINAL CASE, MOBILE TERMINAL, AND MOBILE TERMINAL ASSEMBLY INCLUDING THE TERMINAL CASE AND THE MOBILE TERMINAL

(71) Applicant: LG Electronics Inc., Seoul (KR)

(72) Inventors: Jungin Oh, Seoul (KR); Sanghyun Eim, Seoul (KR); Daiki Min, Seoul (KR); Julie Park, Seoul (KR); Myungsoo Choi, Seoul (KR); Jisun Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/271,085

(22) Filed: May 6, 2014

(65) Prior Publication Data
US 2014/0333831 A1 Nov. 13, 2014

(30) Foreign Application Priority Data

May 7, 2013 (KR) .................. 10-2013-0051523
Jun. 5, 2013 (KR) .................. 10-2013-0064710

(51) Int. Cl.
*H04N 5/225* (2006.01)
*H04M 1/00* (2006.01)
*G06F 1/16* (2006.01)
*H04M 1/02* (2006.01)
(Continued)

(52) U.S. Cl.
CPC ............... *H04N 5/2254* (2013.01); *G06F 1/16* (2013.01); *H04M 1/0245* (2013.01); *H04M 1/185* (2013.01); *H04M 1/67* (2013.01); *H04M 2250/52* (2013.01)

(58) Field of Classification Search
CPC ..... G06F 1/1637; G06F 3/041; G06F 3/0202; G06F 3/03547; G06F 2203/04809; G06F 3/044; G06F 2203/04103; G06F 1/1643; G02B 27/027; G02B 27/025; H04M 1/22; H05K 3/067
See application file for complete search history.

(56) References Cited

U.S. PATENT DOCUMENTS 8,143,982 B1 * 3/2012 Lauder et al. .................. 335/219
2014/0128131 A1 * 5/2014 Sin ........................ H04M 1/185
455/575.8

(Continued)

FOREIGN PATENT DOCUMENTS

KR   10-2006-0106527 A   10/2006
KR   10-2007-0002523 A    1/2007
KR      10-0924464 B1     3/2009

(Continued)

OTHER PUBLICATIONS

Samsung Galaxy S4 S View Cover product information.

*Primary Examiner* — Sinh Tran
*Assistant Examiner* — Selam Gebriel
(74) *Attorney, Agent, or Firm* — Dentons US LLP

(57) ABSTRACT

A mobile terminal assembly is provided. The mobile terminal assembly includes: a terminal case; and a mobile terminal detachable from the terminal case, wherein the terminal case comprises: a case body; and a lens cover openably disposed in the case body, wherein the mobile terminal comprises: a display unit; a camera module including a camera lens disposed at a position corresponding to the lens cover; a lens cover sensing unit sensing whether the lens cover is opened or closed; and a control unit configured to execute a camera application on the basis of whether the lens cover is opened or closed.

15 Claims, 43 Drawing Sheets

(51) Int. Cl.
*H04M 1/67* (2006.01)
*H04M 1/18* (2006.01)

(56) References Cited

U.S. PATENT DOCUMENTS

2014/0198070 A1* 7/2014 Won .............................. 345/173
2015/0105128 A1* 4/2015 Huang et al. ............... 455/575.8

FOREIGN PATENT DOCUMENTS

| KR | 10-0970982 B1 | 12/2009 |
| KR | 20120005719 U | 8/2012 |
| KR | 20130018393 A | 2/2013 |
| KR | 20130036274 A | 4/2013 |
| WO | 2012030509 A1 | 3/2012 |

* cited by examiner

FIG. 27
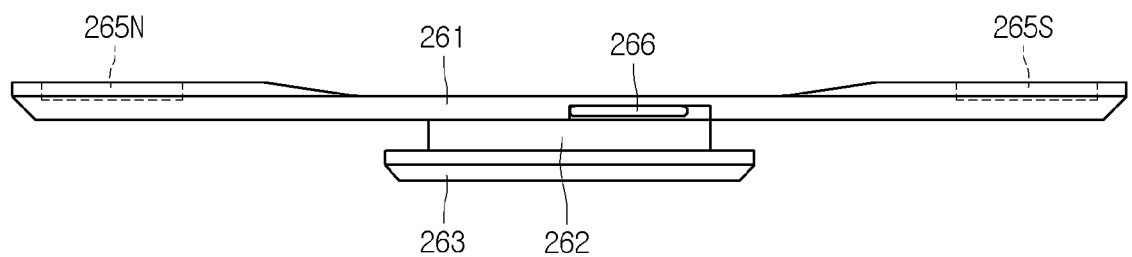
FIG. 28
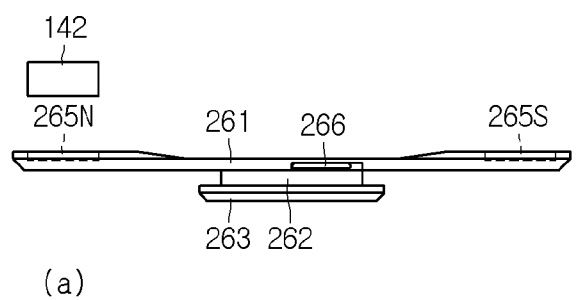
(a)
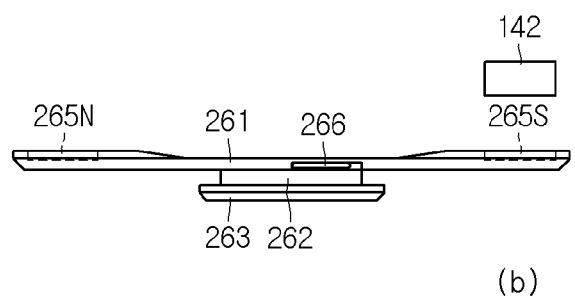
(b)

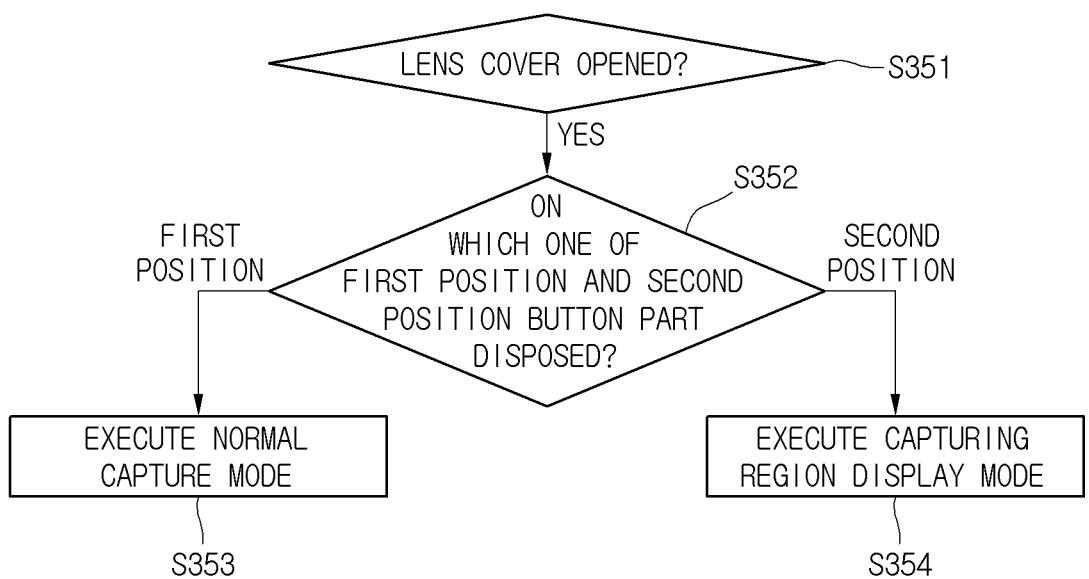
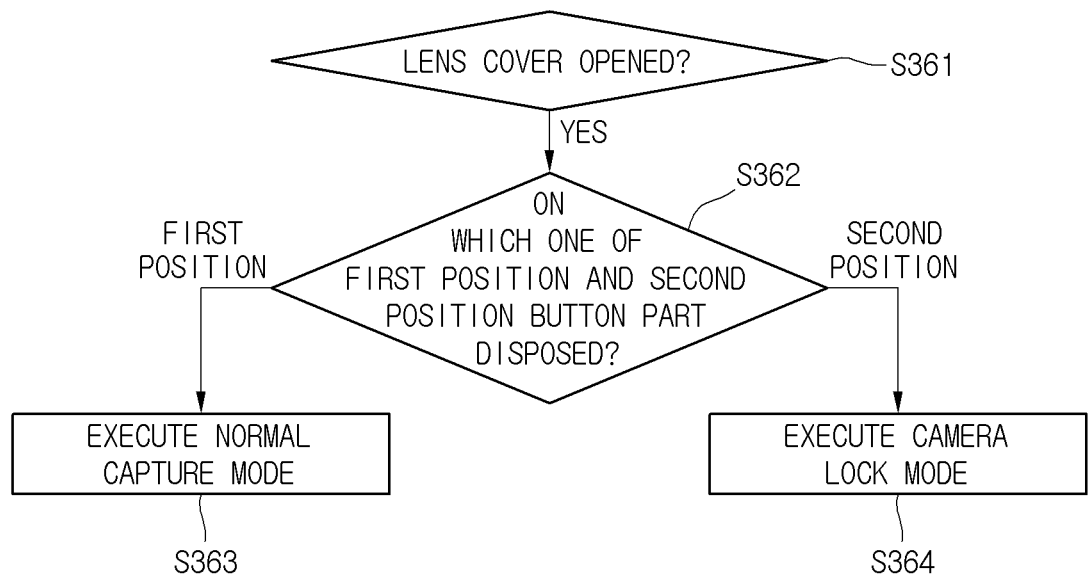

FIG. 47
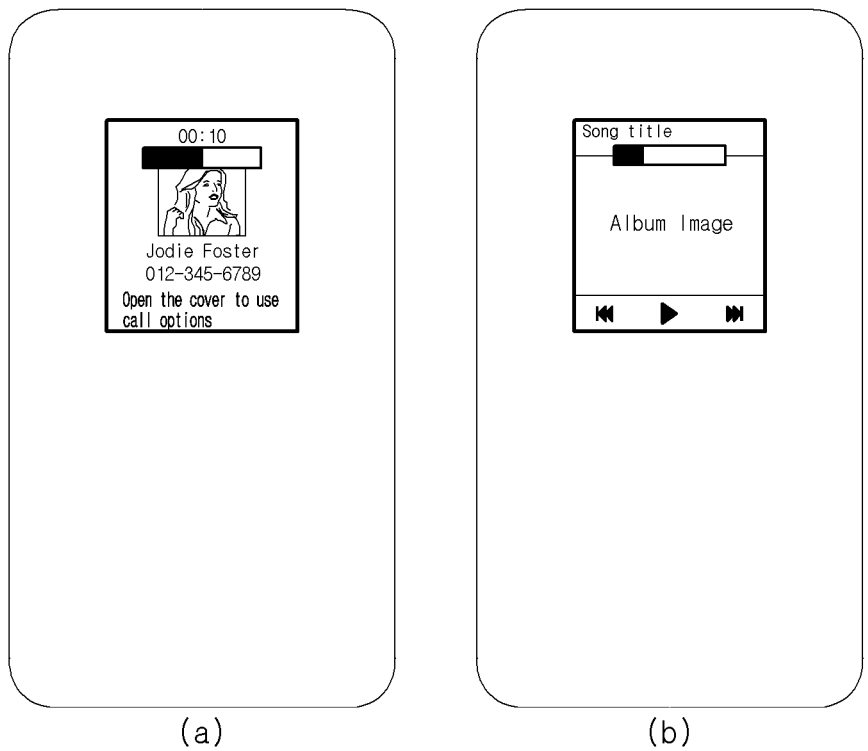
(a)  (b)
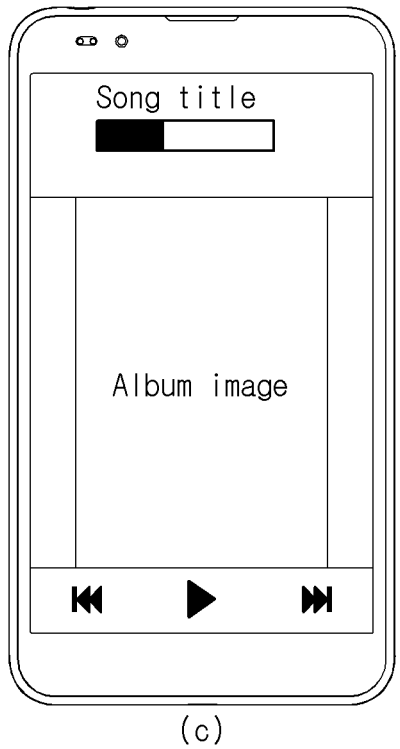
(c)

TERMINAL CASE, MOBILE TERMINAL, AND MOBILE TERMINAL ASSEMBLY INCLUDING THE TERMINAL CASE AND THE MOBILE TERMINAL

CROSS-REFERENCE TO RELATED APPLICATIONS

The present application claims priority under 35 U.S.C. 119 and 35 U.S.C. 365 to Korean Patent Application No. 10-2013-0051523 filed on May 7, 2013 and 10-2013-0064710 filed on Jun. 5, 2013 which are hereby incorporated by reference in its entirety.

BACKGROUND

The present disclosure relates to a terminal case, a mobile terminal, and a mobile terminal assembly including the terminal case and the mobile terminal.

As the touch recognition of a touch screen and a user interface therefor develop, the touch screen becomes used for a mobile terminal generally. Additionally, the touch screen becomes larger and a bezel part of a mobile terminal becomes thinner. However, the touch screen of a mobile terminal may be damaged due to the impact of crash. According to the recent trend, that is, as the touch screen becomes larger and the bezel part becomes thinner, such risks may be greater.

Accordingly, users may use various types of terminal cases so as to protect the mobile terminals from such risks.

A typical terminal case includes a terminal coupling part detachable from the rear of a mobile terminal and/or a front cover part covering the front of the mobile terminal.

The terminal coupling part covers the rear of the mobile terminal. At this point, a portion corresponding to a camera lens is generally incised to expose the camera lens to the outside. Accordingly, even when a terminal case is coupled to a mobile terminal, since a camera lens at the rear of the mobile terminal is exposed to the outside, a camera lens scratch occurs. Therefore, the quality and performance of the camera lens may be deteriorated.

Moreover, in order to prevent this, as a means for protecting the camera lens is attached to the mobile terminal, the volume of the mobile terminal becomes larger and the external design quality becomes deteriorated.

Moreover, when shooting by using a camera module built in a typical mobile terminal, due to a time for turning on a display unit and searching for and executing a camera application, a user may miss the moment that needs to be taken for a picture immediately.

Moreover, when a front cover part is equipped at a terminal case, it may protect a touch screen stably compared to another case. However, when the front cover part is closed, a user cannot check the contents on the touch screen of the mobile terminal and cannot provide an input through the touch screen of the mobile terminal. Accordingly, in order to check a simple content or provide a simple input, a user needs to open the front cover part, and then check the contents displayed on the touch screen or provide a touch input inconveniently.

SUMMARY

Embodiments provide a terminal case, a mobile terminal, and a mobile terminal assembly including the mobile terminal and the terminal case.

In order to solve the above-mentioned issues, a means for protecting a camera lens of a mobile terminal is equipped at an additional terminal case detachable from the mobile terminal, so that the camera lens may be protected while maintaining the slim and elegant appearance of the mobile terminal.

Additionally, by promptly executing a camera application so that instant switching to a capture mode is possible, the damage of a lens part of a mobile terminal may be prevented.

Additionally, the contents displayed on a touch screen may be checked without opening a front cover part for protecting a touch screen and also a touch input may be possible.

In one embodiment, a mobile terminal assembly includes: a terminal case; and a mobile terminal detachable from the terminal case, wherein the terminal case comprises: a case body; and a lens cover openably disposed in the case body, wherein the mobile terminal comprises: a display unit; a camera module including a camera lens disposed at a position corresponding to the lens cover; a lens cover sensing unit sensing whether the lens cover is opened or closed; and a control unit configured to execute a camera application on the basis of whether the lens cover is opened or closed.

In one embodiment, provided is a mobile terminal detachable from a terminal case including a rear incision part and a lens cover capable of opening or closing the rear incision part, the mobile terminal comprising: a display unit; a touch input unit receiving a touch input; a camera module including a camera lens disposed at a position corresponding to the lens cover; a lens cover sensing unit sensing whether the lens cover is opened or closed; and a control unit configured to display a preset user interface through the display unit on the basis of whether the lens cover is opened or closed.

In one embodiment, provided is a mobile terminal detachable from a terminal case, comprising: a rear incision part; a lens cover capable of opening or closing the rear incision part; a button part movably provided; first and second polar magnets coupled with the button part; a display unit; a camera module including a camera lens disposed at a position corresponding to the lens cover; a lens cover sensing unit sensing whether the lens cover is opened or closed; a case coupling sensing unit sensing a position of the button part of the terminal case through magnetic fields of the first and second polar magnets; and a control unit configured to display a preset user interface through the display unit on the basis of whether the lens cover is opened or closed and the position of the button part, wherein the control unit is configured to determine the position of the button part as a first position when the magnetic field of the first polar magnet is sensed by the case coupling sensing unit, and determines the position of the button as a second position when the magnetic field of the second polar magnet is sensed by the case coupling sensing unit.

In one embodiment, provided is a mobile terminal detachable from a terminal case, comprising: a case body of which a front surface is opened and having a rear incision part defined in a rear surface thereof; a front cover part rotatably coupled with the case body to open or close the opened front surface of the case body and having a front incision part; and a lens cover capable of opening or closing the rear incision part; a camera module including a camera lens disposed at a position corresponding to the rear incision part; a display unit displaying an image; a lens cover sensing unit sensing whether the lens cover is opened or closed; a front cover sensing unit sensing whether the front cover part is opened or closed; and a control unit configured to control an execution of a camera application according to whether the lens cover is opened or closed, wherein the control unit is configured to display a user interface in an area corresponding to the front incision part of the display unit when the front cover is closed.

In one embodiment, provided is a terminal case detachable from an outer of a mobile terminal having a camera lens, comprising: a case body having one side opened to be coupled with a mobile terminal; a lens cover mounting part formed at the case body; a rear incision part formed at a position corresponding to the camera lens of the mobile terminal in the lens cover mounting part; a lens cover coupled to the lens cover mounting part to allow the rear incision part to be opened or closed; and a lens cover magnet coupled to the lens cover.

In one embodiment, provided is a mobile terminal assembly, comprising: a terminal case; and a mobile terminal detachable from the terminal case, wherein the terminal case comprises a front cover part having a front incision part, wherein the mobile terminal comprises: a display unit covered by the front cover part; a first application including: a first user interface provided through the front incision part when the front cover part is closed; and a second user interface provided through an entire area of the display unit when the front cover part is opened; and a control unit configured to display the first user interface of the first application through the front incision part when the front cover part is closed, and configured to display the second user interface of the first application through the entire area of the display unit when the front cover part is opened.

The details of one or more embodiments are set forth in the accompanying drawings and the description below. Other features will be apparent from the description and drawings, and from the claims.

BRIEF DESCRIPTION OF THE DRAWINGS

FIG. 9 is a view when a lens cover is closed and FIG. 10 is a view when a lens cover is opened.

FIG. 27 is a perspective view of a button part.

FIGS. 28A and 28B are views illustrating a relationship between a button part and a case coupling sensing unit. FIG. 28A is a view when a case coupling sensing unit detects the N pole of a button part and FIG. 28B is a view when a case coupling sensing unit detects the S pole of a button part.

FIG. 31 is a flowchart illustrating a method of executing at least one mode among a normal capture mode and a capturing region marking mode when a lens cover is opened.

FIG. 32 is a flowchart illustrating a method of executing at least one mode among a normal capture mode and a camera lock mode when a lens cover is opened.

FIG. 47 is a view illustrating a user interface displayed when a user provides a volume button input as a front cover part of a mobile terminal case is closed.

DETAILED DESCRIPTION OF THE EMBODIMENTS

Hereinafter, a mobile terminal relating to the present invention is described in more detail with reference to the drawings. The suffixes "module" and "unit" for components used in the description below are assigned or mixed in consideration of easiness in writing the specification and, do not have distinctive meanings or roles by themselves. In the following description, detailed descriptions of well-known functions or constructions will be omitted since they would obscure the invention in unnecessary detail. Additionally, the accompanying drawings are provided to make embodiments of the present invention clear and the technical ideal of the present invention is not limited to the accompanying drawings. It should be understood that the idea and technical scope of the present invention includes all modifications, equivalents and substitutes.

Although terms like first and second may be used to describe various components, the components are not limited to the terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

The meaning of "include," "comprise," "including," or "comprising," specifies a property, a region, a fixed number, a step, a process, an element and/or a component but does not exclude other properties, regions, fixed numbers, steps, processes, elements and/or components.

A mobile terminal described in this specification may include a mobile phone, a smart phone, a laptop computer, a digital broadcasting terminal, a person digital assistant (PDA), a portable multimedia player (PMP), and a navigation. However, it is apparent to those skilled in the art that a configuration listed in an embodiment of the present invention is applied to a stationary terminal such as a digital TV and a desktop computer except when only applicable to a mobile terminal.

Figure 1:
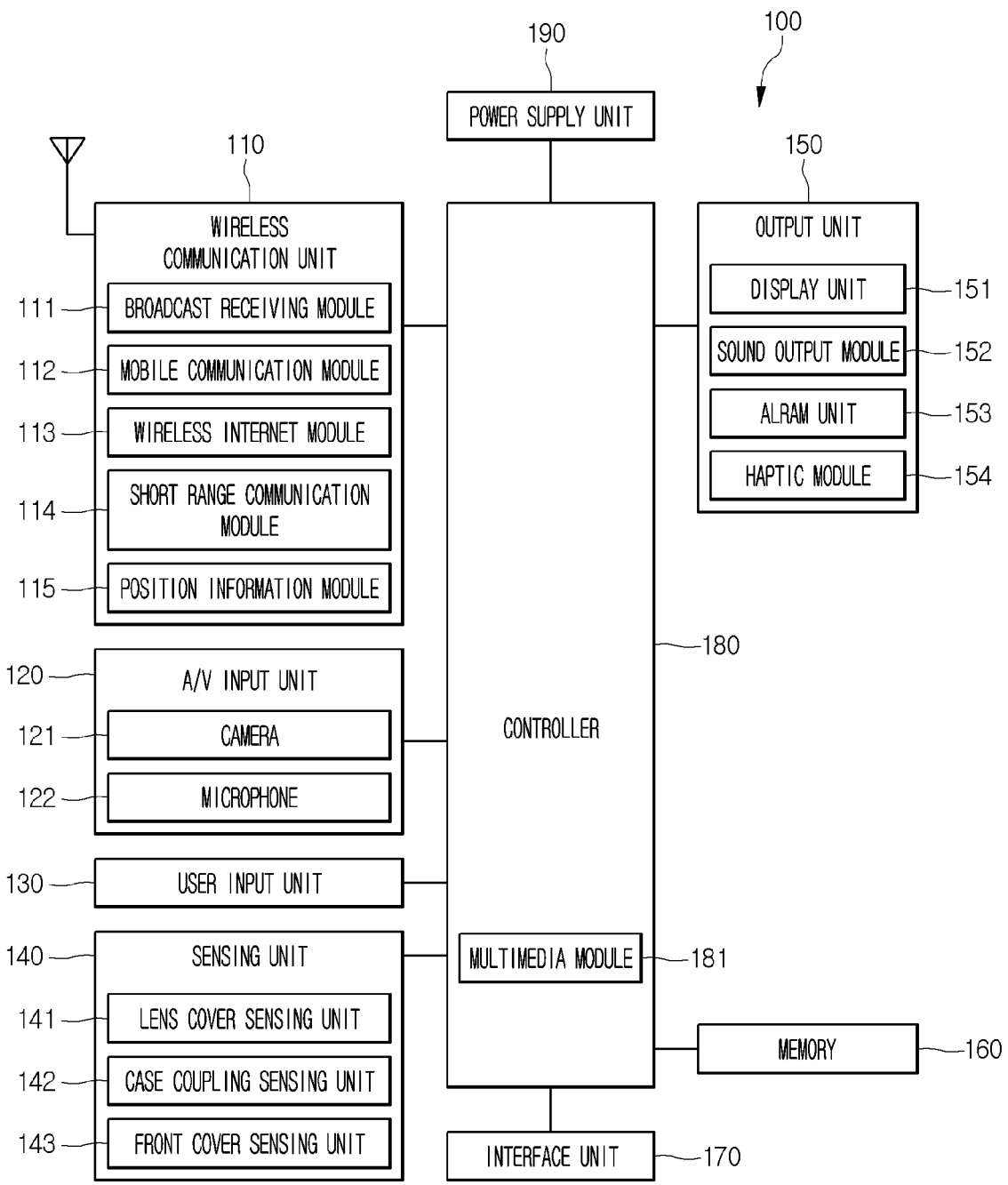
FIG. 1 is a block diagram of a mobile device according to an embodiment of the present invention.

FIG. 1 is a block diagram of a mobile device according to an embodiment of the present invention.

A mobile terminal in the embodiments described below may include some or all of components described with reference to FIG. 1.

The mobile terminal 100 includes a wireless communication unit 110, an Audio/Video (A/V) input unit 120, a user input unit 130, a sensing unit 140, an output unit 150, a memory 160, an interface unit 170, a control unit 180, and a power supply unit 190. Since the components shown in FIG. 1 are not essential, the mobile terminal device 100 including more or less components may be realized.

Below, the components are described one by one.

The wireless communication unit 110 may include at least one module allowing wireless communication between the mobile terminal 100 and a wireless communication system or between the mobile terminal 100 and a network including the mobile terminal 100. For example, the wireless communication unit 110 may include a broadcast receiving module 111, a mobile communication module 112, a wireless internet module 113, a short-range communication module 114, and a position information module 115.

The broadcast receiving module 111 receives a broadcast signal and/or broadcast related information from an external broadcast management server through a broadcast channel.

The broadcast channel may include a satellite channel and a terrestrial channel. The broadcast management server may mean a server generating and transmitting a broadcast signal and/or broadcast related information or a server receiving and transmitting a pre-generated broadcast signal and/or broadcast related information. The broadcast signal may include a TV broadcast signal, a radio broadcast signal, and a data broadcast signal, and also may include a broadcast signal combining a TV broadcast signal or a radio broadcast signal with a data broadcast signal.

The broadcast related information may mean information relating to a broadcast channel, a broadcast program, or a broadcast service provider. The broadcast related information may be provided through a mobile communication network. In this case, the broadcast related information may be received by the mobile communication module 112.

The broadcast related information may exist in various forms. For example, the broadcast related information may exist in forms such as Electronic Program Guide (EPG) of Digital Multimedia Broadcasting (DMB) or Electronic Service Guide (ESG) of Digital Video Broadcast-Handheld (DVB-H).

The broadcast receiving module 111 may receive a digital broadcast signal by using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). Of course, the broadcast receiving module 111 may be configured to be proper for another broadcast system in addition to the digital broadcast system.

The broadcast signal and/or broadcast related information received through the broadcast receiving module 111 may be stored in the memory 160.

The mobile communication module 112 transmits/receives a wireless signal to/from at least one of a base station, an external terminal, and a server on a mobile communication network. The wireless signal may include various forms of data according to a voice call signal, a video call signal, or text/multimedia message transmission.

The wireless internet module 113 is a module for wireless internet access, and may be internally or externally included in the mobile device 100. As wireless internet technology, there are Wireless LAN (WLAN) (Wi-Fi), Wireless broadband (Wibro), World Interoperability for Microwave Access (Wimax), and High Speed Downlink Packet Access (HSDPA).

The short-range communication module 114 refers to a module for short-range communication. As short range communication technology, there are Bluetooth, Radio Frequency Identification (RFID), infrared Data Association (IrDA), Ultra Wideband (UWB), and ZigBee.

The position information module 115 is a module for obtaining the position of a mobile terminal, and its representative example includes a Global Position System (GPS) module.

The A/V input unit 120 is to input an audio signal or a video signal, and may include a camera module 121 and a microphone 122. The camera module 121 processes a video frame such as a still image or a moving image obtained by an image sensor in a video call mode or a capture mode. The processed video frame may be displayed on a display unit 151.

The video frame processed by the camera module 121 may be stored in the memory 160 or may be transmitted to the outside through the wireless communication unit 110. The camera module 121 may be provided two according to a usage environment.

The microphone 122 receives an external sound signal through a microphone in a call mode, a recoding mode, or a voice recognition mode and processes it as voice data. In the case of a call mode, the processed voice data may be converted into a format that can be sent to a mobile communication base station and then outputted through the mobile communication module 112. The microphone 122 may have various noise reduction algorithms to remove noise occurring while an external sound signal is inputted.

The user input unit 130 generates input data to allow a user to control an operation of a terminal. The user input unit 130 may include a key pad, a dome switch, a touch pad (resistive/capacitive), a jog wheel, and a jog switch. Additionally, the user input unit 130 may include a touch input unit 131 equipped at the front of the display unit 151.

The sensing unit 140 detects a current state of the mobile terminal 100, for example, a position of the mobile terminal 100, user contact, an orientation of the mobile terminal 100, and an acceleration/deceleration of the mobile terminal 100, and then generates a sensing signal to control an operation of the mobile terminal 100.

The sensing unit 140 may include a lens cover sensing unit 141 for sensing the open/closed state of the lens cover 240 and also may include a case coupling sensing unit 142 for sensing whether the mobile terminal 100 is coupled with the terminal case 200. Additionally, the sensing unit 140 may include a front cover sensing unit 143 for sensing whether the front cover part 210 covers the front of the mobile terminal 100.

Figure 34:
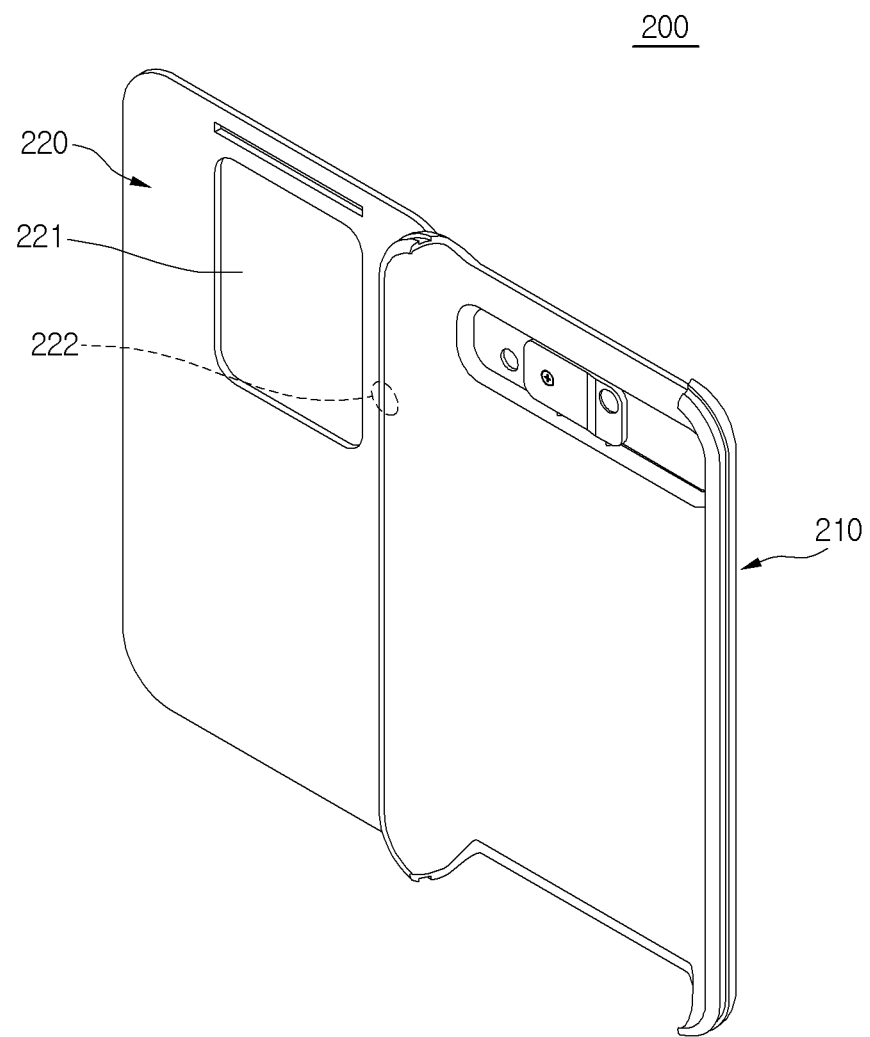
FIG. 34 is a view illustrating a terminal case according to a third embodiment of the present invention.

Moreover, the sensing unit 140 may include a proximity sensor. An example of the proximity sensor includes a hall sensor. For example, the lens cover sensing unit 141 may be a proximity sensor sensing whether the lens cover 240 is opened or closed by sensing the approach of the lens cover magnet 245 equipped at the lens cover 240. Moreover, the case coupling sensing unit 142 may be a proximity sensor sensing whether the mobile terminal 100 is coupled with the case 200 by sensing the approach of the lens cover magnet 245 equipped at the lens cover 100. Additionally, the front cover sensing unit 143 may also include a proximity sensor and for example, may sense the approach of the magnet 222 equipped at the front cover part 210 as shown in FIG. 34.

Furthermore, the proximity sensor may include optical proximity sensors, capacitive proximity sensors, optical proximity sensor, eddy current proximity sensor, ultrasonic proximity sensors, inductive proximity sensors in addition to a magnetic proximity sensor such as a hall sensor.

Additionally, the sensing unit 140 may sense the on/off state of the display unit 151, the power supply of the power supply unit 190, and external device connection of the interface unit 170.

The output unit 150 generates a visual, auditory, and tactile related output and may include a display unit 151, a sound output module 152, an alarming unit 153, and a haptic module 154.

The display unit 151 displays (outputs) information processed in the mobile terminal 100. For example, when a mobile terminal is in a call mode, a call related User Interface (UI) or Graphic User Interface (GUI) is displayed. When the mobile terminal 100 is in a video call mode, or a capture mode, a captured or/and received image, UI, or GUI is displayed.

The display unit 151 may include at least one of a liquid crystal display (LCD), a thin film transistor-liquid crystal display (a TFT LCD), an organic light-emitting diode (OLED), a flexible display, and a 3D display.

Among them, some displays may be a transparent or light transmissive type so that it is possible to see the outside through them. This may be called a transparent display, and its representative example includes a Transparent OLED (TOLED). The display unit 151 may have a rear structure or a light transmissive type structure. Due to such a structure, a user may see an object at the rear of the terminal body through an area that the display unit 151 of the terminal body occupies.

According to an implementation form of the mobile terminal 100, at least two display units 151 may exist. For example, a plurality of display units are separately or integrally disposed at one side or different sides, respectively, in the mobile terminal 100.

When the display unit 151 and a sensor sensing a touch operation (hereinafter, referred to as a 'touch sensor') constitute a mutual layer structure (hereinafter, referred to as a 'touch screen'), the display unit 151 may be used as an input device addition to an output device. The touch sensor may have a form such as a touch film, a touch sheet, or a touch pad.

The touch sensor is configured to covert a pressure applied to a specific portion of the display unit 151, or a change in capacitance occurring at a specific portion of the display unit 151 into an electrical input signal. The touch sensor may be configured to sense a pressure at the time of touch in addition to a touched position and area.

When there is touch input on the touch sensor, signal(s) corresponding thereto may be sent to a touch control unit. The touch control unit processes the signal(s) and transmits corresponding data to the control unit 180. By doing so, the control unit 180 recognizes which area of the display unit 151 is touched.

The sound output module 152 may output audio data received from the wireless communication unit 110 or stored in the memory 160, in a call signal receiving mode, a call mode, a recording mode, a recording mode, a voice recognition mode, or a broadcast receiving mode. The sound output module 152 may output a sound signal relating to a function of the mobile terminal 100 (for example, call signal receiving sound, and message receiving sound). The sound output module 152 may include a receiver, a speaker, and a buzzer.

The alarming unit 153 outputs a signal for notifying an event occurrence of the mobile terminal 153. An example of an event occurring in a mobile terminal may include call signal reception, message reception, key signal input, and touch input. The alarming unit 153 may output a signal for notifying event occurrence with vibration, besides a video signal or an audio signal. The video signal or audio signal may be outputted through the display unit 151 or the sound output module 152, so that they 151 and 152 may be classified as part of the alarming unit 153.

The haptic module 154 may generate various tactile effects that a user can feel. A typical example of a haptic effect that the haptic module 154 generates includes vibration. The intensity and pattern of a vibration generated by the haptic module 154 is controllable. For example, different vibrations may be synthesized and outputted or may be sequentially outputted.

The haptic module 154 may generate various haptic effects, for example, a pin arrangement that vertically moves with respect to a contact skin surface, an injection power or suction power of air through a nozzle or an inlet, a graze on a skin surface, a contact of an electrode, an effect by stimuli such as electrostatic force, and an effect by cold/warm reproduction using a heat absorbing or generating device.

The haptic module 154 may deliver haptic effects through direct contact, and a user may feel haptic effects through a muscle sense of fingers or hands. The haptic module 154 may be provided two according to a configuration aspect.

The memory 160 may store a program for an operation of the control unit 180, and may temporarily store input/output data (for example, a phonebook, a message, a still image, and a moving image). The memory 160 may store data relating to various patterns of vibrations and sounds, which are outputted during touch input on the touch screen.

The memory 160 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The mobile terminal 100 may operate in relation to a web storage performing the storage function of the memory 160 on internet.

The interface unit 170 serves as a path through which all external devices are connected to the mobile terminal 100. The interface unit 170 receives data from an external device or power, and then delivers it to each component in the mobile terminal 100 or transmits data in the mobile terminal 100 to an external device after power is received. For example, the interface unit 170 includes a wired/wireless headset port, an external charging port, a wired/wireless data port, a memory card port, a port connecting a device equipped with an identification module, an audio input/output (I/O) port, a video input/output (I/O) port, and an earphone port.

The identification module is a chip storing various information to authenticate the permission of the mobile terminal 100, and may include a User Identify Module (UIM), a Subscriber Identity Module (SIM), and a Universal Subscriber Identity Module (USIM). A device equipped with an identification module (hereinafter, referred to as an "identification device") may be manufactured with a smart card type. Accordingly, the identification device may be connected to the mobile terminal 100 through a port.

When the mobile terminal 100 is connected to an external cradle, the interface unit 170 may be a path through which power is supplied from the cradle to the mobile terminal 100, or various command signals inputted from the cradle are delivered to the mobile terminal 100. Various command signals or power inputted from the cradle may operate as a signal for recognizing that the mobile terminal 100 is accurately mounted on the cradle.

The control unit 180 controls overall operations of a mobile terminal in general. For example, control and processing relating to a voice call, a data call, a video call are performed. The control unit 180 may include a multimedia module 181 for multimedia playback. The multimedia module 181 may be implemented in the control unit 180 or may be separated from the control unit 180.

Additionally, the control unit 180 may perform pattern recognition processing to recognize writing input and drawing input on the touch screen as text and images, respectively.

The power supply unit 190 supplies power necessary for operations of each component by receiving external power and internal power in response to a control of the control unit 180.

Various embodiments described herein may be realized in a computer or device similar thereto readable recording medium by using software, hardware, or a combination thereof. In terms of hardware realization, the embodiments described herein may be realized by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, embodiments described in this specification may be realized by the control unit 180 itself.

In terms of software realization, embodiments such as procedures and functions described in this specification may be realized using additional software modules. Each of the software modules may perform at least one function and operation described in this specification. Software code may be realized by software application written in a proper program language. The software code is stored in the memory 160 and is executed by the control unit 180.

First Embodiment

A mobile terminal assembly according to the first embodiment of the present invention includes a mobile terminal 100 and a separate terminal case 200 detachable from the mobile terminal 100.

Hereinafter, a structure of a terminal case according to a first embodiment of the present invention will be described with reference to FIGS. 2 to 8.

Figure 2:
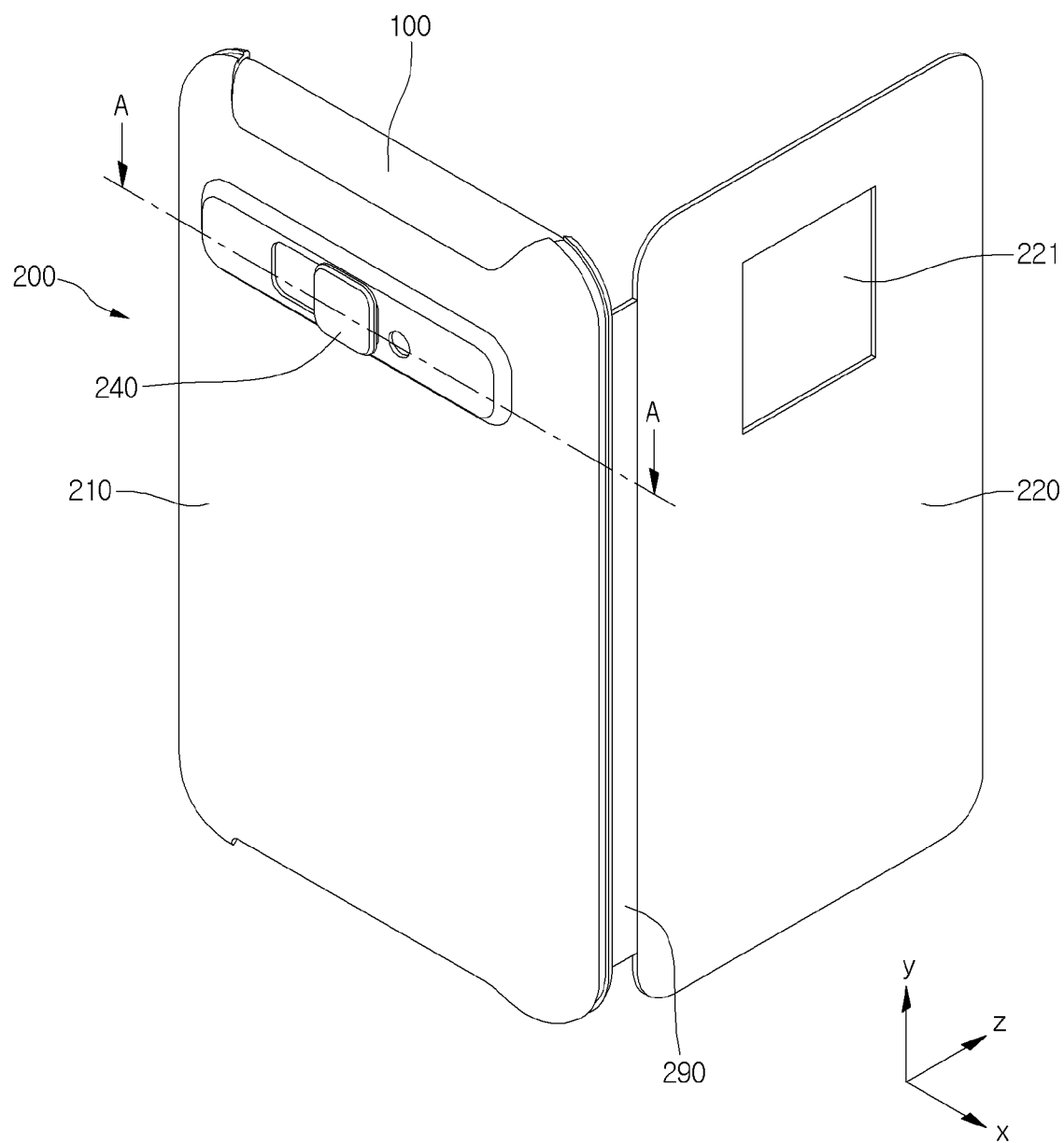
FIG. 2 is a perspective view illustrating a mobile terminal case according to an embodiment of the present invention.

FIG. 2 is a perspective view when a mobile terminal 100 is coupled with a terminal case 200 according to an embodiment of the present invention.

Referring to FIG. 2, the terminal case 200 includes a terminal coupling part 210, a front cover part 220 foldably coupled to the terminal coupling part 100, and a connection part 290 connecting the terminal coupling part 100 and the front cover part 220.

The terminal coupling part 210 covers a portion of a side and a bottom of the mobile terminal 100 and is formed to be detachable from the mobile terminal 100.

Additionally, the front cover part 220 has a pin form corresponding to a front form of the mobile terminal 100 substantially and a portion of the front cover part 220 may include a transparent front incision part 221. The front incision part 221 may be formed when a portion of the front cover part 220 is penetrated and may be a portion formed of a transparent member for allowing a touch input of a user.

Hereinafter, a configuration and functions of the terminal coupling part 210 are described in more detail.

Figure 3:
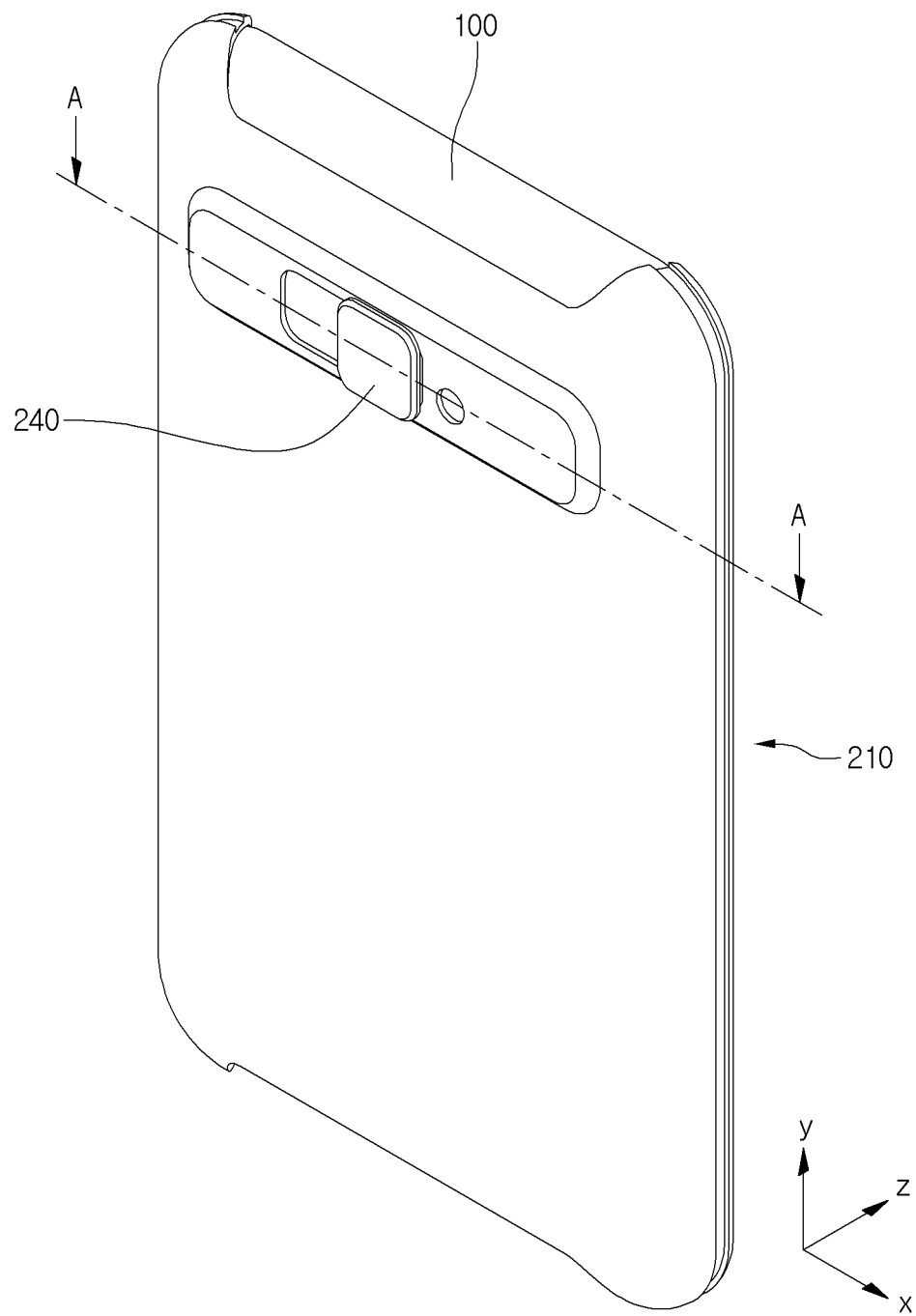
FIG. 3 is a perspective view when a mobile terminal is coupled with a terminal case according to an embodiment of the present invention.
Figure 4:
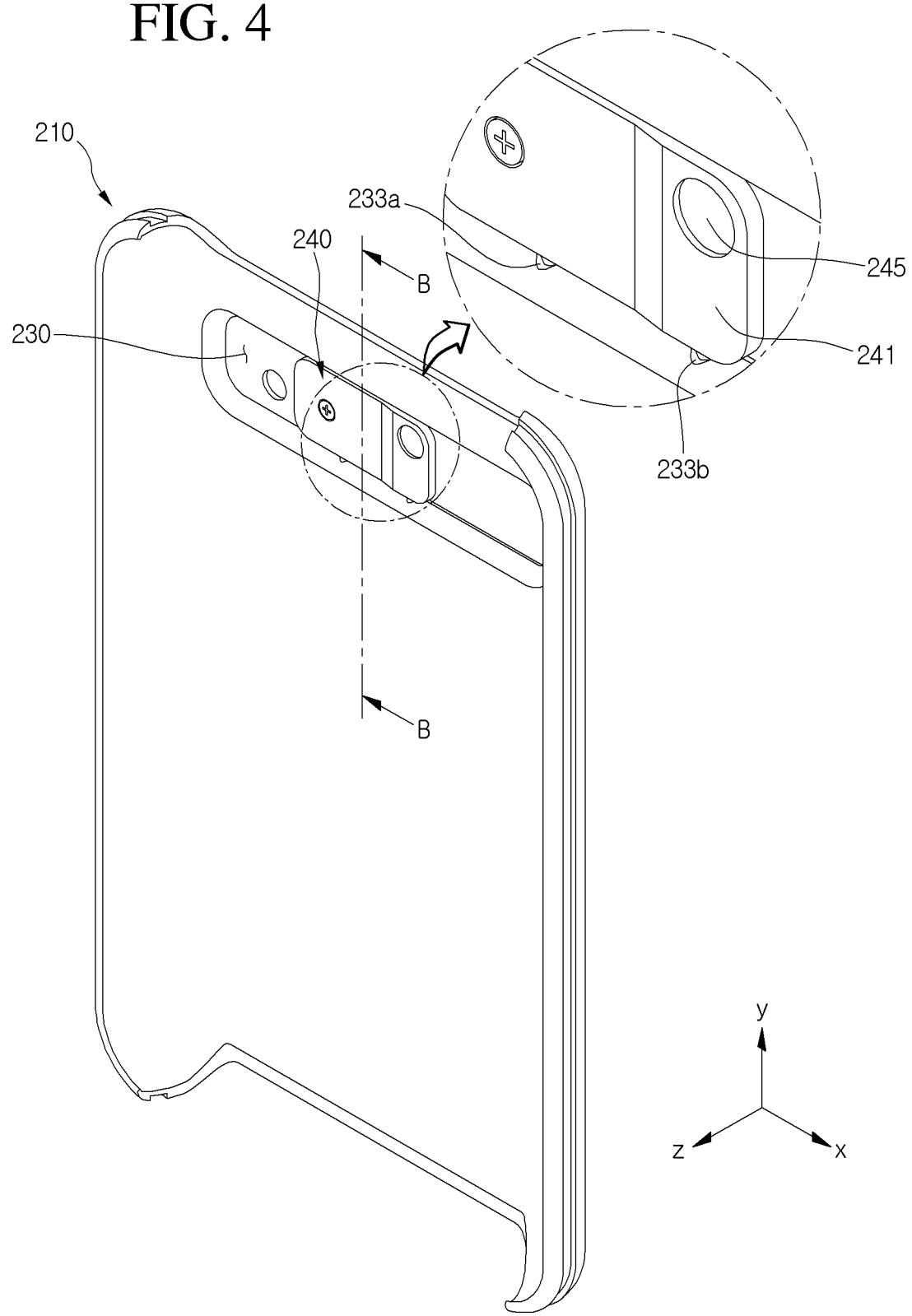
FIG. 4 is a perspective view when a terminal coupling part is seen from the front.
Figure 5:
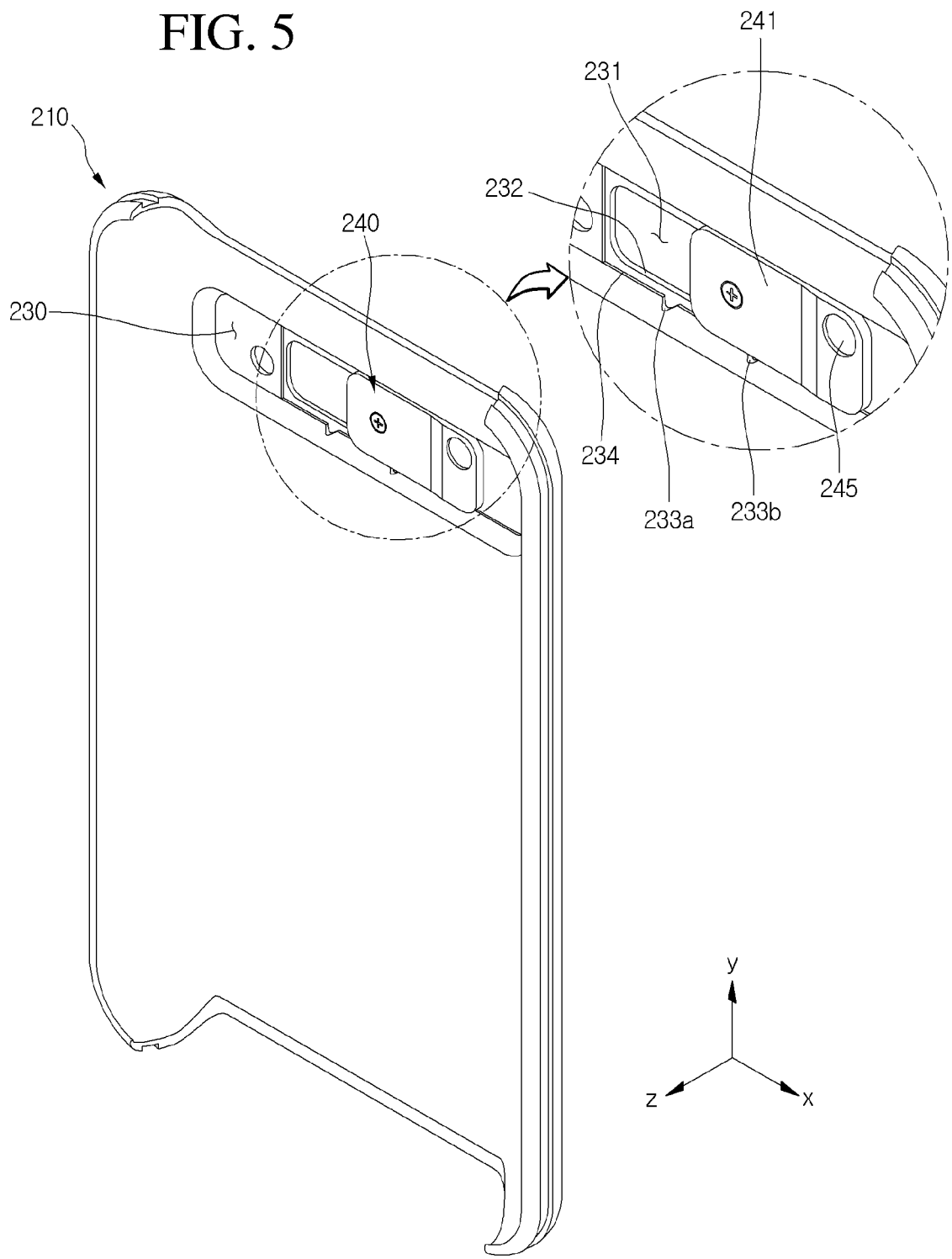
FIG. 5 is a perspective view when a terminal coupling part is seen from the front.

FIG. 3 is a perspective view illustrating a mobile terminal coupled with the terminal coupling part 210 as seen diagonally from the rear. FIGS. 4 and 5 are perspective view illustrating the terminal coupling part 210 as seen diagonally from the front. Especially, FIG. 4 illustrates a view when the lens cover 240 is closed and FIG. 5 illustrates a view when the lens cover 240 is opened.

The terminal coupling part 210 has a form in which a central part extends flat substantially and bends toward the front around the left and right end parts and protrudes. Additionally, the front has an open form to allow the mobile terminal 100 to be detachable. Accordingly, a space for receiving the mobile terminal 100 is formed in the terminal coupling part 210 and when the mobile terminal 100 is coupled, covers a side and a bottom of the mobile terminal 100. Moreover, the distance between the left and right end parts at the frontline of the terminal coupling part 210 is formed to be narrower than the horizontal width of the mobile terminal 100. Accordingly, when the mobile terminal 100 is coupled, the left and right end parts are elastically deformed and opened. After the mobile terminal is coupled, the left and right end parts of the mobile terminal 100 are pressed inwardly by elastic restoring force. Therefore, a coupling state between the mobile terminal 100 and the terminal coupling part 210 may be maintained.

Here, the terminal coupling part 210 may be additionally coupled with a rear case of the mobile terminal 100 or the rear of a battery cover.

However, unlike this, the terminal coupling part 210 may replace the rear case or the battery cover of the mobile terminal 100. In this case, the terminal coupling part 210 may cover the rear of electronic components configuring the mobile terminal 100.

Moreover, the terminal coupling part 210 includes a lens cover mounting part 230. The lens cover mounting part 230 is disposed at a predetermined position of the terminal coupling part 210 and the lens cover 240 is slidably coupled to the lens cover mounting part 230. Hereafter, a configuration of the lens cover 240 is described with reference to FIGS. 6 to 8 and then a configuration of the lens cover mounting part 230 is described with reference to FIGS. 3 to 5.

Figure 6:
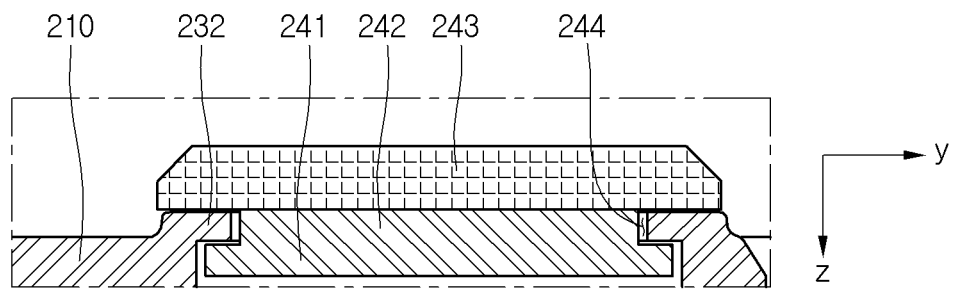
FIG. 6 is a sectional view taken along a line B-B of FIG. 4.
Figure 7:
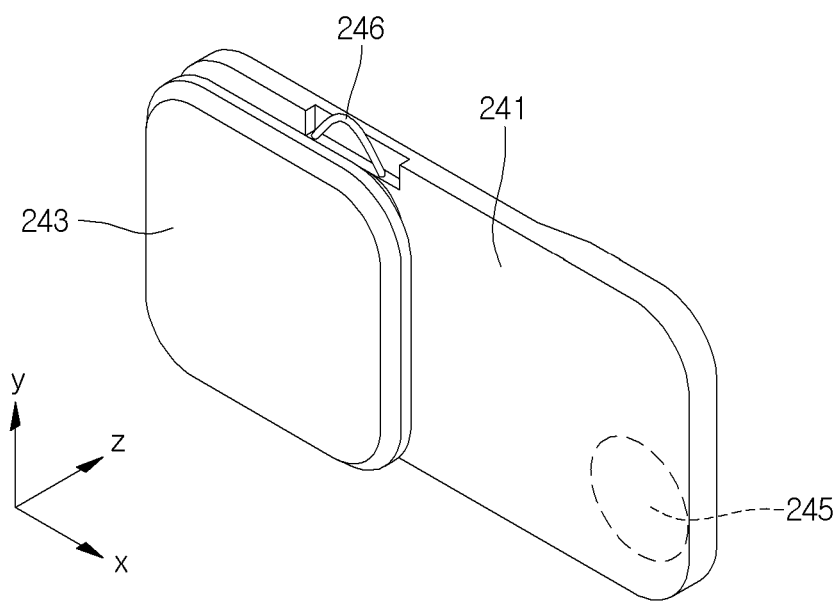
FIG. 7 is a perspective view of a lens cover.
Figure 8:
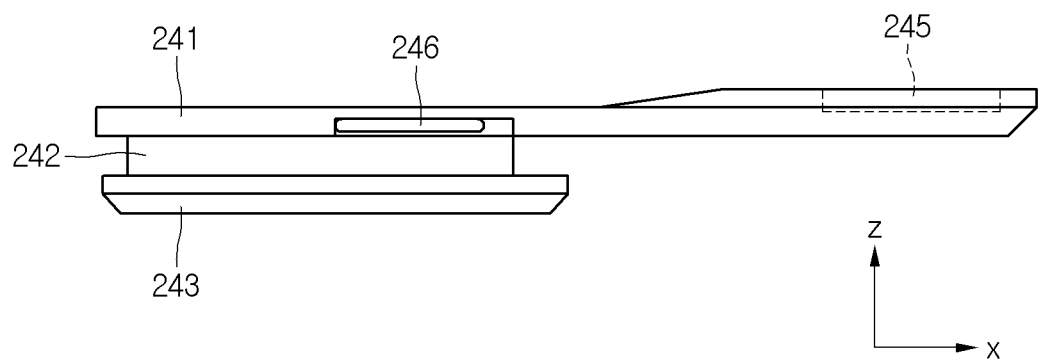
FIG. 8 is a side view of a lens cover.

FIG. 6 is a sectional view taken along a line B-B of FIG. 4. FIG. 7 is a perspective view of the lens cover 240. FIG. 8 is a side view of the lens cover 240.

Referring to FIGS. 6 to 8, the lens cover 240 includes an inner part 241 disposed inside the terminal coupling unit 210 and an outer part 243 disposed outside the case body 220. Additionally, the lens cover 240 further includes a middle part 242 disposed between the outer part 243 and the inner part 241. The inner part 241 and the outer part 243 may all have a plate shape.

The outer part 243 may extend shorter than the inner part 241 along a sliding direction. Additionally, the middle part 242 may extend shorter than the inner part 241.

Here, a direction in which the lens cover 240 slides is referred to as a first direction (an x-axis direction) and a direction perpendicular to the first direction is referred to as a second direction (a y-axis direction). Accordingly, the first direction and the second direction all are directions parallel to an extension direction of a flat plate forming the inner part 241 or the outer part 243. Moreover, a direction perpendicular to all the first direction and the second direction is referred to as a third direction (a z-axis direction). The third direction (the z-axis direction) is a direction perpendicular to a flat plate forming the inner part 241 or the outer part 243. Hereinafter, in describing an embodiment of the present invention, a forward-backward direction means the third direction.

Accordingly, in relation to the length of the first direction (the x-axis direction) of the lens cover 240, the inner part 241 is the longest, the outer part 243 is the second longest, and the middle part 242 is the shortest.

Moreover, in relation to the length of the second direction (the y-axis direction) of the lens cover 240, the inner part 241 and the outer part 243 are almost same and the middle part 242 is the shortest. That is, the second direction length of the middle part 242 has a form extending relatively shorter than the inner part 241 and the outer part 243. Accordingly, the lens cover 240 has a form in which the middle part 242 between the inner part 241 and the outer part 243 is concavely and inwardly recessed along the second direction. Then, this concave groove forms a guide groove 244.

Moreover, an elastic protrusion 246 protruding in the second direction is coupled with the inner part 241. The elastic protrusion 246 is elastically deformable. Accordingly, if there is no external force, the elastic protrusion 246 protrudes toward the outside but if an external force is applied in the second direction, retreats toward the inside.

Moreover, the lens cover magnet 245 is coupled with the lens cover 240. The lens cover magnet 245 is coupled with the first direction end part of the inner part 241. The approach of the lens cover magnet 245 is sensed by the lens cover sensing unit 141 (described below) built in the mobile terminal 100 and this may serve to allow the control unit 180 to recognize an open/closed state of the lens cover 240. For reference, the lens cover sensing unit 141 may be a hall sensor for sensing magnetic field of the lens cover magnet 245.

Moreover, the outer edge of the outer part 243 is formed to be inclined. In more detail, the outer part 243 has a form in which the outers of the both end parts in the first sliding direction are inclined. With such a structure, when the camera module 121 operates, it prevents the angle of view from being narrowed due to the outer part 243. That is, the maximum angle of view may be secured.

Hereinafter, a configuration of a mounting part of the lens cover 230 with which the lens cover 240 having the above configuration is slidably coupled is described.

Referring to FIGS. 4 and 5, the lens cover mounting part 230 is formed when the inner side of the terminal coupling part 210 is steppedly and outwardly recessed. That is, the inner side is recessed outwardly along the third direction (the z-axis direction). At this point, the recessed depth of the lens cover mounting part 230 may be roughly identical to the third direction thickness of the inner part 241 of the lens cover 240 or deeper than the inner part 241.

A rear incision part 231 extending in the first direction is formed at the lens cover mounting part 230. The rear incision part 231 penetrates the terminal coupling part 210 in the third direction and extends in the first direction with a predetermined width in the second direction.

Moreover, the guide protrusion 231 of FIG. 3 inserted into the guide groove 224 of the lens cover 240 is disposed at the lens cover mounting part 230. The guide protrusion 232, as a portion inserted into the guide groove 244 of the lens cover 240, is an edge portion of the rear incision part 241 extending in the first direction. The third direction width of the guide protrusion 232 may be identical to another portion of the terminal coupling part 210. However, the third direction width of the guide protrusion 232 may be thicker or thinner another portion.

Moreover, protrusion insertion parts 233*a* and 233*b* to which the elastic protrusion 246 is insertable are disposed at the lens cover mounting part 230. The protrusion insertion parts 233*a* and 233*b* may be formed at the stepped surface 234 of the mounting part of the lens cover 240. Here, the stepped surface 234, as a stepped portion between the recessed lens cover mounting part 230 and its outer portion, is a surface facing the second direction (the y-axis direction) roughly. Also, the protrusion insertion parts 233*a* and 233*b* has a form in which a portion of the stepped surface 234 is concavely recessed in the second direction.

The protrusion insertion parts 233*a* and 233*b* are formed in plurality along the first direction. For example, the protrusion insertion parts 233*a* and 233*b* include a first protrusion insertion part 233*a* to which the elastic protrusion 246 is inserted when the lens cover 240 is closed and a second protrusion insertion part 233*b* to which the elastic protrusion 246 is inserted when the lens cover 240 is opened. Accordingly, when the lens cover 240 is opened, the elastic protrusion 246, which is inserted into the first protrusion insertion part 233*a* when the lens cover 240 is closed, may exit from the first protrusion insertion part 233*a*, slide along the first direction, and be inserted into the second protrusion insertion part 233*b*.

Moreover, while the lens cover 240 slides, as shown in FIG. 6, the sliding of the lens cover 240 is guided by the guide protrusion 232 inserted into the inside of the guide groove 244.

Hereinafter, referring to FIGS. 9 and 10, the configuration of the mobile terminal 100 is described additionally and then a physical operating method of the lens cover 240 is described.

Figure 9:
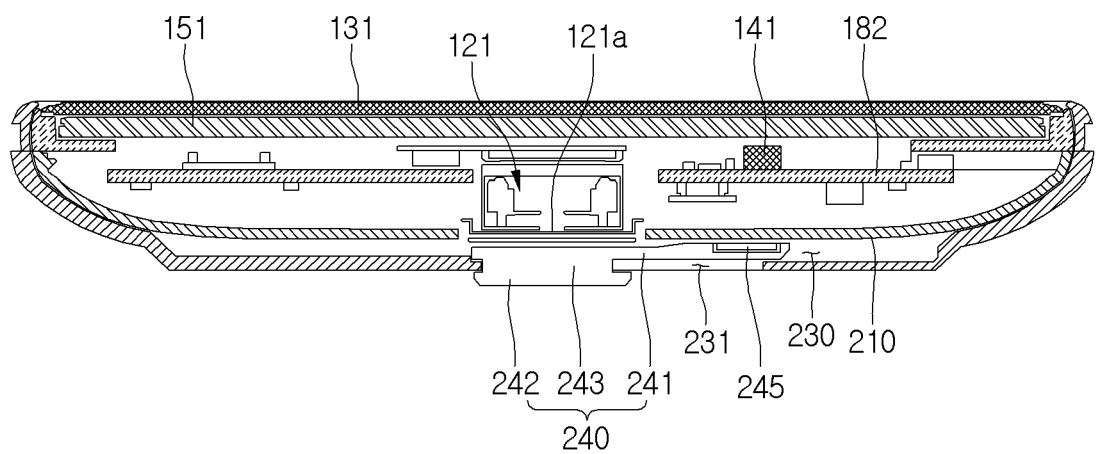
FIGS. 9 and 10 are views taken along a line A-A of FIG. 3.
Figure 10:
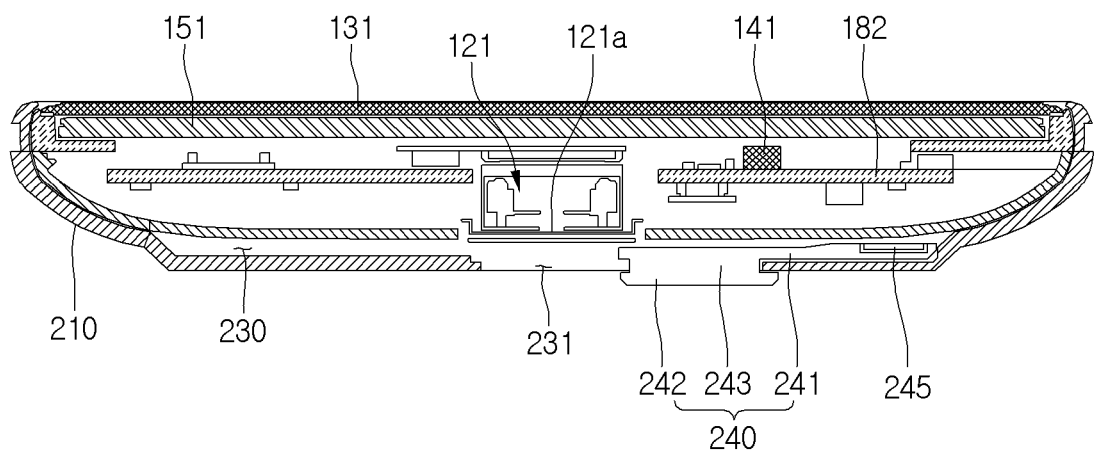

FIGS. 9 and 10 are sectional views taken along a line A-A of FIG. 3 and illustrate the mobile terminal 100 coupled with the terminal case 200. FIG. 9 illustrates a view when the lens cover 240 is closed and FIG. 10 illustrates a view when the lens cover 240 is opened.

A display unit 151 is disposed in the mobile terminal 100 so as to display an image. Also, a touch input unit 131, as part of the user input unit 130, is disposed at the front (the top in FIGS. 9 and 10). Also, a printed circuit board 181 coupled with the control unit 180 is disposed at the rear of the display unit 151.

Additionally, the camera module 121 is disposed at the central portion of the printed circuit board 181 and the lens cover sensing unit 141 for sensing the opened or closed state of the lens cover 240 is disposed at a portion spaced a predetermined distance from the camera module 121 in a horizontal direction, that is, the first direction. The lens cover sensing unit 141 may be a hall sensor for sensing whether the lens cover magnet 245 coupled with the lens cover 240 approaches.

In relation to the terminal case 200 and the mobile terminal 100, as shown in FIG. 9, when the lens cover 240 is closed, the lens cover magnet 245 coupled with the lens cover 240 is disposed in the sensing area of the lens cover sensing unit 141.

Since the lens cover sensing unit 141 is a hall sensor, it detects whether the lens cover 240 is opened or closed by detecting magnetic field of the lens cover magnet 245. That is, when the lens cover magnet 245 is placed within a predetermined distance from the lens cover sensing unit 241, the lens cover sensing unit 141 senses it and thus recognizes that the lens cover 240 is closed.

On the other hand, as shown in FIG. 10, when the lens cover 240 is opened and becomes away from the lens cover sensing unit 141, that is, outside the sensing area of the lens cover sensing unit 141, the lens cover sensing unit 141 senses that the lens cover 240 is opened.

Moreover, when the lens cover 240 slides in the lens cover mounting part 230, the guide protrusion 232, as shown in FIG. 6, is maintained being inserted into the guide groove 244. That is, the sliding of the lens cover 240 may be guided by the guide protrusion 232 and the guide groove 244.

Hereinafter, referring to FIG. 11, an operating method of the mobile terminal according to an embodiment of the present invention is described in more detail. In more detail, an operating method of the control unit 180 is described according to whether the lens cover 240 is opened or closed.

Figure 11:
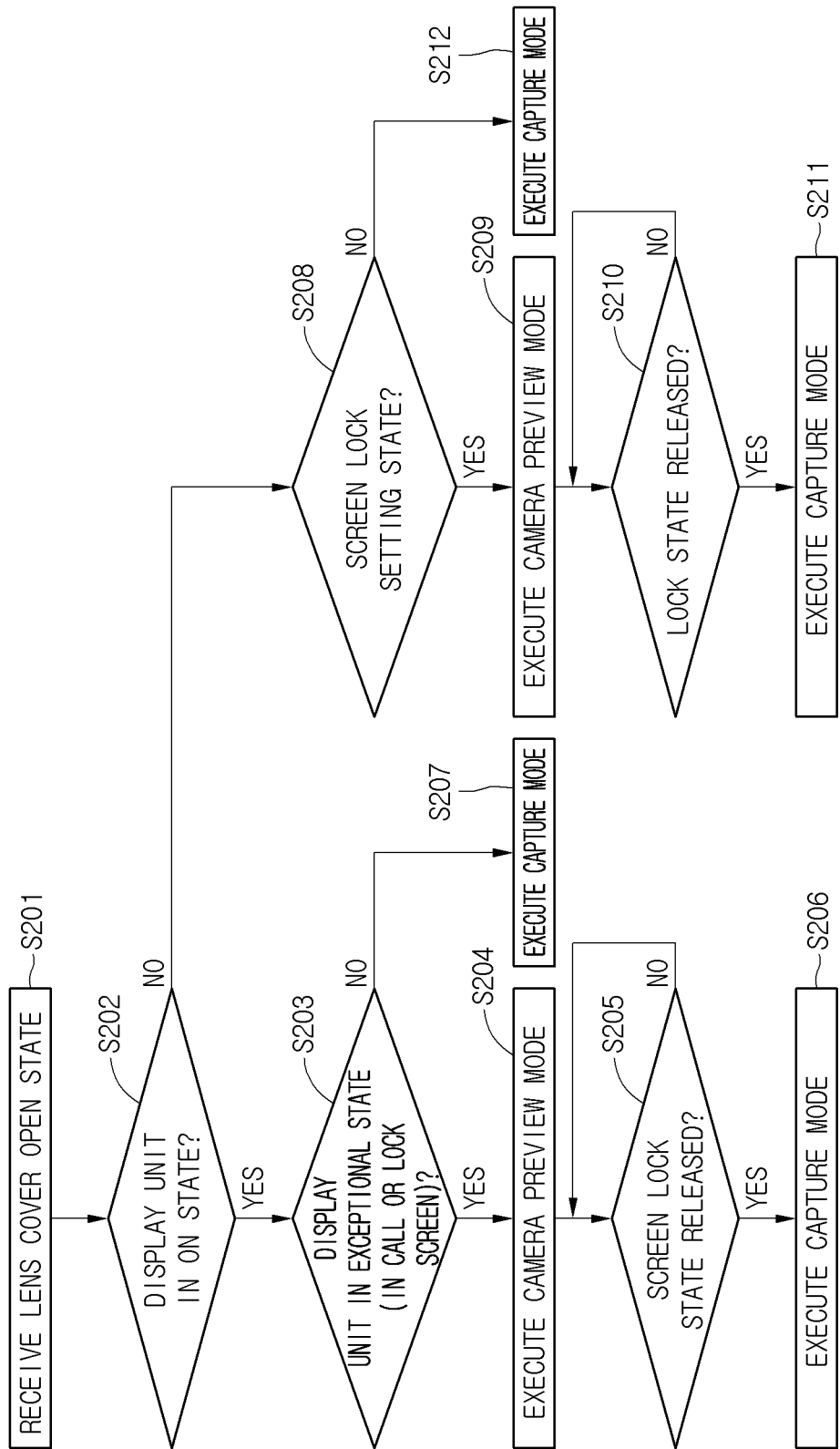
FIG. 11 is a flowchart illustrating an operating method of a mobile terminal according to an embodiment of the present invention.

FIG. 11 is a flowchart illustrating an operation of a mobile terminal according to an embodiment of the present invention.

Before describing each operation shown in FIG. 11, when an overall operation method is described in brief, as a user slides the lens cover 240 and changes the closed state into an opened state, the camera lens 121*a* is exposed to the outside. At this point, the sensing unit 140 senses the opening of the lens cover 240. The control unit 180 executes a camera application when it is determined that the lens cover 240 is opened. At this point, an operation of the camera application may start in one of a capture mode and a camera preview mode. Accordingly, the control unit 180 may display a camera preview mode interface on the display unit 151 by selecting the camera preview mode and may display a capture mode user interface on the display unit 151 by selecting a capture mode. For reference, the capture mode means a mode in which capturing is available by a user input and the camera preview mode means a mode in which capturing by a user input is limited.

Hereinafter, referring to FIG. 11, an operation for executing a camera application in one of a capture mode or a camera preview mode is described in more detail.

First, the control unit 180 receives signals on the open of the lens cover 240 from the sensing unit 240 in operation S201.

When an opened state of the lens cover 240 is received, the control unit 180 determines whether the current display unit 151 is on or off in operation in operation S202.

When the display unit 151 is on, the control unit 180 determines whether it is an exceptional state in operation S203. The exceptional state is a lock screen state or an in call state and is set as a state in which free use of a mobile terminal is limited or a prioritized task is performed. The concept contrary to the exceptional state is a normal state. The normal state is set to a state other than the exceptional state. Accordingly, in the normal state, a mobile terminal may be used freely through a touch operation. Accordingly, when the display unit 151 is on, it is in one of the normal state and the exceptional state.

The control unit 180 enters the camera preview mode when a state of the display unit 151 is in the exceptional state in operation S204. That is, by selecting the camera preview mode, the camera application is executed in the camera preview mode. Accordingly, a camera preview mode interface is displayed on the display unit 151. The camera preview mode interface includes a capture mode interface 301 and a lock release interface 302. Accordingly, in the camera preview mode, the capture mode interface is outputted but if a lock state is released by manipulating the lock release interface outputted together or a prioritized task such as a call state is not released, a touch input for capture is not received.

In this state, a user may perform a touch input for lock release to release a screen lock state.

The control unit 180 determines whether the screen lock state is released in the camera preview mode in operation S205.

Then, when control unit 180 receives a screen lock release signal as a determination result from a touch unit, after the lock state is released, it enters the capture mode in operation S206. That is, the capture mode is selected. At this point, the control unit 180 displays the capture mode interface 301 of the camera application on the display unit 151. Accordingly, a user may capture a desired subject by using the camera application.

Moreover, in operation S203, after the control unit 180 determines whether the display unit 151 is in the exceptional state, if the display unit 151 is in the normal state instead of the exceptional state, the control unit 180 enters the capture mode directly. That is, the control unit 180 selects the capture mode and displays the capture mode interface 301 on the display unit 151. Accordingly, a user manipulates the capture mode interface 301 to capture an image.

Moreover, after determining that the display unit 151 is off in operation S202, the control unit 180 determines whether the display unit 151 is in a screen lock setting state in operation S208.

If it is determined that the display unit 151 is in the screen lock setting state, the control unit 180 enters the camera preview mode in operation S209. That is, by selecting the camera preview mode, the camera application is executed in the camera preview mode. Accordingly, the display unit 151 displays the lock release interface 302 in addition to the capture mode interface 301. That is, in the camera preview mode, although the capture mode interface 301 is outputted, if a lock state or a prioritized task state is not released by manipulating the lock release interface 302 outputted together, capturing an image is not performed.

In this state, a user may perform a touch input for lock release to release a screen lock state.

The control unit 180 determines whether the screen lock state is released in the camera preview mode in operation S210. Then, when a control unit 180 receives a screen lock release signal as a determination result from a touch unit, after the lock state is released, it enters the capture mode in operation S211. That is, the capture mode is selected. In the capture mode, the control unit 180 outputs the capture mode interface 301 of the camera application on the display unit 151. Accordingly, a user may capture a desired subject by using the camera application.

Moreover, in operation S208, if it is determined that the display unit 151 is not in the screen lock state, the control unit 180 enters the capture mode in operation S212. That is, the capture mode is selected. Then, the control unit 180 outputs the capture mode interface 301 of the camera application on the display unit 151. Accordingly, a user may capture a desired subject by using the camera application.

FIGS. 12 to 15 are views illustrating a user interface provided in the above-mentioned process.

Figure 12:
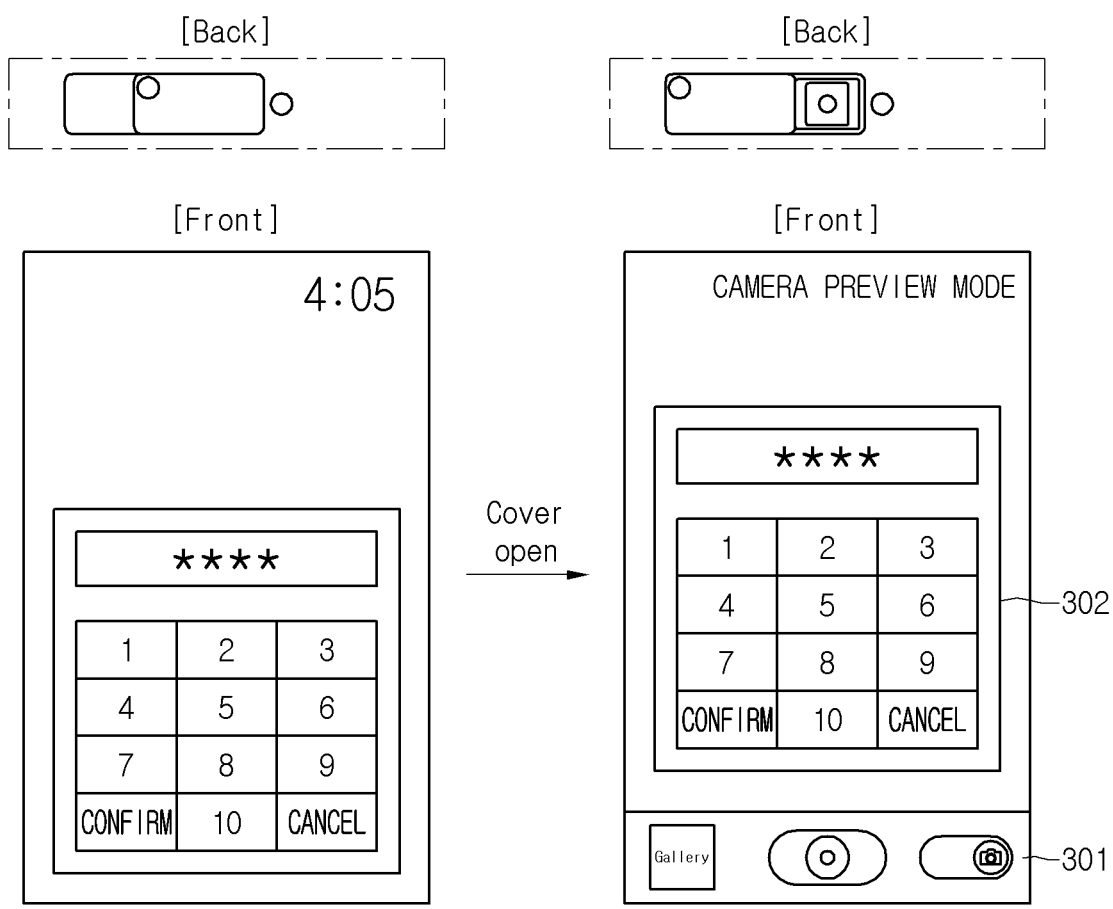
FIG. 12 is a view illustrating an image displayed on a display unit when a lens cover is opened in a display unit on and exceptional state.

First, FIG. 12 is a view illustrating an image displayed on a display unit when a lens cover is opened in a display unit on and exceptional state. In more detail, as operation S204 is performed in the display unit on and exceptional state, a camera preview mode interface is outputted on the display unit 151. As described above, as the camera application is executed, the capture mode interface 301 and the lock release interface 302 are displayed on the display unit 151. Although FIG. 12 illustrates an exemplary screen for inputting a 4-digit password as one example of various scenarios for lock release, other various lock release scenarios may be provided.

Figure 13:
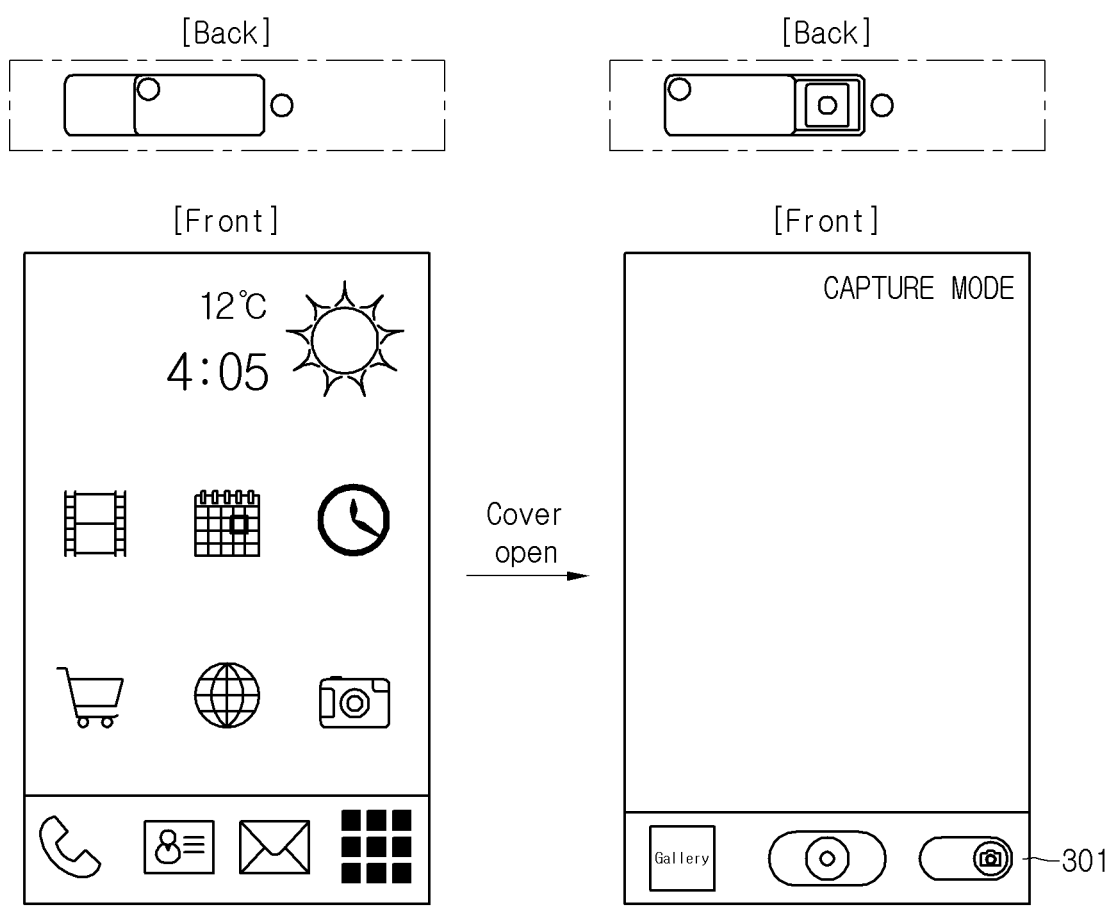
FIG. 13 is a view illustrating an image displayed on a display unit when a lens cover is opened in a display unit on and exceptional state.

Moreover, FIG. 13 is a view illustrating an image displayed on a display unit when a lens cover is opened in a display unit on and exceptional state. In more detail, as operation S207 is performed in the display unit on and normal state, a capture mode interface is provided. In this state, a user may perform capturing an image by short-touching or long-touching a capture icon.

Figure 14:
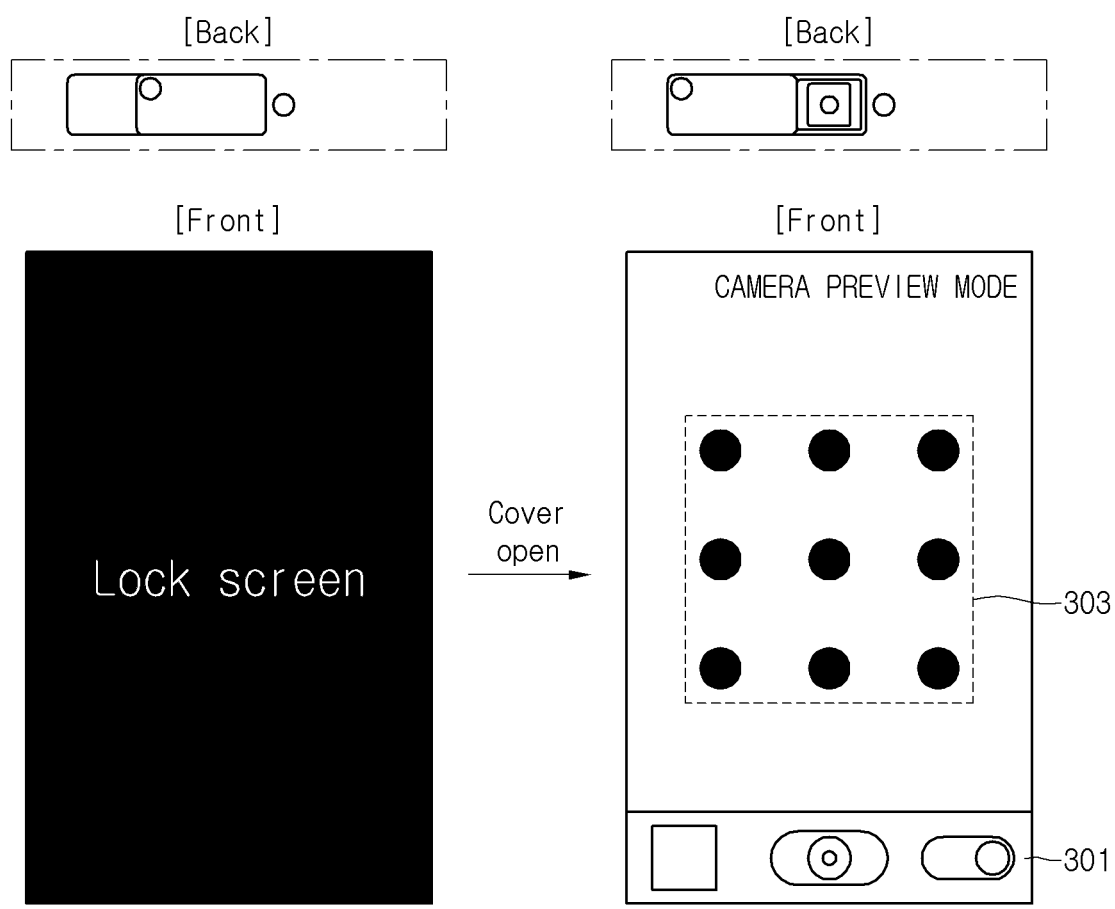
FIG. 14 is a view illustrating an image displayed on a display unit when a lens cover is opened in a display unit off and screen lock setting state.

Moreover, FIG. 14 is a view illustrating an image displayed on a display unit when a lens cover is opened in a display unit off and screen lock setting state. In more detail, while the display unit 151 is off and a screen lock is set, as operation S209 is performed with the lens cover 240 opened, the control unit 180 displays the display screen of the display unit 151 in the camera preview mode. That is, the screen of the display unit 151 in operation S209 is shown. In this state, the display unit 151 executes the camera application so that it outputs the capture mode interface 301 and the lock release interface 302 on the display unit 151. At this point, as one of various scenarios providing lock release, a lock release method for releasing a lock setting by dragging a pattern may be provided.

As shown in a state of FIG. 14, when a user performs a touch input for lock release to release a screen lock state, the screen lock state is released and it is possible to enter the capture mode. That is, the capture mode is selected.

Figure 15:
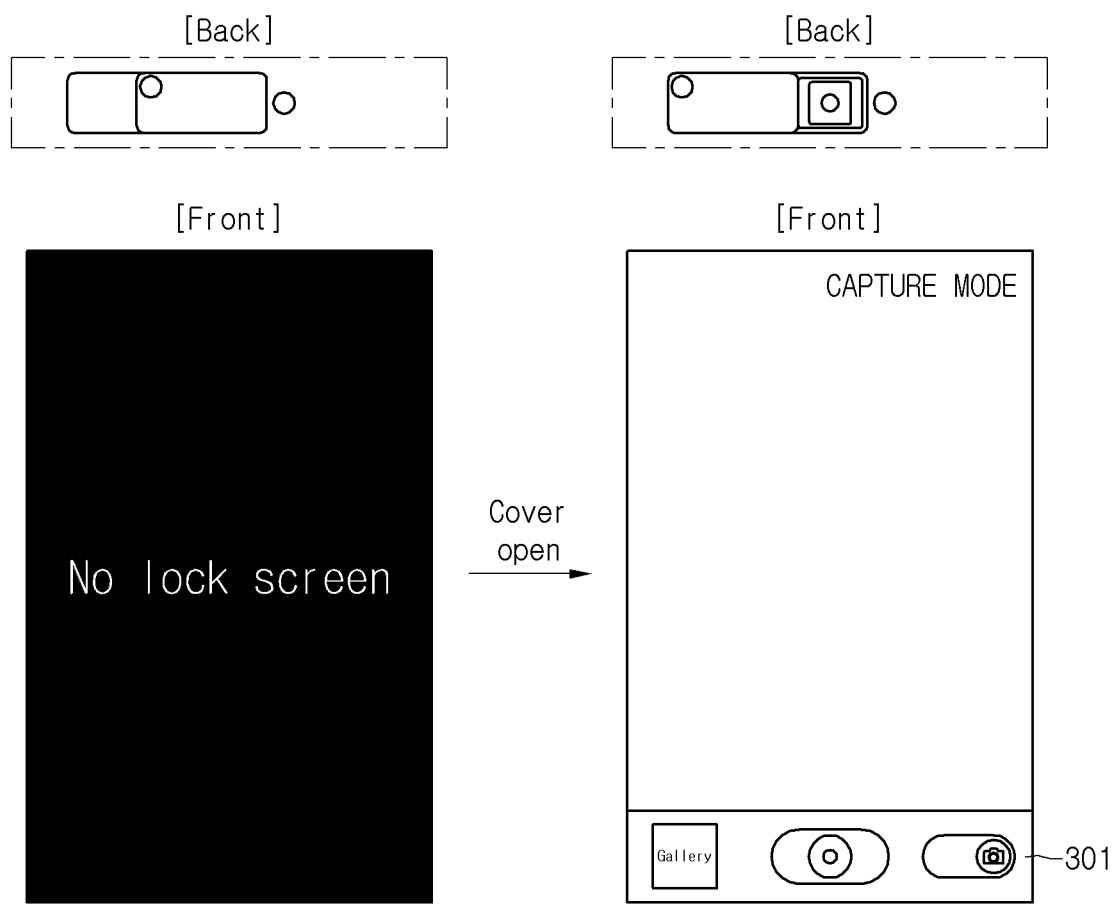
FIG. 15 is a view illustrating an image displayed on a display unit when a lens cover is opened in a display unit off and screen lock unsetting state.

Moreover, FIG. 15 is a view illustrating an image displayed on a display unit when a lens cover is opened in a display unit off and screen lock unsetting state. In more detail, in the display unit off and screen lock unsetting state, once an open signal for the lens cover 240 is inputted to the control unit 180, the control unit 180 executes the capture mode of the camera application to display the capture mode interface 301 on the display unit 151.

Figure 18:
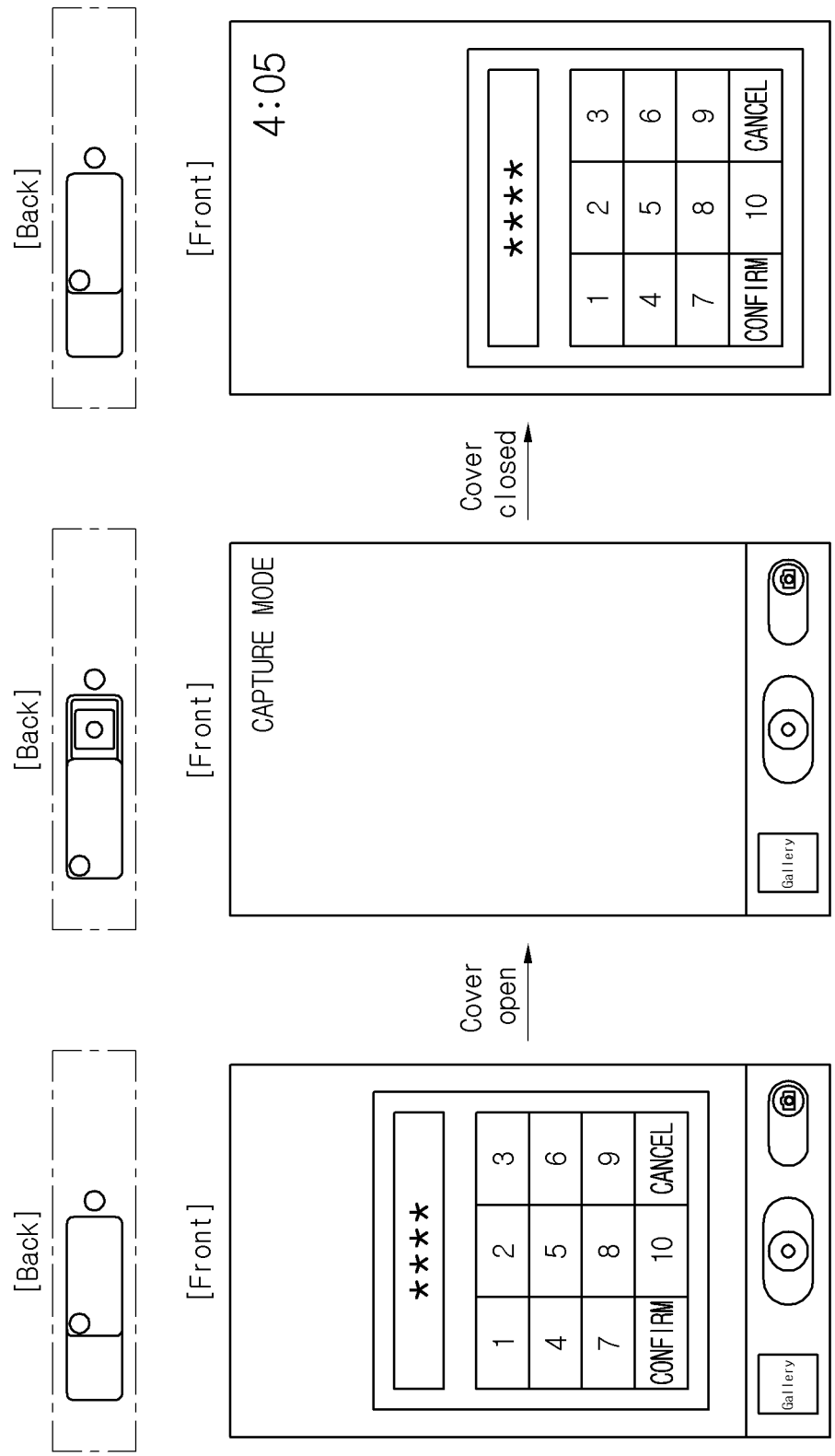
FIG. 18 is a view illustrating an image displayed on a display unit when a lens cover is opened and a screen lock state is released in a display unit on and exceptional state and then a capture mode is entered and the lens cover is closed again.
Figure 19:
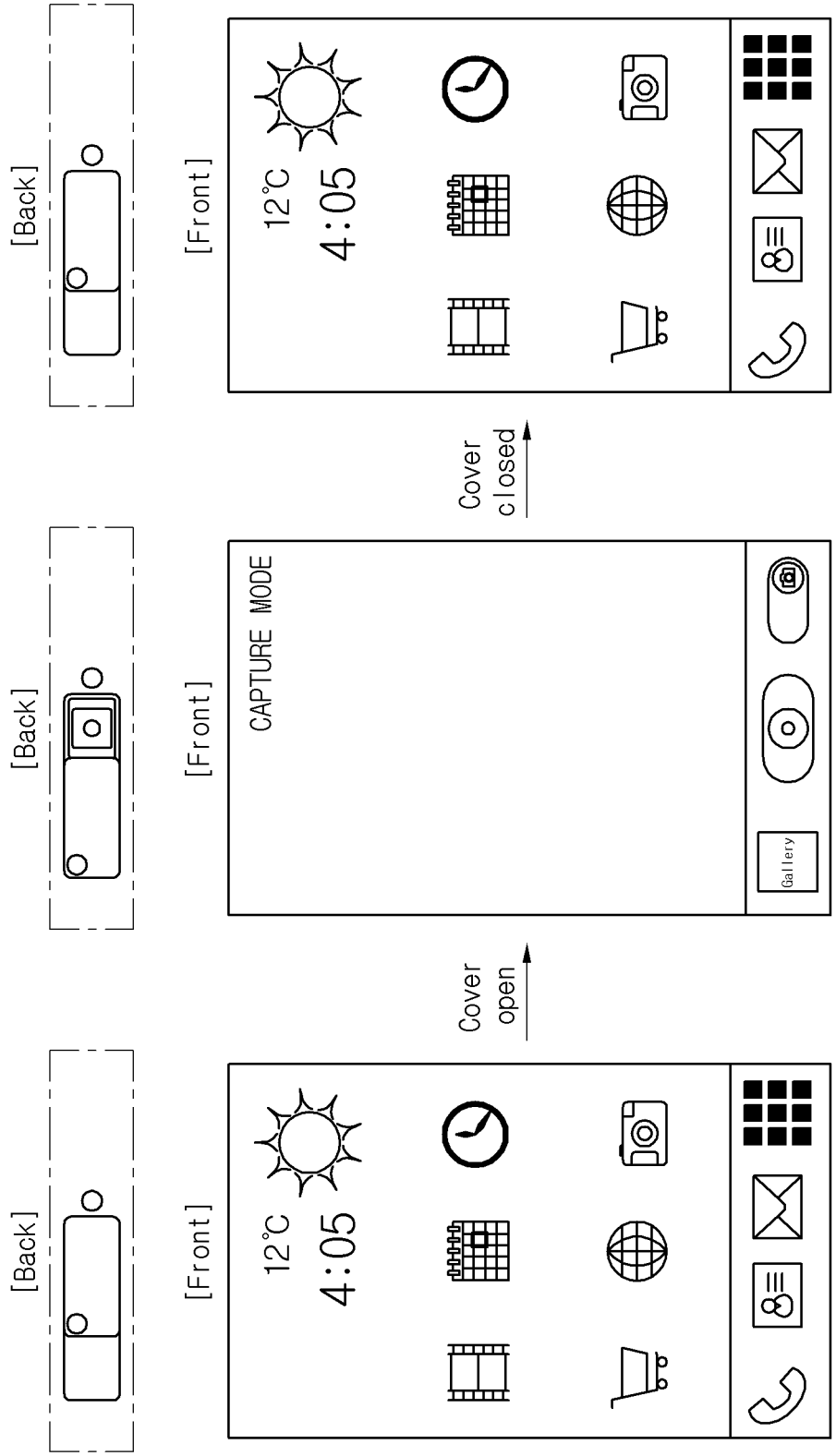
FIG. 19 is a view illustrating an image displayed on a display unit when a lens cover is opened and a screen lock state is released in a display unit on and normal state and then a capture mode is entered and the lens cover is closed again.
Figure 20:
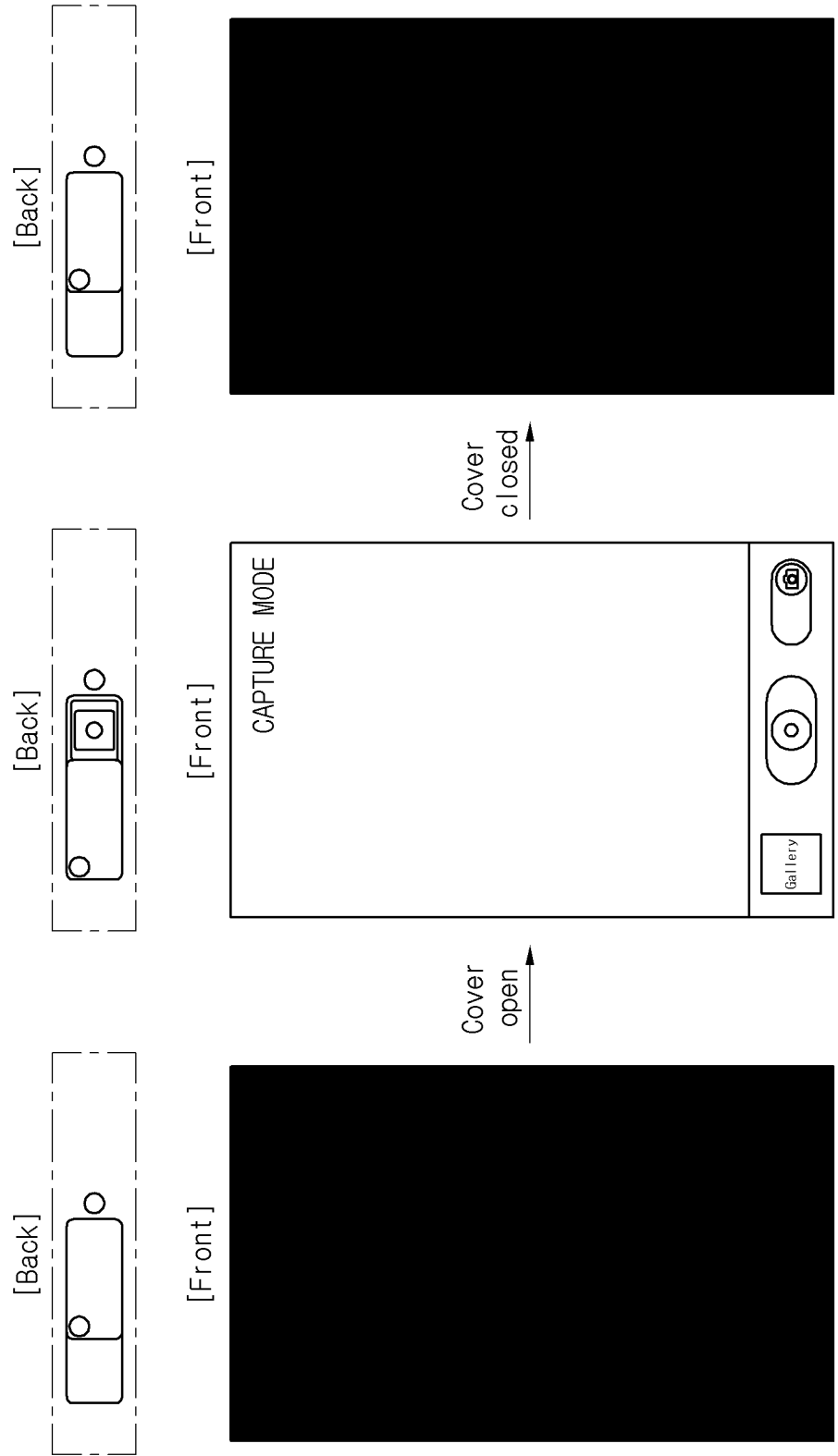
FIG. 20 is a view illustrating an image displayed on a display unit when a lens cover is opened and a capture mode is entered in a display unit off state and then the lens cover is closed again.

Hereinafter, referring to FIGS. 16 to 20, in contrast to those described so far, an operating method of a mobile terminal when the lens cover 240 is manipulated from an off state to an on state is described. In more detail, referring to FIGS. 16 and 17, while the camera application is not in execution, if an opened lens cover is closed, changes in a user interface are described. Referring to FIGS. 18 to 20, while the camera application is in execution, a display unit is shown when the opened lens cover is closed.

Figure 16:
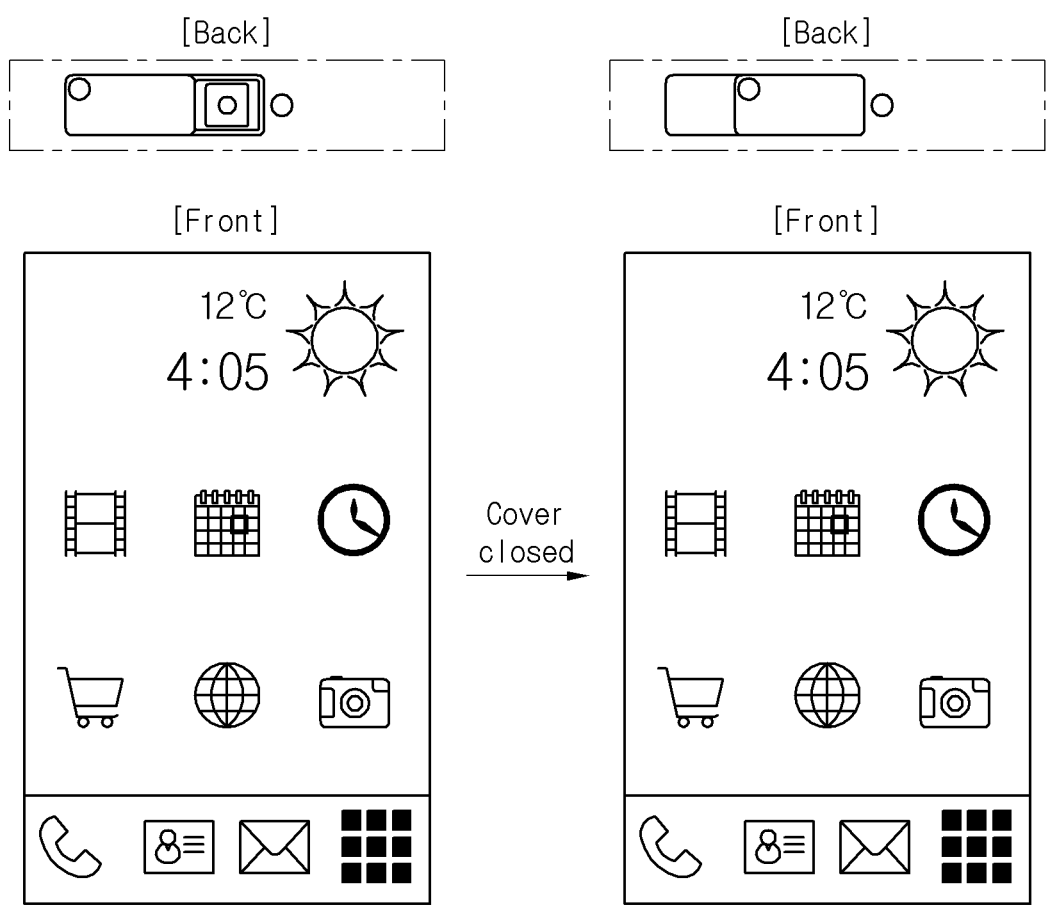
FIG. 16 is a view illustrating an image displayed on a display unit when an opened lens cover is closed in a display unit on and normal state.
Figure 17:
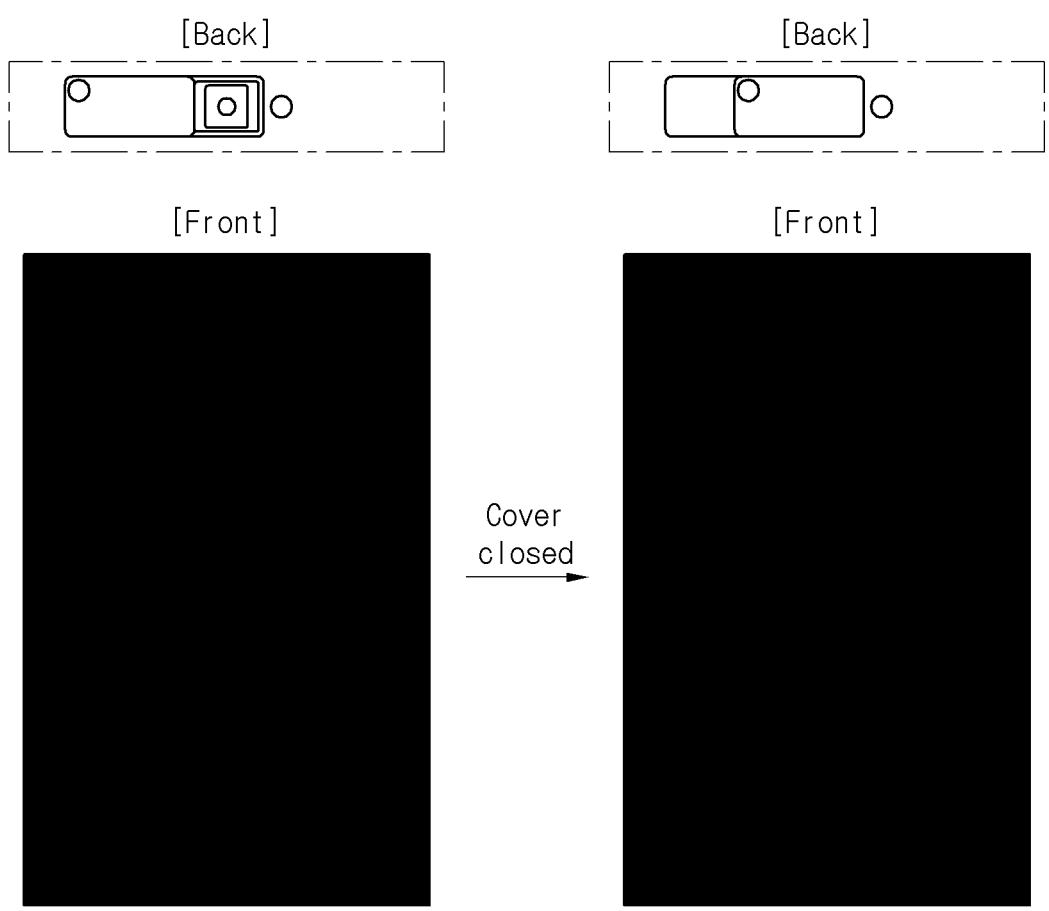
FIG. 17 is a view illustrating an image displayed on a display unit when an opened lens cover is closed in a display unit off state.

FIGS. 16 and 17 are views illustrating a user interface when the display unit 151 is on but does not enter a capture mode or a camera preview mode. FIGS. 18 and 19 are views illustrating a user interface when a control unit enters a capture mode or a camera preview mode.

Hereinafter, examples of FIGS. 16 to 20 are examined in order.

FIG. 16 is a view illustrating an image displayed on a display unit when an opened lens cover is closed in a display unit on and normal state. Referring to FIG. 16, when the display unit 151 is on and is not in a capture mode or a camera preview mode, even if the camera lens 121a is closed, a user interface does not change. That is, when the display unit 151 is on and is not in a capture mode or a camera preview mode, even if a close signal of the camera lens 121a is received, the control unit 180 does not perform an additional task for user interface switching.

As shown in FIG. 17, this is identical to the case that the display unit 151 is off. FIG. 17 is a view illustrating an image displayed on a display unit when an opened lens cover is closed in a display unit off state. When the display unit 151 is off and the lens cover 240 is closed, the display unit 151 maintains an off state continuously. That is, when the display unit 151 is off and is not in a capture mode or a camera preview mode, even if the camera lens 121a is closed, the control unit 180 does not perform an additional task for user interface switching.

Moreover, as shown in FIGS. 18 to 20, while the control unit 180 provides a user interface of a capture mode or a camera preview mode through the display unit 151, if the lens cover 240 changes from an on state into an off state, the control unit 180 display a screen before a capture mode or camera preview mode interface is displayed through the display unit 151.

FIG. 18 is a view illustrating an image displayed on a display unit when a lens cover is opened and a screen lock state is released in a display unit on and exceptional state and then a capture mode is entered and the lens cover is closed again. Referring to FIG. 18, when a capture mode is entered through operation S206 of FIG. 10 described above by releasing a screen lock in operation S204, as a closed signal of the lens cover 240 is received, the control unit 180 terminates a camera preview mode and displays an image before switching into the camera preview mode. That is, an image guiding a screen lock state is outputted. However, in the case of swipe, a lock release screen is displayed in addition to a lock released screen.

FIG. 19 is a view illustrating an image displayed on a display unit when a lens cover is opened and a screen lock state is released in a display unit on and normal state and then a capture mode is entered and the lens cover is closed again. Referring to FIG. 18, when a capture mode is entered through operation S207 of FIG. 8 described above, as a closed signal of the lens cover 240 is received, the control unit 180 terminates a capture mode and displays an image before switching into the capture mode.

FIG. 20 is a view illustrating an image displayed on a display unit when a lens cover is opened and a capture mode is entered in a display unit off state and then the lens cover is closed again. Referring to FIG. 20, when a camera preview mode or a capture mode is outputted on the display unit 151 through operation S212 of FIG. 10 described above, as a closed signal of the lens cover 240 is received, the control unit 180 terminates a preview mode or a capture mode and turns off the display unit 151, thereby returning to an original off state of the display unit 151.

Figure 21:
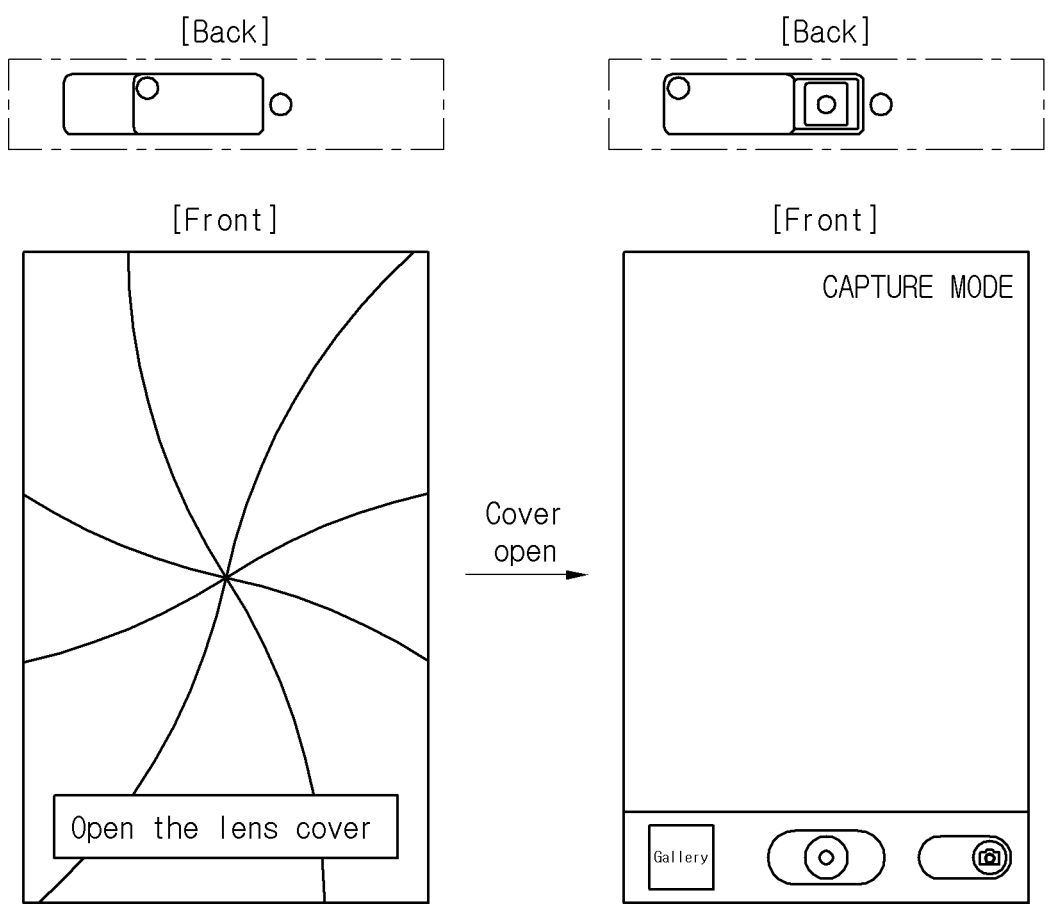
FIG. 21 is a view illustrating an image displayed on a display unit when a camera application is executed but a lens cover is closed.

Moreover, FIG. 21 is a view illustrating a user interface when the lens cover 240 is maintained in a closed state and capturing is impossible although a camera application is executed through an operation of a mobile terminal. In such a case, the control unit 180 may output a guide message "lens cover is closed" or "open lens cover" through a display unit.

In this state, when lens cover 240 is opened by an operation of a user, the control unit 180 may output an image displaying this, for example, an animation representing that the camera's shutter is opened.

Moreover, when the lens cover is opened in operation S207 or S212, the control unit 180, the control unit 180 is set to capture an image so that fast capturing is possible. At this point, capturing is made when the lens cover is opened or after a time delay of a predetermined time. For example, first capturing may be set to be performed after 1 sec when the lens cover is opened.

Figure 22:
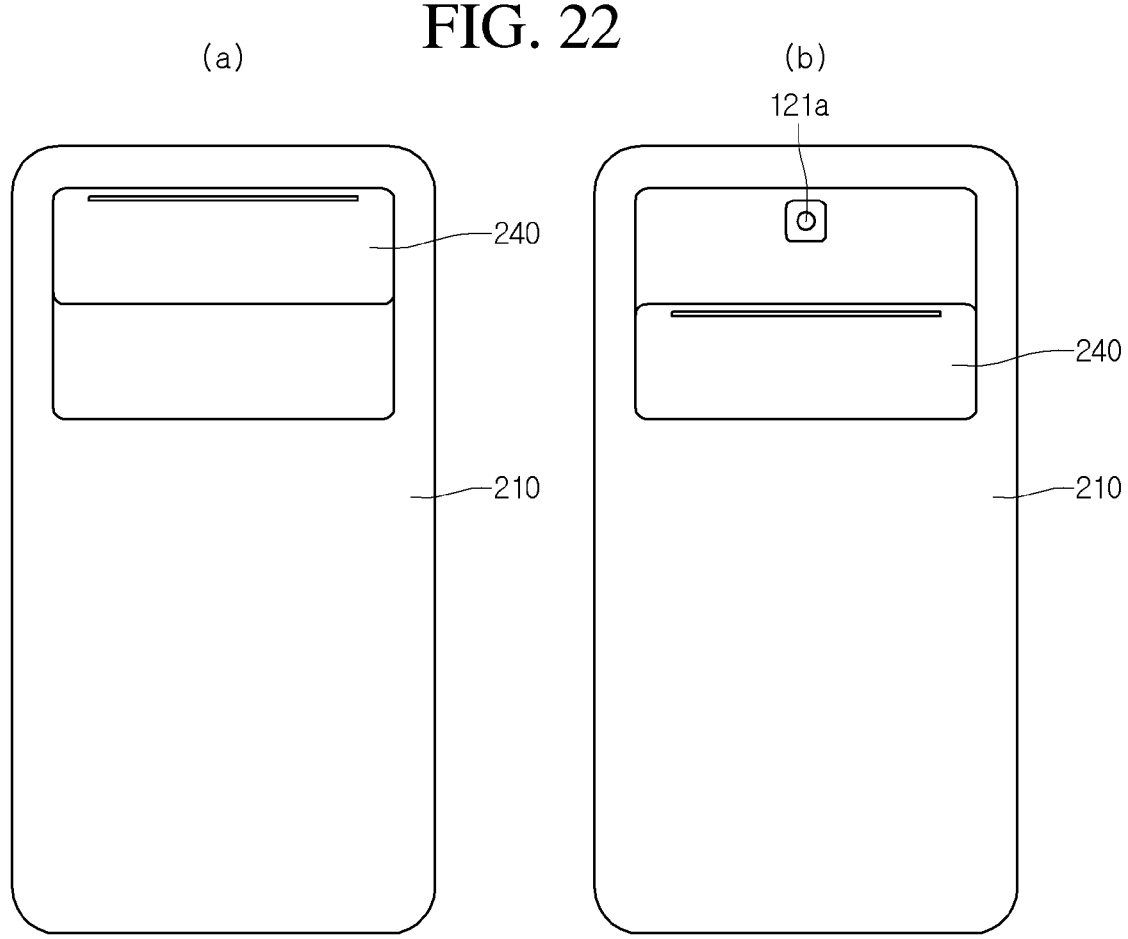
FIG. 22 is a view illustrating a mobile terminal according to another embodiment of the present invention.

Moreover, the lens cover 240 according to an embodiment of the present invention may be configured to horizontally slide along the first direction as described with reference to FIG. 3 to 21 or may be configured to vertically slide along the second direction as shown in FIG. 22. Even if the lens cover 240 is opened or closed vertically, an operation of a mobile terminal according to the opened or closed state of the lens cover 240 should be understood as being identical to an operation when the lens cover 240 moves horizontally.

Figure 23:
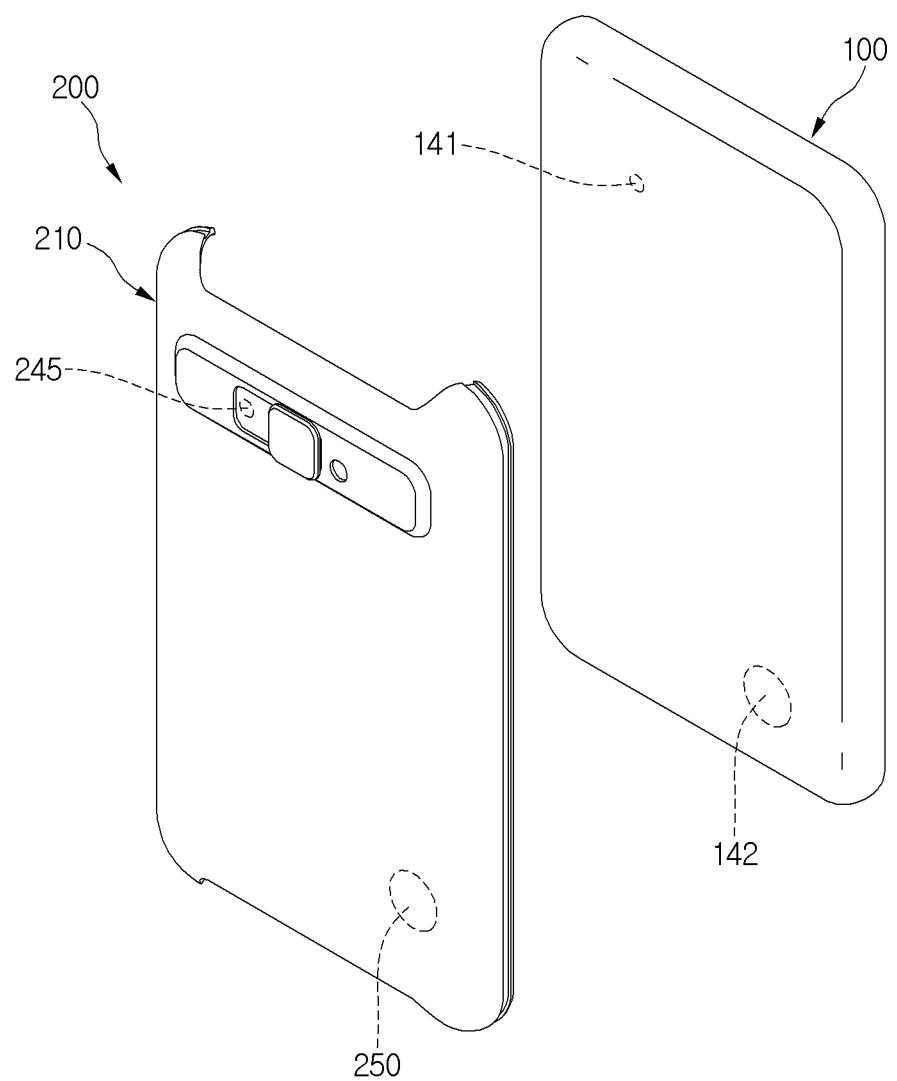
FIG. 23 is a perspective view when a terminal case includes a coupling detection magnet and a mobile terminal includes a case coupling sensing unit for sensing the approach of the coupling detection magnet.

Moreover, as shown in FIG. 23, the terminal case 200 includes a coupling detection magnet 250 and the mobile terminal 100 includes a case coupling sensing unit 142 for sensing whether the terminal case 200 is coupled by sensing the approach of the coupling detection magnet 250.

That is, the mobile terminal 100, as described with reference to the block diagram of FIG. 1, may include the lens cover sensing unit 141 and the case coupling sensing unit 142. The terminal coupling unit 210 of the terminal case 200 includes the lens cover magnet 245 and the coupling detection magnet 250.

Accordingly, the lens coupling sensing unit 142 in the sensing unit 140 may sense whether the mobile terminal 100 is coupled with the terminal case 200 and the control unit 180 may provide various user interfaces or various applications on the basis of the sensing information.

Hereinafter, referring to FIGS. 24 and 25, an operating method of the mobile terminal 100 equipped with the coupling detection magnet 250 is described in more detail.

First, when a battery remaining is less than a reference value and the lens cover 240 is opened, low battery information is displayed. This case is described with reference to FIG. 24. FIG. 24 is a flowchart for illustrating such an example.

Figure 24:
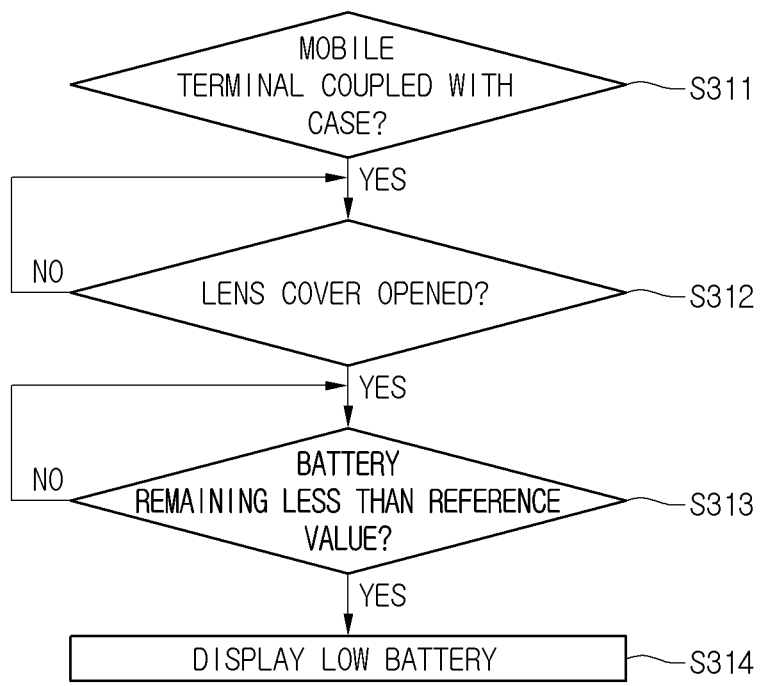
FIG. 24 is a flowchart illustrating a control method of displaying low battery when a lens cover is opened.

Referring to FIG. 24, the control unit 180 determines whether the mobile terminal 100 is coupled with the case 200 on the basis of the detection information of the case coupling sensing unit 142 in operation S311.

Additionally, on the basis of the detection information of the lens cover sensing unit 141, it is determined whether the lens cover 240 is opened in operation S312.

Additionally, on the basis of a signal from the power supply unit 190, it is determined whether a battery remaining is less than a reference value in operation S313.

When a mobile terminal is coupled with a case and a lens cover is opened, if it is determined that a battery remaining is less than a reference value, the control unit 180 displays a message that the battery remaining is low through the display unit 151 in operation S314.

At this point, the message that the battery remaining is low is a sentence or a sound signal meaning that the battery remaining is insufficient. Additionally, a battery display may be enlarged and displayed through a display unit. A method of displaying a low battery may be various besides the above method.

Figure 25:
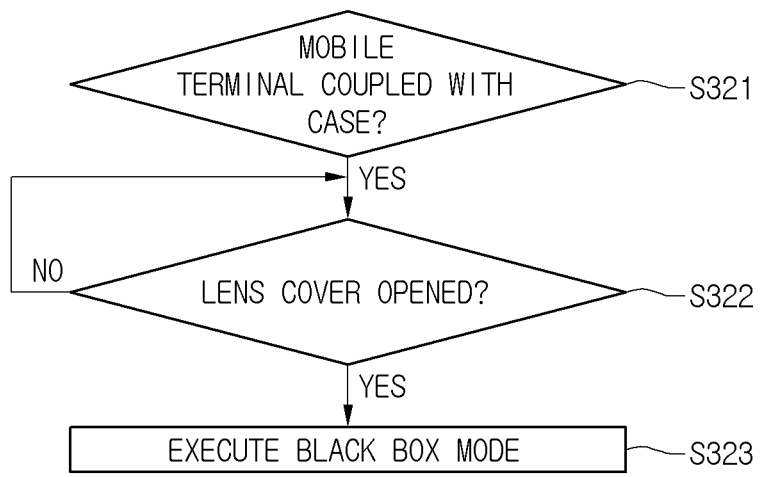
FIG. 25 is a flowchart illustrating a control method of executing a block box mode when a lens cover is opened.

Moreover, in the case that a terminal case is mounted at a vehicle, as shown in FIG. 25, the mobile terminal 100 is mounted at the case 200 and a black box mode is automatically executed if the lens cover 240 is opened. FIG. 25 is a flowchart for illustrating an example of a block box mode in execution.

Referring to FIG. 25, the control unit 180 determines whether the mobile terminal 100 is coupled with the case 200 attached to a vehicle on the basis of the sensing information of the case coupling sensing unit 142 in operation S321.

Then, on the basis of the sensing information of the lens cover sensing unit 141, it is determined whether the lens cover 240 is opened in operation S322.

When it is determined that the mobile terminal 100 is coupled with the case attached to the vehicle and the lens cover 240 is opened, the control unit 180 executes the black box mode in operation S323. Here, executing the black box mode may be executing a black box application or a video recording function of a camera application.

Moreover, although the terminal case 200 includes the terminal coupling part 210, the front cover part 220, and the connection part 290 according to this embodiment of the present invention, the terminal case 200 may only include the terminal coupling 210 without the front cover part 220 and the connection part 290.

Second Embodiment

Moreover, a mobile terminal assembly according to the second embodiment of the present invention includes a mobile terminal 100 and a terminal case 200 detachable from the mobile terminal 100.

Figure 26:
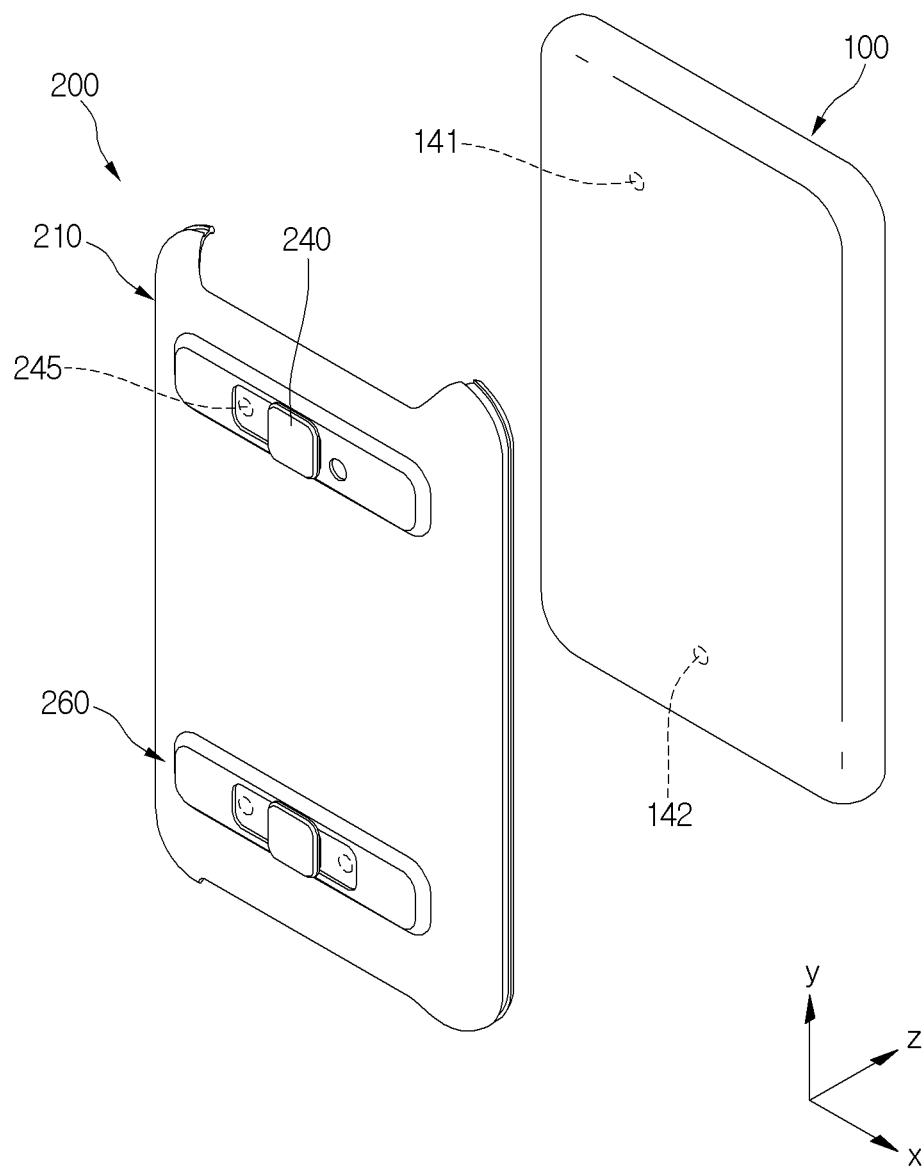
FIG. 26 is an exploded perspective view illustrating a terminal cover and a mobile terminal according to a second embodiment of the present invention.

FIG. 26 is an exploded perspective view illustrating the terminal case 200 and the mobile terminal 100 detachable from the terminal case 200 according to the second embodiment of the present invention. FIG. 27 is a side view of a button part 260. FIG. 28 is a view illustrating an operating state of the button part 260.

Although only the terminal coupling part 210 of the terminal case 200 is shown in FIG. 26, the terminal case 200 may include the front cover part 220 and the connection part 230 like the first embodiment. Additionally, the terminal case 200 includes only the terminal coupling part 210 without the front cover part 220 and the connection part 230.

Hereinafter, referring to FIGS. 26 to 33, the coupling detection magnet 250 equipped at the terminal case 200 includes a plurality of magnetic bodies having different polarities and the case coupling sensing unit 142 built in the mobile terminal 200 senses the polarity of a magnet. A control unit executes a preset application or display a user interface on the basis of the sensing value.

First, referring to FIG. 26, the terminal case 200 further includes coupling detection magnetic bodies 265N and 265S for sensing the coupling of the mobile terminal 100 and the terminal case 200 in addition to the lens cover magnet 245 for sensing the opened or closed state of the lens cover 240. The coupling detection magnetic bodies 265N and 265S are disposed at the button part 260. The terminal case 200 described with reference to FIG. 26 has the same configuration as that in the first embodiment except for the button part 260 added. Therefore, overlapping description other than the button part 260 is omitted.

Hereinafter, referring to FIG. 27, a configuration of the button part 260 is described in more detail. FIG. 27 is a side view of the button part 260.

Referring to FIGS. 27 to 8, the button part 260 includes an inner part 261 disposed inside the terminal coupling unit 210 and an outer part 263 disposed outside the case body 220. Additionally, the button part 260 further includes a middle part 262 disposed between the outer part 263 and the inner part 26. The inner part 261 and the outer part 263 may all have a plate shape.

The outer part 263 may extend shorter than the inner part 261 along the first direction, that is, a sliding direction. Additionally, the middle part 262 may extend shorter than the inner part 241. The outer part 263 and the middle part 262 are disposed at the first direction center of the inner part 261 extending long.

Moreover, the second direction length of the lens cover 240 is identical to that in the first embodiment of FIG. 6. That is, the inner part 261 and the outer part 263 have the same second direction length and the middle part 262 is the shorter than those. That is, the second direction length of the middle part 262 is relatively shorter than that of the inner part 261 and the outer part 263. Accordingly, the lens cover 240 has a form in which the middle part 262 between the inner part 261 and the outer part 263 is concavely and inwardly recessed along the second direction as seen from the first direction, that is, the sliding direction.

Moreover, an elastic protrusion 246 protruding in the second direction is coupled with the inner part 261. The elastic protrusion 246 is elastically deformable. Accordingly, if there is no external force, the elastic protrusion 246 protrudes toward the outside but if an external force is applied in the second direction, retreats toward the inside.

Moreover, the coupling detection magnetic bodies 265N and 265S are coupled with the lens cover 240. The coupling detection magnetic bodies 265N and 265S may include a plurality of magnetic bodies having different polarities. For example, the coupling detection magnetic bodies 265N and 265S may include a first polar magnet 265N having a first polarity and a second polar magnet 265S having a second polarity. The first polarity may be the N pole and the second polarity may be the S pole.

The magnet 250 is coupled with the vicinity of both end parts of the inner part 261. That is, the first polar magnet 265N is coupled with one end of the inner part 261 and the second polar magnet 265S is coupled with the other end of the inner part 261.

The approach of the coupling detection magnetic bodies 265N and 265S is sensed by the case coupling sensing unit 142 built in the mobile terminal 100 and this may serve to allow the control unit 180 to recognize the opened or closed state of the lens cover 240.

Moreover, the button part 260 may be coupled with the case body 210 of the terminal case 200. For this, a structure similar to that of the above-mentioned lens cover mounting part 230 is prepared at the mounting position of the button part 260. Accordingly, the button part mounting part where the button part 260 is mounted is not described.

Additionally, as mentioned above, the terminal case 200 described with reference to FIG. 26 has the same configuration as that in the first embodiment except for the button part 260 added. Therefore, overlapping description other than the button part 200 is omitted.

Hereinafter, the mobile terminal 100 coupled with the terminal case 200 is described with reference to FIG. 26. The mobile terminal 100 includes a case coupling sensing unit 142 for sensing the approach of the coupling detection magnet 250 mounted at the button part 260. Moreover, the case coupling sensing unit 142 may be a hall sensor. The hall sensor may be disposed at a position corresponding to the center of the button part 260. That is, the hall sensor may be disposed at the first direction center of the mobile terminal 100.

Hereinafter, referring to FIG. 28, a positional relationship between the magnetic bodies 265N and 265S coupled with the button part 260 and the case coupling sensing unit 142 is described.

FIG. 28A is a view when the first polar magnet 265N having the N pole is adjacent to the inside of the detection area of the case coupling sensing unit 142 and FIG. 28B is a view when the second polar magnet 265S having the S pole is adjacent to the inside of the detection area of the case coupling sensing unit 142.

The button part 260 is movable along the first direction. As shown in FIG. 28A, as the button part 260 moves to the right, the second polar magnet 265S becomes away from the case coupling sensing unit and the first polar magnet 265N becomes closer to the case coupling sensing unit 142. When the button part 260 slides all the way to the right, the first polar magnet 265N exists in the detection area of the case coupling sensing unit 142. The case coupling sensing unit 142 may detect the magnetic field of the first polar magnet 142. Hereinafter, the position of the button part 260 when the magnetic field of the first polar magnet 142 is sensed by the case coupling sensing unit 142 is called a first position of the button part 260. The button part 260 may be fixed at the first position by the elastic protrusion 266. The principle that the position is fixed by the elastic protrusion 266 is identical to that in the sliding and fixing of the lens cover 240 according to the first embodiment of the present invention. Therefore, its overlapping description is omitted.

Moreover, when a user presses the outer part 264 to the left and thus button part 260 slides to the left as shown in FIG. 28B, the second polar magnet 265S enters the sensing area of the case coupling sensing unit 142. At this point, the position of the button part 260 is called a second position. Moreover, the button part 260 may be fixed at the second position by the elastic protrusion 266. The principle that the position is fixed by the elastic protrusion 266 is identical to that in the above. Therefore, its overlapping description is omitted.

Moreover, according to whether the button part 260 is disposed at the first position or the second position and whether the lens cover 240 is opened or closed, a preset user interface may be displayed on the display unit 151 of the mobile terminal 100 or a preset application may be executed.

That is, the control unit 180 may execute a preset application or display a preset user application on the basis of the sensing information received from the lens cover sensing unit 141 and the position information on the button part 260 received from the case coupling sensing unit 142.

Hereinafter, various operating methods of the mobile terminal 100 are described on the basis of the open/close information on the lens cover 240 and the position information on the button part 260.

Figure 29:
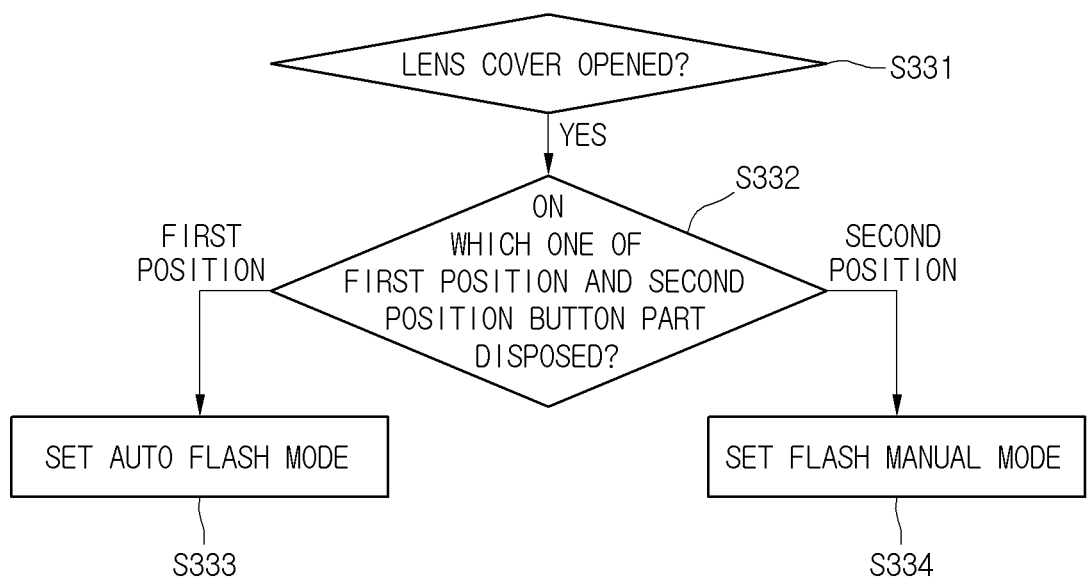
FIG. 29 is a flowchart illustrating a method of setting a flash mode of a camera application when a lens cover is opened.

First, referring to FIG. 29, an example of setting a flash operating mode when a camera application is in execution is described. FIG. 29 is a flowchart for illustrating such an example.

The control unit 180 determines whether a lens cover is opened on the basis of the sensing information of the lens cover sensing unit 141 in operation S331.

Additionally, the control unit 180 determines whether the button part 260 is disposed at the first position or the second position on the basis of the sensing information of the case coupling sensing unit 142 in operation S332.

If it is determined that the lens cover is opened and the button part 260 is disposed at the first position, the control unit 180 sets an auto flash mode in operation S333. Then, the control unit 180 executes a camera application in the auto flash mode. That is, when entering the capture mode described in the first embodiment, a flash is automatically set to the auto flash mode. For reference, when the flash is in the auto flash mode, if it is determined that there is no sufficient light by sensing the amount of light around, the flash may operate automatically.

However, if it is determined that the lens cover is opened and the button part 260 is disposed at the second position, the control unit 180 sets a manual flash mode in operation S334. Then, the control unit 180 executes a camera application in the auto flash mode. That is, when entering the capture mode described in the first embodiment, the flash is set to the manual flash mode. Accordingly, even if there is no sufficient light during capturing, the flash does not operate automatically and is only operated by a user's manipulation.

Figure 30:
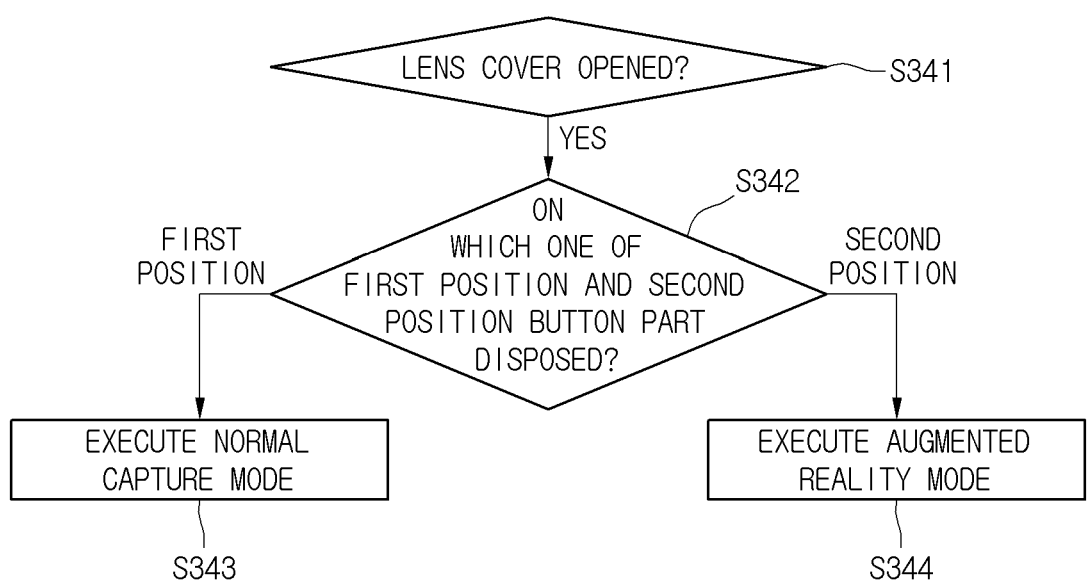
FIG. 30 is a flowchart illustrating a method of executing at least one mode among a normal capture mode and an augmented reality mode when a lens cover is opened.

Moreover, when the lens cover 240 is opened and a camera application is executed, the mobile terminal may operate in an augmented reality mode. That is, according to the position of the button part 260, when the lens cover 240 is opened, the control unit 180 may execute the camera application in one of a normal capture mode or an augmented reality mode. FIG. 30 is a flowchart for illustrating such an example.

Hereinafter, referring to FIG. 30, entering an augmented reality mode during the execution of a camera application is described.

First, the control unit 180 determines whether a lens cover is opened on the basis of the sensing information of the lens cover sensing unit 141 in operation S341.

Additionally, the control unit 180 determines whether the button part 260 is disposed at the first position or the second position on the basis of the sensing information of the case coupling sensing unit 142 in operation S342.

If it is determined that the lens cover is opened and the button part 260 is disposed at the first position, the control unit 180 executes a normal capture mode in operation S343. That is, an interface for one of the capture mode and the camera preview mode described in the first embodiment is displayed on the display unit 151.

If it is determined that the lens cover is opened and the button part 260 is disposed at the second position, the control unit 180 executes a normal capture mode in operation S344. For example, when the camera application is executed, information on a background building may be displayed on the display unit 151 by turning on a GPS.

Moreover, when the lens cover 240 is opened, as entering the capture mode, the mobile terminal may be set to execute a capturing region marking mode. FIG. 31 is a flowchart for illustrating such an example.

Hereinafter, referring to FIG. 31, when the camera application is executed by opening the lens cover, one of the normal capture mode and the photographing display mode is selected. This is described with an example.

First, the control unit 180 determines whether a lens cover is opened on the basis of the sensing information of the lens cover sensing unit 141 in operation S351.

Additionally, the control unit 180 determines whether the button part 260 is disposed at the first position or the second position on the basis of the sensing information of the case coupling sensing unit 142 in operation S352.

If it is determined that the lens cover is opened and the button part 260 is disposed at the first position, the control unit 180 executes the camera application in the normal capture mode in operation S353. At this point, entering the normal capture mode means entering the capture mode described in the first embodiment.

However, if it is determined that the lens cover is opened and the button part 260 is disposed at the second position, the control unit 180 executes the camera application in the capturing region marking mode in operation S354.

As entering the capturing region marking mode, the control unit 180 obtains current position information by turning on a GPS and displays this information during photographing. Additionally, the captured picture may be stored together with the position information. That is, location based service may be provided to the captured picture.

Moreover, when the lens cover 240 is opened, the mobile terminal may execute the camera application in the normal capture mode or may enter the camera lock mode to limit the execution of the camera application. FIG. 32 is a flowchart for illustrating such an example.

Hereinafter, referring to FIG. 32, when the camera application is executed by opening the lens cover, one of the normal capture mode and the camera lock mode is selectively executed. This is described with an example.

First, the control unit 180 determines whether a lens cover is opened on the basis of the sensing information of the lens cover sensing unit 141 in operation S361.

Additionally, the control unit 180 determines whether the button part 260 is disposed at the first position or the second position on the basis of the sensing information of the case coupling sensing unit 142 in operation S362.

If it is determined that the lens cover is opened and the button part 260 is disposed at the first position, the control unit 180 executes the camera application in the normal capture mode in operation S363.

On the other hand, if it is determined that the lens cover is opened and the button part 260 is disposed at the second position, the control unit 180 enters a camera lock mode in operation S364. That is, even when the lens cover 240 is opened, the camera application is not executed. Accordingly, when the mobile terminal is in use, even if a user opens the lens cover 240 by mistake, the execution of the camera application may be limited.

Figure 33:
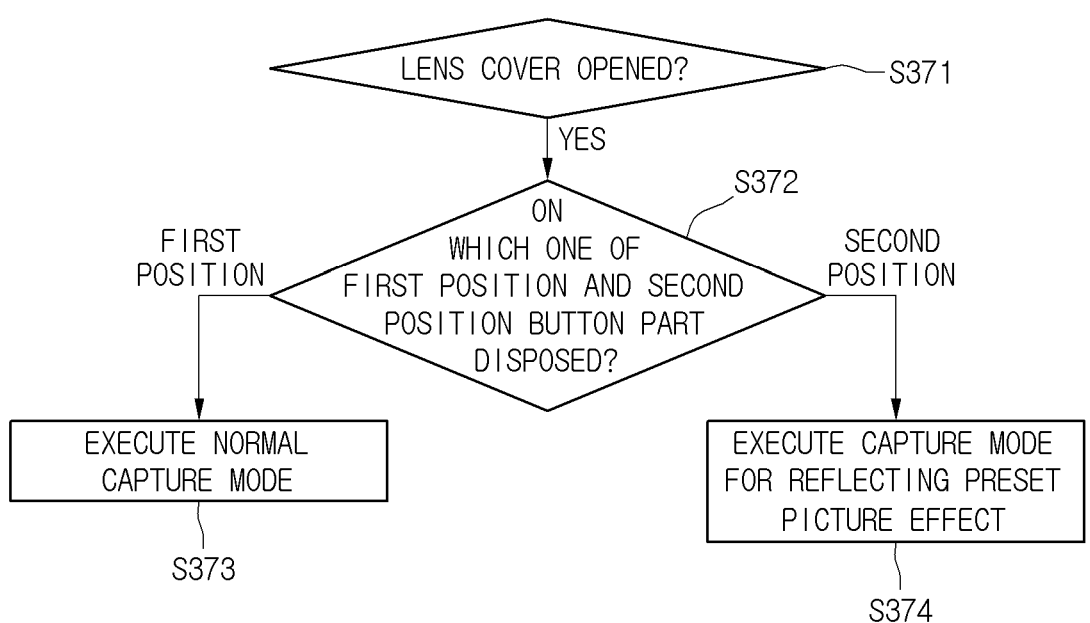
FIG. 33 is a flowchart illustrating a method of executing at least one mode among a normal capture mode and a capture mode for reflecting a preset photo effect when a lens cover is opened.

Moreover, when the lens cover 240 is opened, as entering the capture mode, the mobile terminal may preset a frequently used photo effect and then may automatically execute the preset effect. FIG. 33 is a flowchart for illustrating such an example.

Hereinafter, referring to FIG. 33, when the camera application is executed by opening the lens cover, one of the normal capture mode and the capture mode reflecting a preset photo effect is selectively executed. This is described with an example.

First, the control unit 180 determines whether a lens cover is opened on the basis of the sensing information of the lens cover sensing unit 141 in operation S371.

Additionally, the control unit 180 determines whether the button part 260 is disposed at the first position or the second position on the basis of the sensing information of the case coupling sensing unit 142 in operation S372.

If it is determined that the lens cover is opened and the button part 260 is disposed at the first position, the control unit 180 executes the camera application in the normal capture mode in operation S373.

However, if it is determined that the lens cover is opened and the button part 260 is disposed at the second position, the control unit 180 selects the capture mode reflecting a preset photo effect and executes the camera application in operation S374.

Third Embodiment

Figure 35:
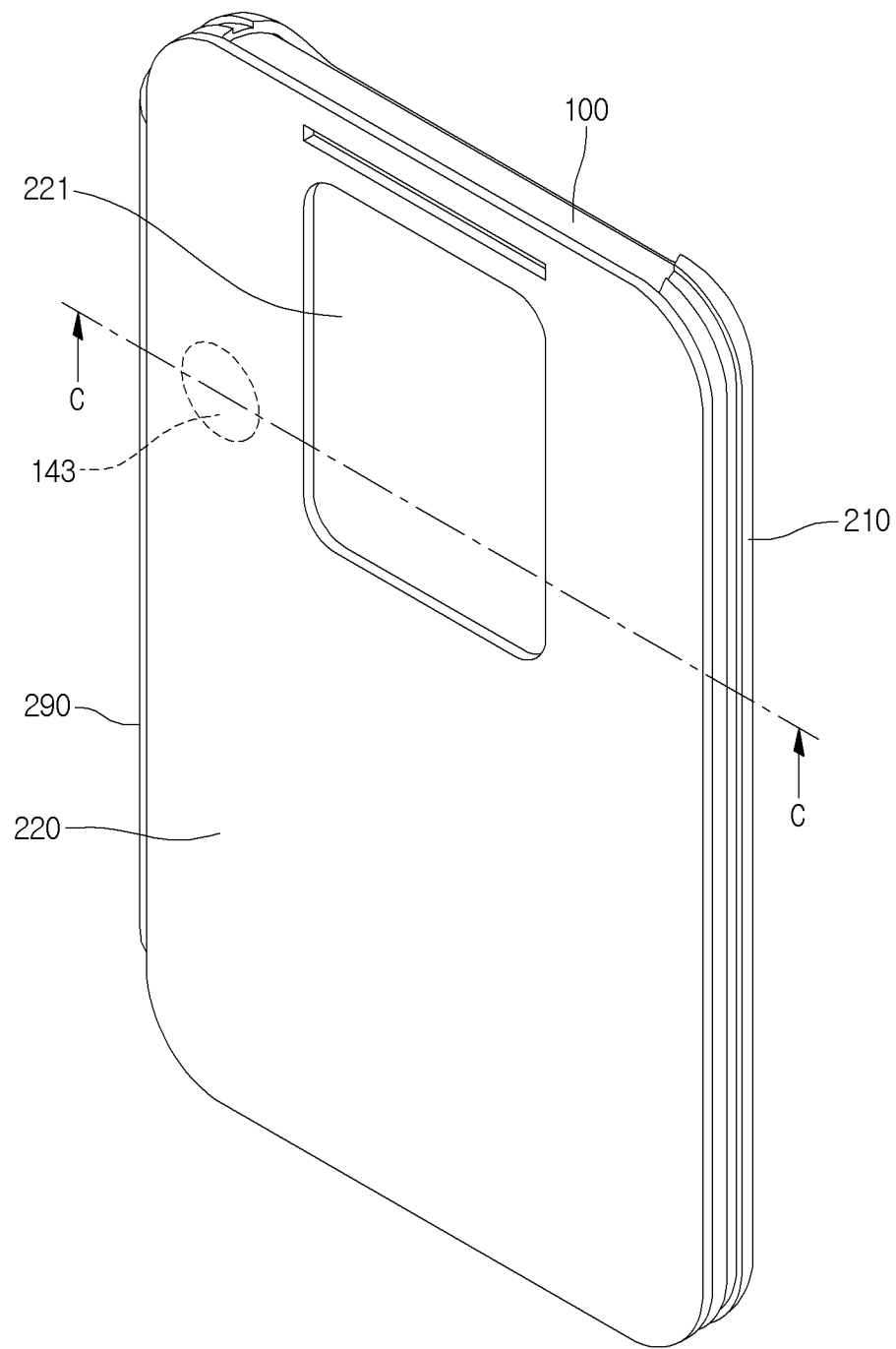
FIG. 35 is a perspective view when a mobile terminal is coupled with a terminal case of FIG. 34.

Referring to FIGS. 34 and 35, a mobile terminal assembly according to the third embodiment of the present invention includes a mobile terminal 100 and a separate terminal case 200 detachable from the mobile terminal 100.

FIG. 34 is a perspective view illustrating the terminal case 200 according to the third embodiment of the present invention. FIG. 35 is a perspective view when the terminal case 200 is coupled with the mobile terminal 100 according to the third embodiment of the present invention.

The terminal case 200 includes a terminal coupling part 210 allowing the mobile terminal 100 to be detachable and a front cover part 220 foldably coupled with the terminal coupling part 210 to cover the front of the mobile terminal 100.

Additionally, the terminal case 200 further comprises a connection part 290 connecting the terminal coupling part 210 and the front cover part 220.

When each configuration of them is described in more detail, the terminal coupling part 210 may be identical to that in one of the first embodiment and the second embodiment.

The front cover part 220 may be formed of a plate member having a form corresponding to the front of the mobile terminal 100. The front cover part 220 includes a front incision part 221. The front incision part 221 is formed by incising a portion of the front cover part 220. Accordingly, a user may see an image or video displayed on the display unit 151 of the mobile terminal 100 and may perform a touch input through the front incision part 221.

The front cover magnet 222 may be mounted at the front cover part 220. When the front cover magnet 222 is mounted at the front cover part 220, changes in the magnetic field occur as the front cover 220 is opened or closed. This may be detected by the mobile terminal 100.

Additionally, a surface of the front cover part 220 contacting the front of the mobile terminal 100 may be processed to prevent static electricity thereby preventing an unintended touch input of a user. A static electricity preventing material may be applied or a static electricity preventing film may be attached to the front cover part 220, so as to prevent static electricity.

Hereinafter, a structure of the mobile terminal 100 according to the third embodiment of the present invention will be described with reference to FIGS. 35 and 36. The mobile terminal 100 includes a front cover sensing unit 143 for sensing whether the front cover part 220 is opened or closed.

Figure 36:
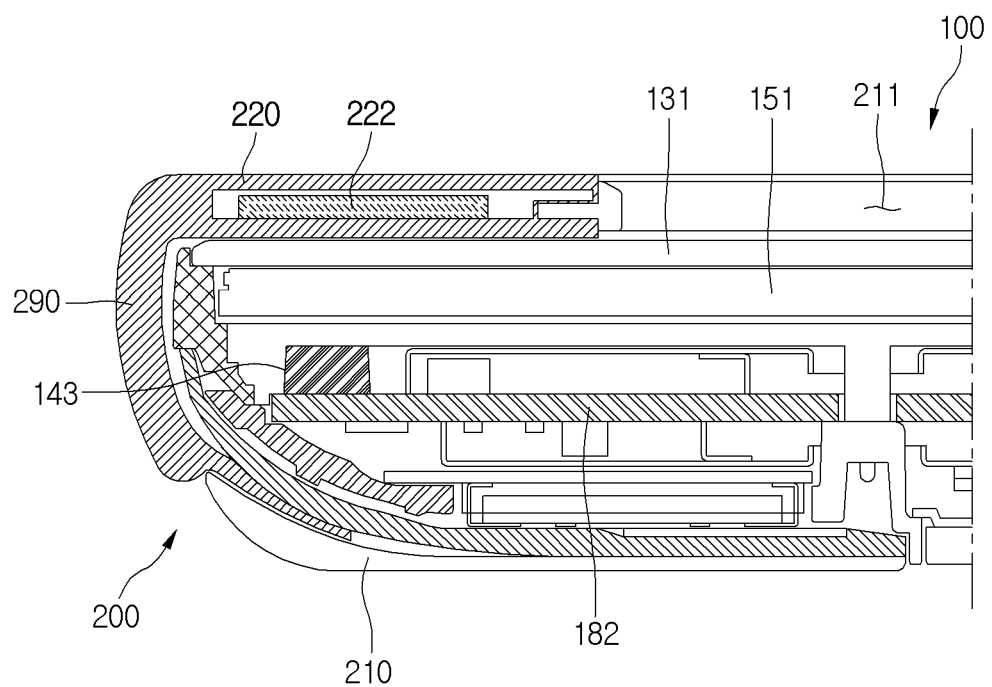
FIG. 36 is a sectional view taken along a line C-C of FIG. 35.

As shown in FIG. 36, the mobile terminal 100 includes a display panel 151, a touch input unit 131, a printed circuit substrate 182, a front cover sensing unit 143. Except for the front cover sensing unit 143 added, the mobile terminal 100 shown in FIG. 36 has a structure similar or identical to that of the mobile terminal in the first embodiment. Therefore, their overlapping description is omitted.

Moreover, FIG. 35 is a schematic perspective view of the front cover sensing unit 143. This is for illustrating a schematic position of the front cover sensing unit 143 in the mobile terminal 100 and the position of the front cover sensing unit 143 is shown more clearly in FIG. 36. The front cover sensing unit 143 is mounted on the printed circuit board 182. For reference, FIG. 36 is a sectional view taken along a line C-C of FIG. 35.

The front cover sensing unit 143 may detect a state change of the front cover part 220 through a change in magnetic field.

The connection part 290 connects the terminal coupling part 210 and the front cover part 220. Accordingly, one end of the connection part 290 is couple with the terminal coupling part 210 and the other end is coupled with the front cover part 220. The connection part 290 is formed of a flexible material. Accordingly, while the mobile terminal 100 is coupled with the terminal coupling part 210, the rear of the front cover part 220 may be disposed at the position contacting the front of the mobile terminal 100 or may rotate about 180° and thus the front of the front cover part 220 may be disposed at the position contacting the rear of the terminal coupling part 210.

Figure 37:
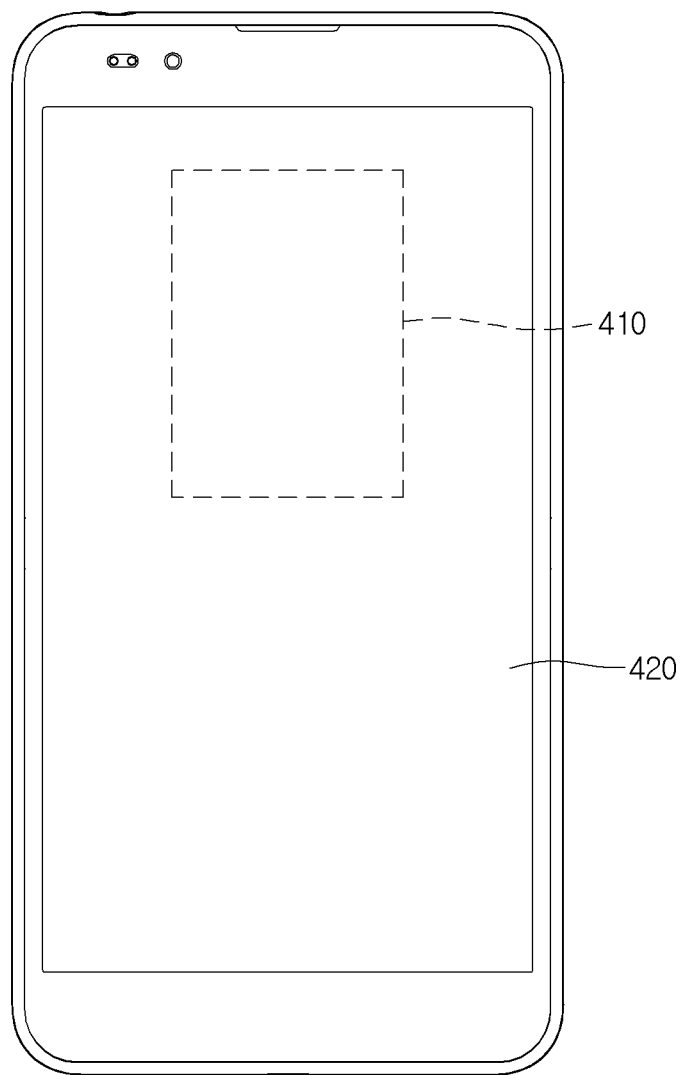
FIG. 37 is a view illustrating a first display area and a second display area of a mobile terminal.
Figure 38:
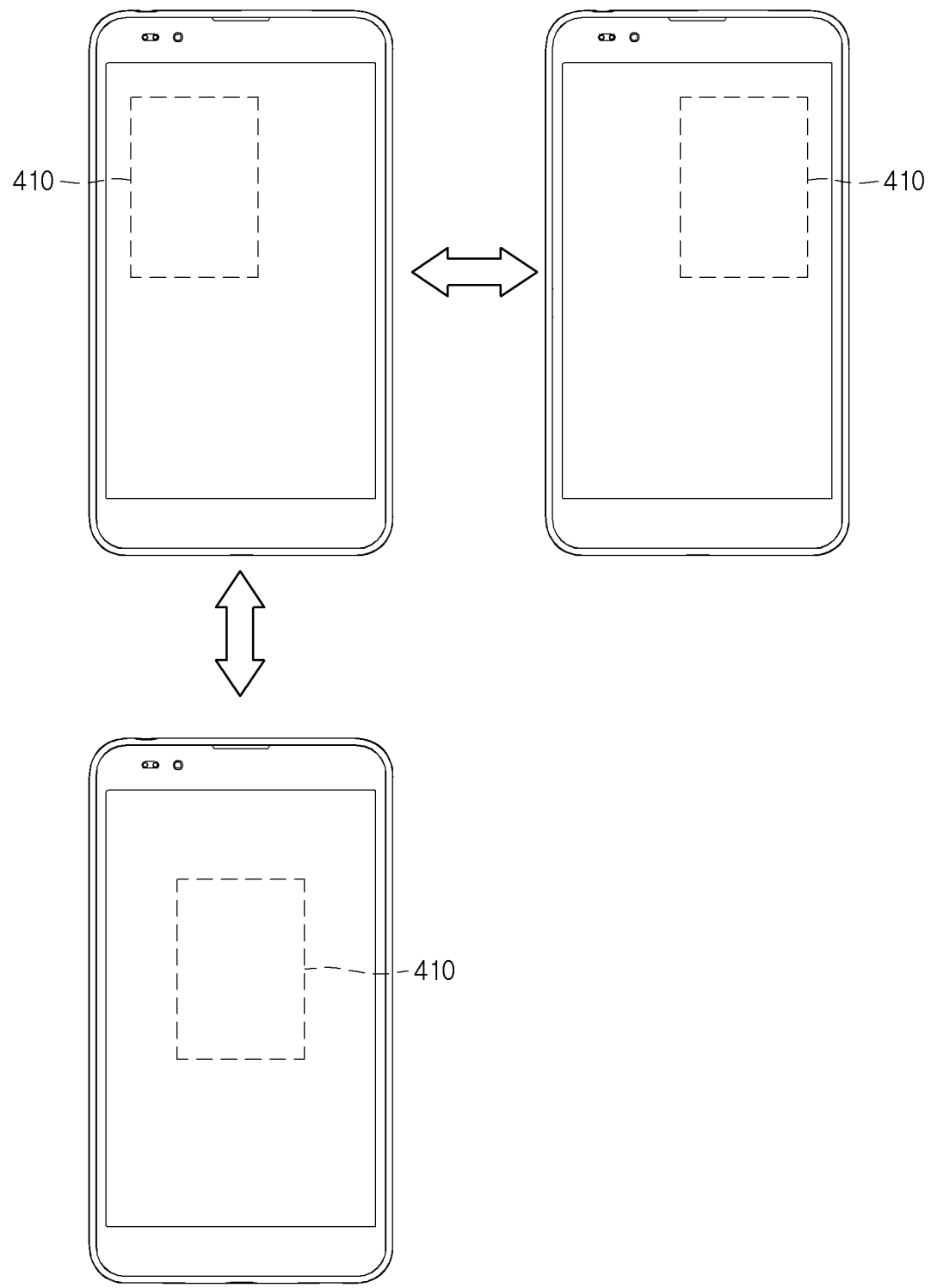
FIG. 38 is a view illustrating the changeable position and size of a first display area.

Hereinafter, an interface provided by a mobile terminal and a terminal case is described with reference to FIGS. 37 and 38.

The mobile terminal 100 has a first user interface mode and a second user interface mode. Additionally, the display unit 151 of the mobile terminal 100 includes a first display area 410 where an image is displayed in the first user interface mode and a second display area 420 where an image is displayed in the second user interface mode.

The first display area 410 may be an area corresponding to the front incision part 221 of the front cover part 220 or a predetermined area in an area corresponding to the front incision part 221, and the second display area 420 may be an entire active area of the display unit 151. Accordingly, the first display area 410 may be a portion of the second display area 420. Moreover, an area corresponding to the front incision part 221 means an area overlapping the front incision part 221 when the front cover part 220 covers the display unit 151 at the front of the mobile terminal 100.

In the first user interface mode, the control unit 180 provides a first user interface in the first display area 410.

The first user interface mode is an operating mode of the mobile terminal 100 providing a user interface through the front incision part 221 of the front cover part 220 when the front cover part 220 of the terminal case 200 is closed. In the first user interface mode, the mobile terminal 100 may receive a touch input through the first display area 410. Accordingly, even when the front cover part 220 of the terminal case 200 is closed, a user may view a displayed image or perform a touch input. Additionally, the control unit 180 of the mobile terminal 100 may obtain a sound input through the microphone 122 in the first user interface mode.

Moreover, in the first user interface mode, the control unit 180 stops displaying an image in an area 420 other than the first display area 410 and limits a touch input. That is, when it is possible to turn on/off some pixels of the display unit 151, the control unit 180 may turn off pixels in an area other than the first display area 410 in the first user interface mode. Or, when it is impossible to turn on/off some pixels of the display unit 151, the control unit 180 may display the outer of the first display area 210 as block color.

Moreover, as entering the first user interface mode, the control unit may ignore a touch signal inputted through an area other than the first display area 410.

The second user interface mode is an operating mode of the mobile terminal 100 providing a second user interface through an entire active area of the display unit 151 when the front cover part 220 of the terminal case 200 is opened or the mobile terminal 100 is separated from the terminal case 200.

Switching between the first user interface mode and the second user interface mode may be performed based on the sensing information of the front cover sensing unit 143.

That is, the control unit 180 receives detection information on the front cover sensing unit 143 and enters the first user interface mode if it is determined that the front case is closed. In this case, the first user interface is provided through the first display area 410.

On the other hand, the control unit 180 receives detection information on the front cover sensing unit 143 and enters the second user interface mode if it is determined that the front case is opened. In this case, the second user interface is provided through the second display area 420.

Accordingly, even when the front cover part 220 of the terminal case 10 is closed, a user may perform various operations, for example, receiving a call, playing music, or checking the weather.

Additionally, when an event that needs to be notified to a user occurs, for example, when a call or text messaging is incoming, since applications corresponding to events are executed in the first user interface mode, a user may check various events without opening the front cover part 220 of the terminal case 200.

Moreover, when the second user interface mode switches into the first user interface mode, the control unit 180 may continuously operate the application executed in the second user interface mode. The control unit 180 may adjust the execution screen of the application to correspond to the first display area 410 if necessary, so that the application may be executed continuously in the first display area 410. Or, even if the control unit 180 continuously executes the application executed in the second user interface mode, it may not display the application on the display unit 151 in the first user interface mode. Or, the control unit 180 may overlay the first user interface on the second user interface. At this point, the control unit 180 may receive a user input and on the basis of the received user input, may determine the transparency of the first user interface. The control unit 180 may display the second user interface through the first user interface by adjusting the transparency.

However, since the control unit 180 provides the first user interface in correspondence to the front incision part 221, according to a specific embodiment of the present invention, the control unit 180 may limit a specific function of a specific application in the first user interface mode. Especially, when the front cover part 220 is closed and the front camera is unavailable, the control unit 180 may limit a video call related function. Or, since a touch area is limited in the first user interface mode, the control unit 180 may limit functions requiring a touch input of a relatively large area. An example of limiting a function by the control unit 180 may include the text writing and sending of a text application by a touch input, the phone number searching and favorite phone number sensing of a call application by a touch input, and the music searching of a music application by a touch input. However, unlike a touch input, the control unit may obtain a sound input without restriction in the first user interface mode. Accordingly, when such functions are executed based on a sound input, the control unit 180 may not limit such functions.

Additionally, the size or position of the first display area 410 may be changed by a user. FIG. 38 is a view when the size or position of the first display area 410 is changed. Accordingly, even if the size of position of the front incision part 221 is changed by replacing the terminal case 200, the first display area 410 may be set to correspond to the new front incision part 221.

A method of the control unit 180 to receive a user input so as to change the size or position of the first user interface includes a method of receiving a touch input for moving a graphic representing the first display area 410 displayed on the display unit 151 or changing the size. Moreover, the control unit 180 may set the position and size of the first display area 410 or the first user interface on the basis of a numeric input on the size and coordinates from a user.

Moreover, light sources providing light to the display unit 151 may be differently turned on or turned off in the first user interface mode and the second user interface mode.

Moreover, the size and position of the front incision part 221 of the front cover part 220 may vary according to a type and design of the terminal case 200. Additionally, a color or pattern of the terminal case 200 may be changed diversely. Accordingly, the control unit 180 may change the feature of the first user interface. The feature of the first user interface includes at least one of the position, size, background color, and a background image of the first user interface.

Accordingly, the mobile terminal 100 may display the first user interface not being restricted from any kind of the terminal case 200. That is, the mobile terminal 100 may operate being combined with various kinds of terminals cases 200 having different designs. Additionally, the control unit 180 may change a background color or a background image of the first user interface, so that it may provide a sophisticated and aesthetic interface.

Additionally, the control unit 180 may receive a user input for changing the feature of the first user interface and on the basis of the received user input, may change the feature of the first user interface.

In order to change the size or position among the features of the first user interface, the control unit 180 may receive a touch input for moving a graphic representing the first display area 200 displayed on the display unit 151 or changing the size. Or, the control unit 180 may obtain a numeric input on the position and size of the first user interface directly from a user.

Or, the control unit 180 may recognize the identifier of the terminal case 200 and may change the feature of the first user interface on the basis of the identifier specifying the kind of the terminal case 200. In more detail, the mobile terminal 100 includes a feature table for first user interface information and the control unit 180 may match the identifier of the terminal case 200 to the feature table. The feature table includes features of a plurality of user interfaces respectively corresponding to the identifiers of the terminal cases 200. The control unit 180 may change the feature of the first user interface according to a matching result.

In a specific embodiment, the control unit 180 may specify a type of the terminal case 200 by recognizing the identifier of the terminal case 200 on the basis of a Near Field Communication (NFC) tag in the terminal case 200. In more detail, when the terminal case 200 including an NFC tag is coupled with the mobile terminal 100, the short range communication module 114 may receive the identifier of the terminal case 200 from the NFC tag. The control unit 180 may recognize the identifier of the terminal case 200 by receiving it from the short range communication module 114.

Moreover, the control unit 180 may recognize the identifier of the terminal case 200 on the basis of QR code in the terminal case 200. The QR code, as a matrix bar code representing information in a black and white plaid pattern, may contain 3-dimensional various information in advantage of a large capacity compared to an existing bar code containing limited information such as product price and name due to a limited capacity. The camera 121 may generate an image including QR code by capturing the QR code. The control unit 180 may extract the QR code from the generated image. The control unit 180 may recognize the identifier of the terminal case 200 on the basis of the extracted QR code.

Moreover, the control unit 180 may change the feature of the first user interface on the basis of a resistance value in the terminal case 200. At this pint, the terminal case 200 may include a resistor. In more detail, the sensing unit 140 may detect a resistance value of a resistor in the terminal case 200. In more detail, the sensing unit 140 may supply voltage to the resistor in the terminal case 200. At this point, the sensing unit 140 may detect a resistance value of a resistor by using the magnitude of a current flowing in the resistor. In more detail, the mobile terminal 100 includes a feature table for first user interface information and the control unit 180 may change the feature of the first user interface by matching the detected resistance value to the feature table. The feature table includes features of a plurality of user interfaces respectively corresponding to the identifiers of the terminal cases 200. The feature of the first user interface includes at least one of the position, size, background color, and a background image of the first user interface.

Moreover, the control unit 180 may determine one of the background color or background image of the first user interface on the basis of magnetic field value according to a magnetic material mounted at the terminal case 200. At this pint, a magnetic material may be mounted at the terminal case 200. The sensing unit 140 may include a plurality of hall sensors disposed at different positions to detect magnetic field. The control unit 180 may change the feature of the first user interface according to the magnitude of a magnetic filed detected by the plurality of hall sensors.

Moreover, the control unit 180 may change the feature of the first user interface on the basis of a color of the terminal case 200. In more detail, the sensing unit 121 may generate an image including the color of the terminal case 200 by capturing it. The control unit 180 may digital-signal-process the generated image to extract the color of the terminal case 200. The mobile terminal 100 includes a feature table for first user interface information and the control unit 180 may change the feature of the first user interface by matching the background color to the feature table. The feature table includes features of a plurality of user interfaces respectively corresponding to a plurality of colors. The feature of the first user interface includes at least one of the position, size, background color, and a background image of the first user interface.

Figure 39:
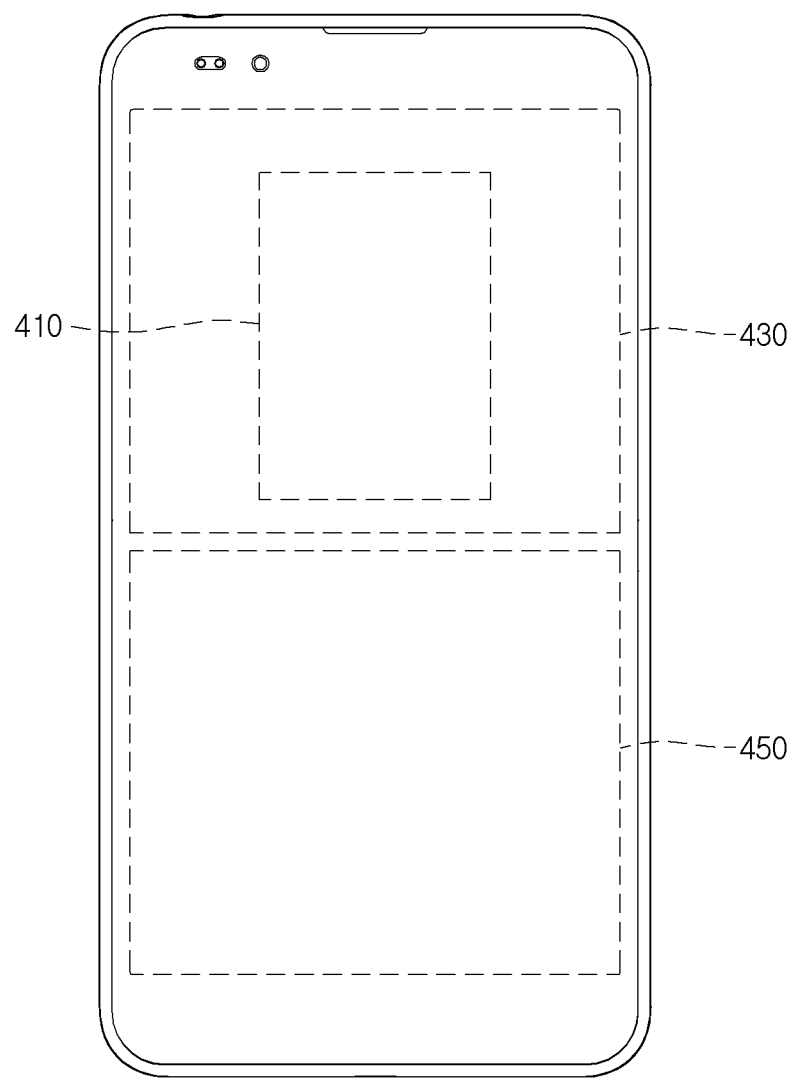
FIG. 39 is a view when a control unit selectively turns on/off a light source of a backlight unit of a display unit according to a user interface mode of a mobile terminal.

FIG. 39 is a view when the control unit 180 of a mobile terminal selectively turns on/off a light source of a backlight unit of a display unit according to a user interface mode.

The backlight unit of the display unit 151 may include a plurality of light sources dividing and lightening a display area of the display unit 151. The control unit 180 may turn on/off at least one of the light sources according to a current user interface mode.

That is, when a current user interface mode is the first user interface mode, the control unit 180 turns on at least one light source in an area corresponding to the first user interface among a plurality of light sources, and turns off at least one light source in the remaining area other than the area corresponding to the first user interface. When a current user interface mode is the second user interface mode, the control unit 180 turns on at least one light source in an area corresponding to the first user interface. Through this, the battery of the mobile terminal 100 may be saved.

As shown in FIG. 39, the display area of the display unit 151 illuminated by a light source of a backlight unit of the display unit 151 is divided into two areas. In the first user interface mode, light sources lightening an area 430 including a first display area 410 are turned on and light sources lightening an area 450 other than the area 430 are turned off. According to a specific embodiment of the present invention, the number of light sources and a display area illuminated by a light source may vary.

Additionally, in order to save the battery of the mobile terminal 100, the brightness of an area of the display unit 151 where the first user interface is displayed in the first user interface mode may be separately set different from the brightness of the display unit 151 in the second user interface mode by a user setting. That is, the brightness of the display unit 151 in the first user interface mode may be set darker than that in the second user interface. When the battery remaining of the mobile terminal 100 is insufficient, the control unit 180 may reduce the brightness of an area of the display unit 151 where the first user interface is displayed in the first user interface mode in order to save power.

The first user interface and an operation of the mobile terminal 100 through this are described in more detail below.

Hereinafter, an operating method of a mobile terminal according to a state change of the front cover part 220 of the terminal case 200 will be described with reference to FIGS. 40 and 41 in accordance to the third embodiment of the present invention.

Figure 40:
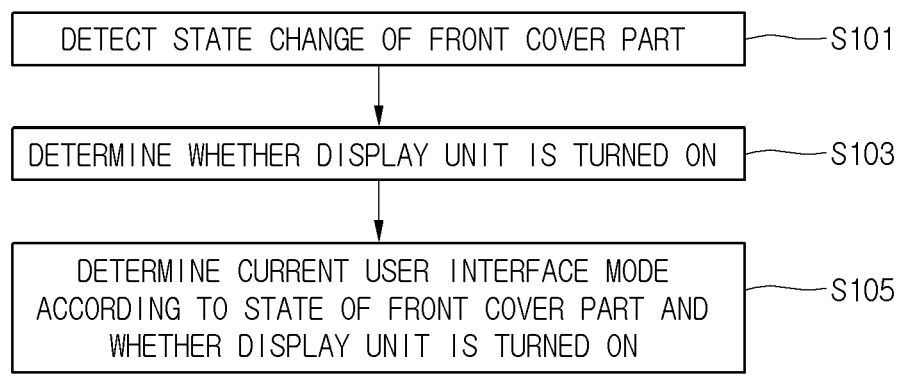
FIG. 40 is a flowchart illustrating a control method of a mobile terminal.
Figure 41:
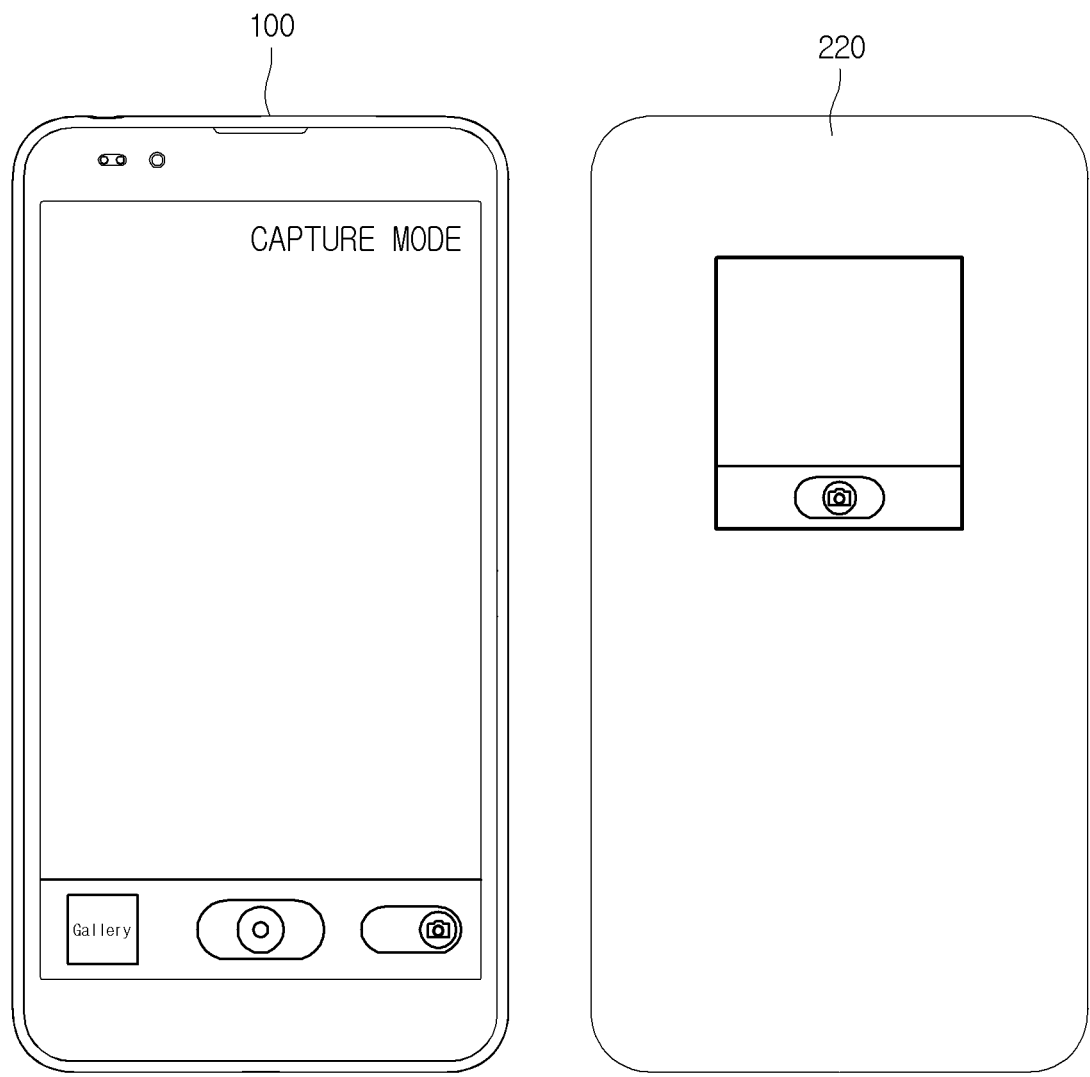
FIG. 41 is a view when a camera application is displayed on a display unit of a mobile terminal.

FIG. 40 is a flowchart illustrating operations of a mobile terminal when a state of the front cover part 220 of a terminal case is changed.

The front cover sensing unit 143 detects a state change of the front cover part 220 of the terminal case 200 in operation S101. A state of the front cover part 220 includes a state changing from an opened state into a closed state and a state changing from a closed state to an opened state.

The control unit 180 determines whether the current display unit 151 is turned on in operation S103. If a partial area of the display unit 151 is turned on, it is determined that the display unit 151 is turned on.

The control unit 180 determines a current user interface mode according a state of the front cover part 220 and whether the display unit 151 is turned on.

When the current display unit 151 is turned on and a state of the front cover part 220 changes from an opened state into a closed state, the control unit 180 determines a current user interface mode as a first user interface mode. That is, the control unit 180 executes an application through the first display area 410. At this point, a basic application of the first user interface mode in execution may be changed by a user's selection.

For example, a clock application may be a basic application. Or, a basic application of the first user interface mode may be the last executed application in the first user interface mode. However, while a music player application 510 plays music, the control unit 180 may execute the music player application 510 when determining a user interface for user's convenience regardless of a basic application. The control unit 180 stands by while maintaining the first user interface mode for a predetermined time. The predetermined time for standing by may be changed by a user's setting. The predetermined time for standing by may be more than several sec and less than 1 min and may be 10 sec preferably. If there is no additional user input with the predetermined time for standing by, the control unit 180 turns off the display unit 151. If the battery remaining of the mobile terminal 100 is insufficient, the control unit 180 may reduces the standing by time to save power.

When the current display unit 151 is turned off and a state of the front cover part 220 changes from an opened state into a closed state, the control unit 180 does not perform an additional operation.

When a state of the front cover part 220 changes from a closed state into an opened state regardless of whether the display unit 151 is turned on, the control unit 180 determines a current user interface mode as a second user interface mode. Since the front cover part 220 does not cover the display unit 151, a user may use the front of the display unit 151.

While the control unit 180 executes an application in the first user interface mode, if the first user interface mode changes into the second user interface mode, the control unit 180 may adjust a screen of the currently running application to the second user interface mode while continuously executing the currently running application.

FIG. 40 is a view when a display screen of a display unit where a camera application is executed is changed as a case cover is opened and closed.

As shown in the left of the drawing, a user interface displayed through an entire display unit is reduced to a size and position corresponding to a front incision part as the front cover part 220 is closed.

Accordingly, as described in the first embodiment, according to whether the lens cover 240 is opened or closed, an image displayed on the display unit 151 is displayed only through a first display area 410 when the front cover part 220 is closed and is displayed only through a second display area 420 when the front cover part 220 is opened.

Applications executed in the first user interface mode and operations of each application are described with reference to FIGS. 42 to 45.

Figure 42:
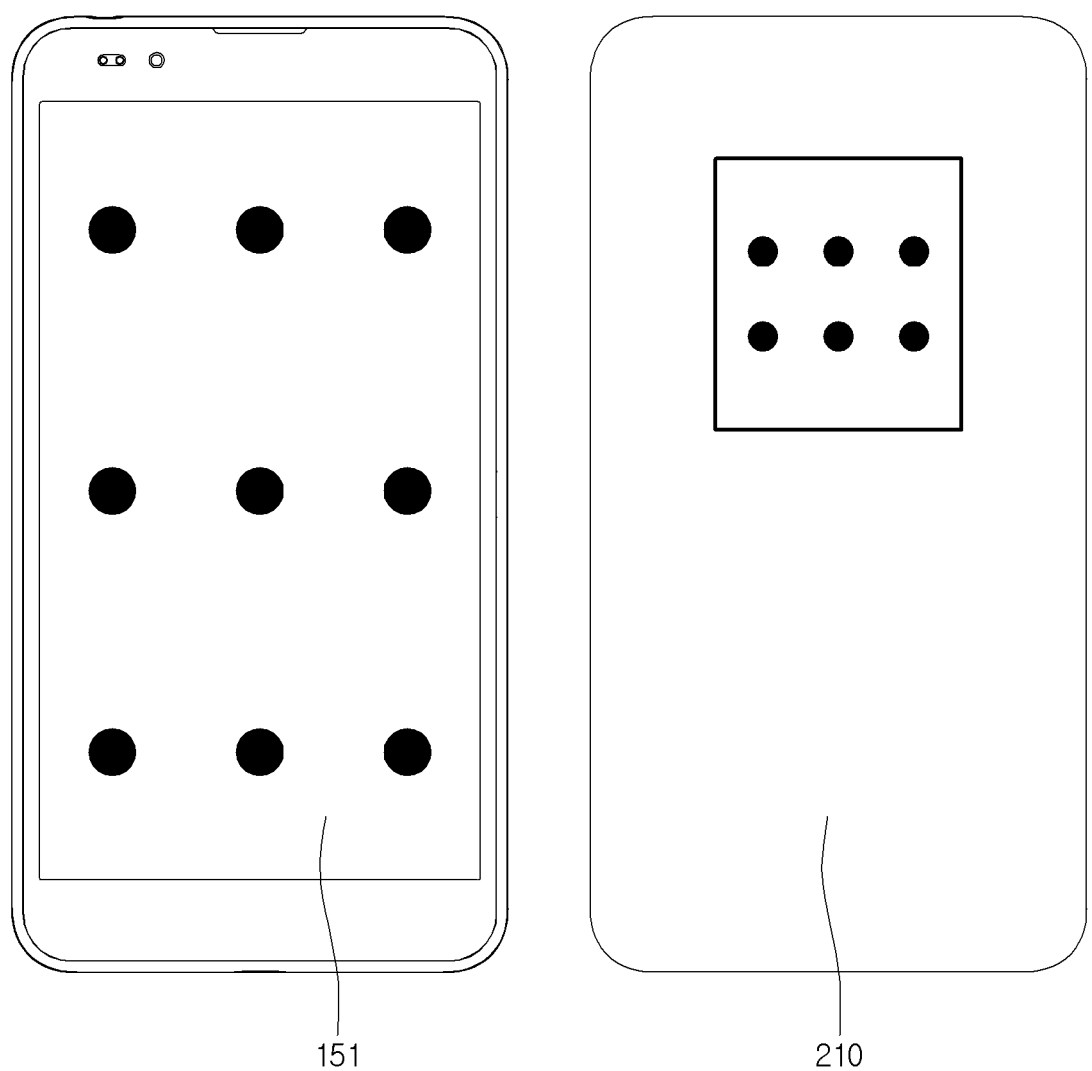
FIG. 42 is a view illustrating a lock screen in a first user interface mode and a second user interface mode.

FIG. 42 is a view illustrating a lock screen in the first user interface mode and the second user interface mode.

The left of FIG. 42 is a typical lock screen requiring a pattern input in the second user interface mode. The right of FIG. 42 is a lock screen requiring a pattern input smaller than that in the second user interface mode. Since the first and second user interfaces have a difference in the size of a display area, each may set a different lock screen to fit for its size. In a specific embodiment, even when the lock screen of the second user interface mode uses a lock screen using a pattern input, a lock screen of the first user interface may use a lock screen using a password.

Figure 43:
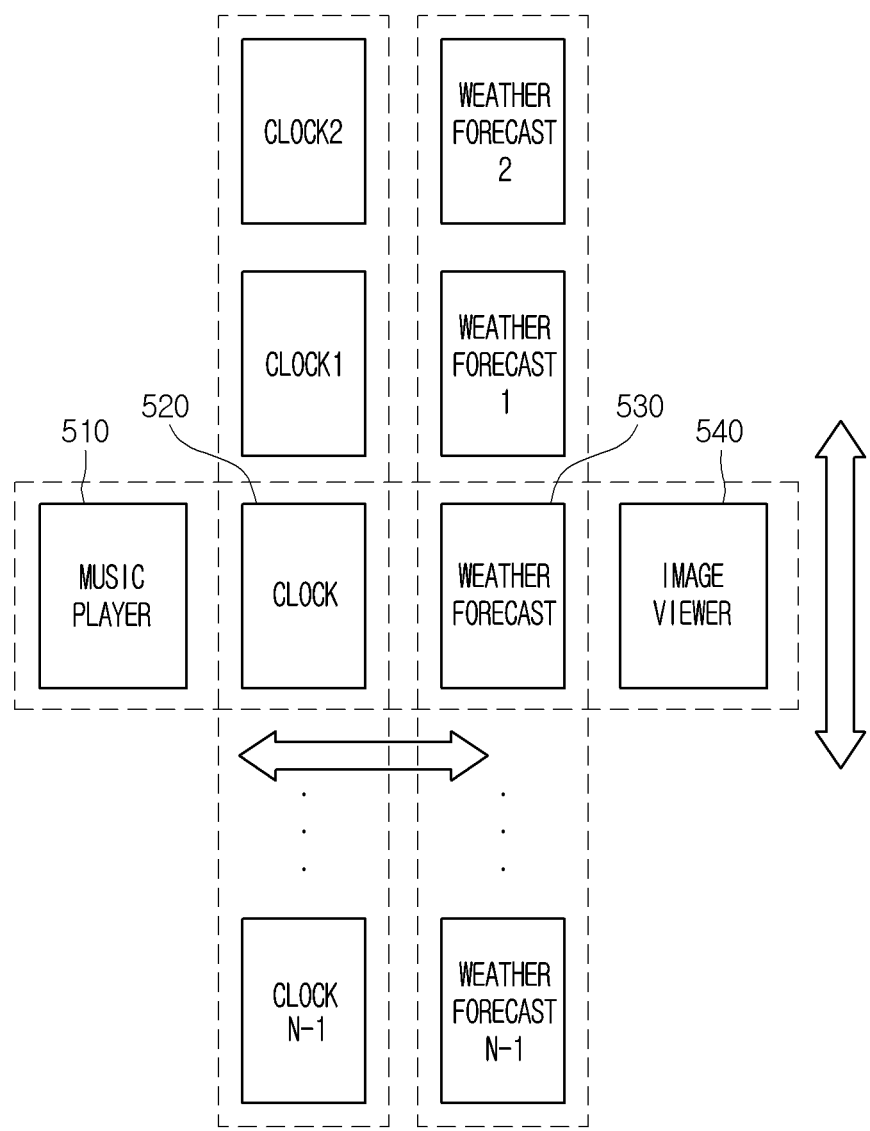
FIG. 43 is a view illustrating another example of a user interface.

FIG. 43 illustrates another example of a user interface.

The memory 160 may store a plurality of applications executable in the first user interface mode. That is, a user may execute various applications in the first user interface mode. According to another embodiment of the present invention, a user may execute a music player application 510, a clock application 520, a weather forecast application 530, and an image viewer application 540. That is, a user may execute the music player application 510, the clock application 520, and the weather forecast application 530 without opening the front cover part 220 of the terminal case 200 in the first user interface mode. Accordingly, a user may save a time and operation necessary for executing an important application of a mobile terminal.

The control unit 180 may switch an application executed in the first user interface mode into another application. Such switching may be performed by a user input. At this point, a kind of user input includes a touch input, a button input, and a voice input. Especially, the touch input may include dragging in a first direction, flicking, and sliding. The first direction may be a horizontal direction of a mobile terminal. Especially, the button input may include a menu button input or a cancel button input.

Additionally, an application executed in the first user interface mode may include a plurality of pages. The control unit 180 may switch each page of an application by a user input. At this point, a kind of user input includes a touch input, a button input, and a voice input. Especially, the touch input may include dragging in a direction different from the first direction, flicking, and sliding. The direction different from the first direction may be a vertical direction of a mobile terminal. Especially, the button input may be a volume button input. The voice input may be an input having voice data different from a user input for switching an application.

The clock application 520 may include a plurality of pages. The clock application 520 in FIG. 43 may display a base city of a currently displayed time and a time for another city, or may include N pages having different graphic styles.

The weather forecast application 530 may include a plurality of pages. According to the embodiment of FIG. 13, the weather forecast application 530 may display a currently displayed weather forecast and weather forecast for another city, or may include N pages having different graphic styles.

Notification operations of applications executed in the first user interface mode are described with reference to FIGS. 44 and 45.

Figure 44:
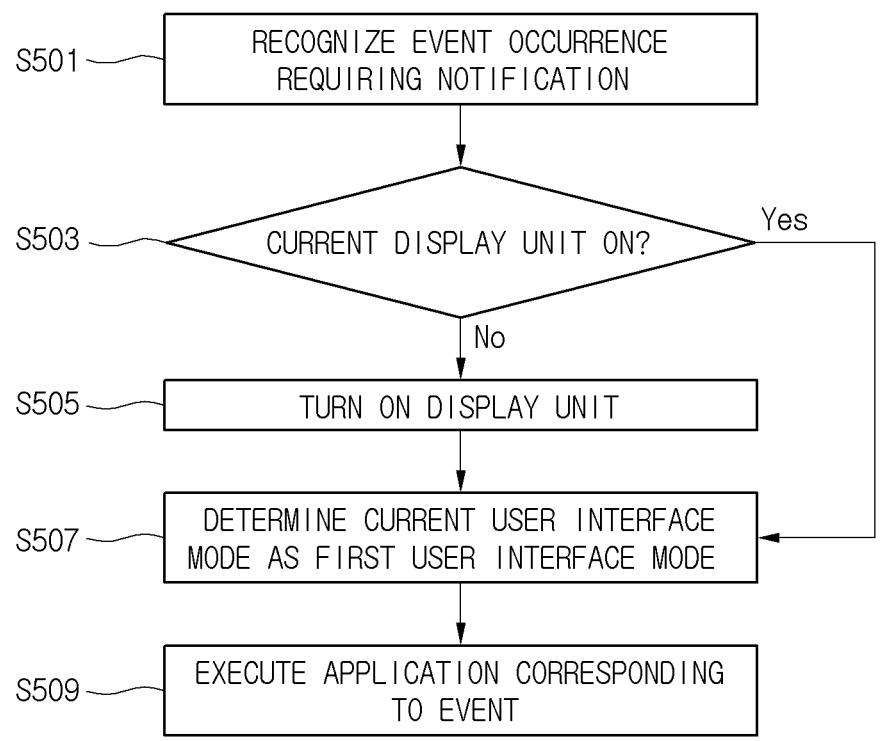
FIG. 44 is a flowchart illustrating operations of a mobile terminal when an event that needs to be notified to a user occurs with a closed front cover part of a mobile terminal case in the mobile terminal.

FIG. 44 is a flowchart illustrating operations of a mobile terminal when an event that needs to be notified to a user occurs with a closed front cover part of a mobile terminal case in the mobile terminal according to another embodiment of the present invention.

The control unit 180 recognizes that an event that needs to be notified to a user occurs in operation S501. The event that needs to be notified to a user is an event requiring a notification, that is, when some data are received by a user or which state the mobile terminal 100 is in needs to be notified. A specific example of the above event includes receiving a phone call, receiving a text message, or reaching a predetermined time set by an alarm application or a timer application.

The control unit 180 determines whether the current display unit 151 is turned on in operation S503.

If the current display unit 151 is not turned on, the control unit 180 turns on the display unit 151 in operation S505.

The control unit 180 determines a current user interface mode as the first user interface mode in operation S507.

The control unit 180 notifies a corresponding event to a user by executing an application corresponding to an event through the first user interface mode in operation S509. Since such events that need to be notified to a user are displayed through a first user interface, a user may confirm important information without opening the front cover part 220 of a mobile terminal. That is, a user may save a time and operation necessary for checking in formation on a mobile terminal.

Figure 45:
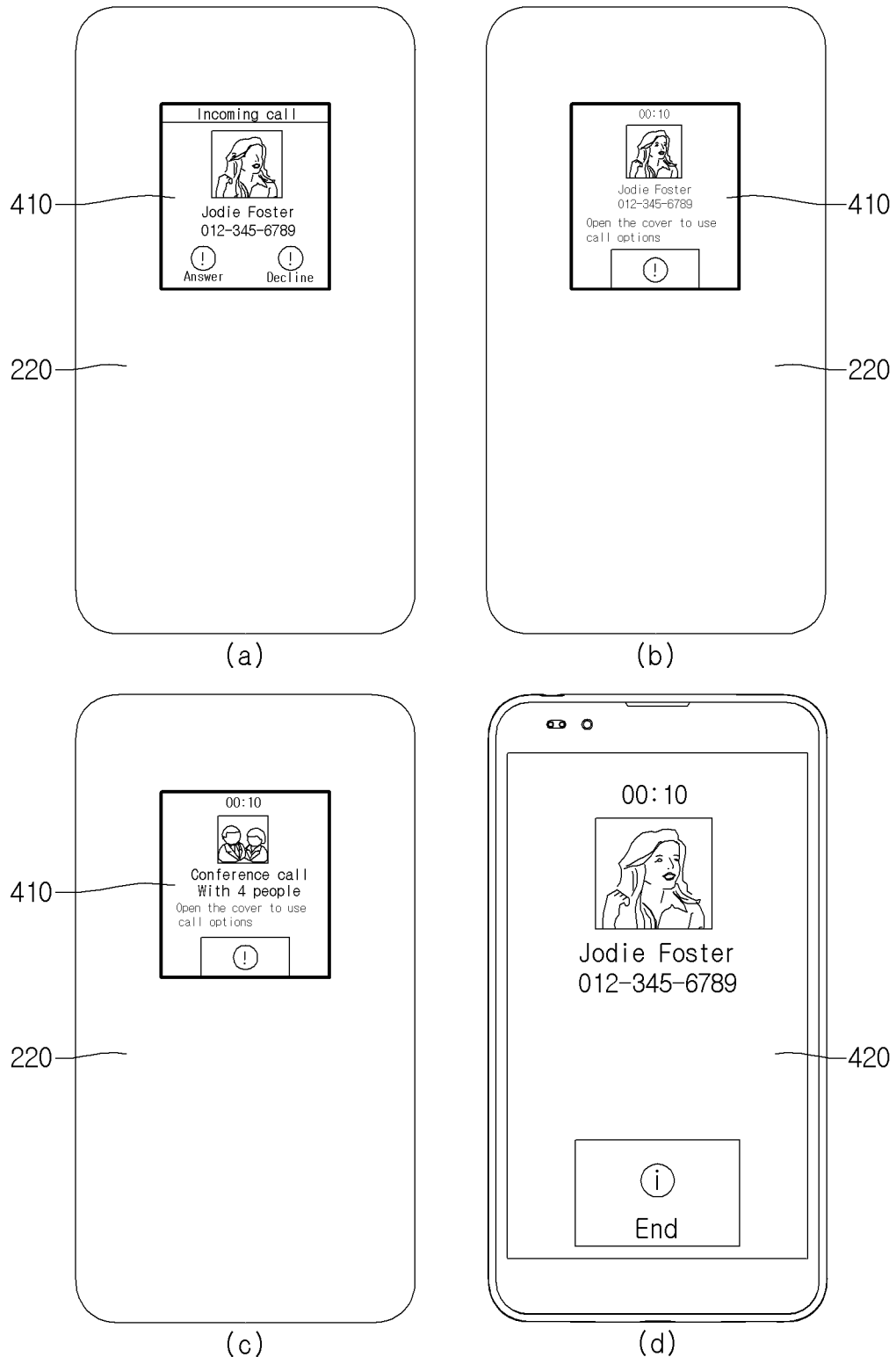
FIG. 45 is a view illustrating an operation of a call application in a user interface.

FIG. 45 is a view illustrating an operation of a call application in a user interface according to another embodiment of the present invention.

When the mobile terminal 100 receives a call while the front cover part 220 of the terminal case 200 in the mobile terminal 100 is closed, the control unit 180 executes a call application through the first display area.

FIG. 45(A) is a view when a typical call is incoming. A call application displays a name, a phone, number, and a picture, that is, sender's information. Additionally, a user may receive or reject the call through a first display area 410. That is, a user may receive or reject the call without opening the front cover part 220 of the terminal case 200. In more detail, the control unit 180 may obtain a swipe touch input through the first display area 410 and accordingly, may receive or reject the call. Or, the control unit 180 obtains a user's button input and accordingly, receives or rejects the call. At this point, the position of a button is not limited and especially, may be disposed at the rear of the mobile terminal 100. Or, the control unit 180 obtains a user's voice input and accordingly, receives or rejects the call. When the front cover part 220 of the terminal case 200 includes a touch input available area, the control unit 180 may receive or reject the call by receiving a touch input through the touch input available area. If there is a privacy protection setting, the control unit 180 allows a call application to display sender's information only when obtaining an additional user input.

FIG. 45(B) is a view when a user talks to the other party through a typical call. When a user closes the front cover part 220 of the mobile terminal 100 during a call, as described with reference to FIG. 45(B), the control unit 180 switches a user interface mode into the first user interface mode. At this point, the call application displays the name, phone number, picture, and current call time of the other party on the call. Additionally, the call application displays a message that the front cover part 220 of the terminal case 200 needs to be opened to use several call options. If there is no user's touch input or button input for predetermined time, the call application turns off the entire display unit 151.

FIG. 45(C) is a view when multiple calls are incoming. The call application displays information on the multiple calls and a message that the front cover part 220 needs to be opened to use a multiple call option. In addition to the incoming multiple calls, when a video call is incoming, the call application displays information on the multiple calls and a message that the front cover part 220 needs to be opened to use a video call option in the first user display mode.

FIG. 45(D) is a view when the front cover part 220 is opened during a call with the closed front cover part 220. The control unit 180 may adjust the size of an application screen to fit for the first user interface as switching the second user interface mode into the first user interface mode. That is, the control unit 180 adjusts the screen size of the call application to the size of the entire display unit 151.

Additionally, the control unit 180 may obtain a voice input in the first user interface mode and on the basis of the obtained voice input, may perform functions, for example, phone book search, the latest outgoing number sending, and phone book favorite sending. As described above, a voice input is not limited unlike a touch input in the first user interface mode. Accordingly, as the control unit 180 executes various functions of a call application on the basis of the obtained voice input, a user's convenience is improved.

When a text is received in the first user interface mode, it operates as follows. When the front cover part 220 of the terminal case 200 is closed and another application is not displayed in a first display mode, a text messaging application is executed in the first user interface mode. At this point, according to an embodiment of the present invention, the text messaging application may display the sender, content, date, and time of the received text message. The text messaging application may display some or all of contents on a text message or may not display contents on a text message and display only a fact that a text message is received. While another application is displayed in the first user interface mode, if a text message is received, the control unit 180 may display a text message reception through an icon in a screen of an application in execution or a pop-up window. At this point, the control unit 180 may obtain a user input and on the basis of the obtained user input, may execute various functions of the text messaging application. Especially, the user input may be a touch input or a voice input. In the first user interface mode, the control unit 180 obtains only a touch input through the front incision part 221 or a touch input through a partial area of the front cover part 220. Accordingly, if the control unit 180 obtains a voice input instead of a touch input and executes a function of a text messaging application, a user's convenience may be improved.

An alarm application and a timer application's alarm operation in the first user interface mode are as follows.

As a user set time is reached, if an alarm application needs to notify it to a user, the alarm application is executed in the first user interface mode. A user may stop or snooze the alarm through the first user interface without opening the front cover part 220 of the terminal case 200. That is, a user may stop or snooze the alarm by touching the first display area 410. At this point, the user input may be a touch input or a voice input.

As a predetermined time elapses, if a timer application needs to notify it to a user, the time application is executed in the first user interface mode. A user may stop a timer through the first user interface without opening the front cover part 220 of the terminal case 200. That is, a user may stop a timer by providing a touch input to the first user interface.

Operations of a mobile terminal relating to a first user interface during an external button input, for example, a power button and a volume button, are described with reference to FIGS. 46 and 47.

Figure 46:
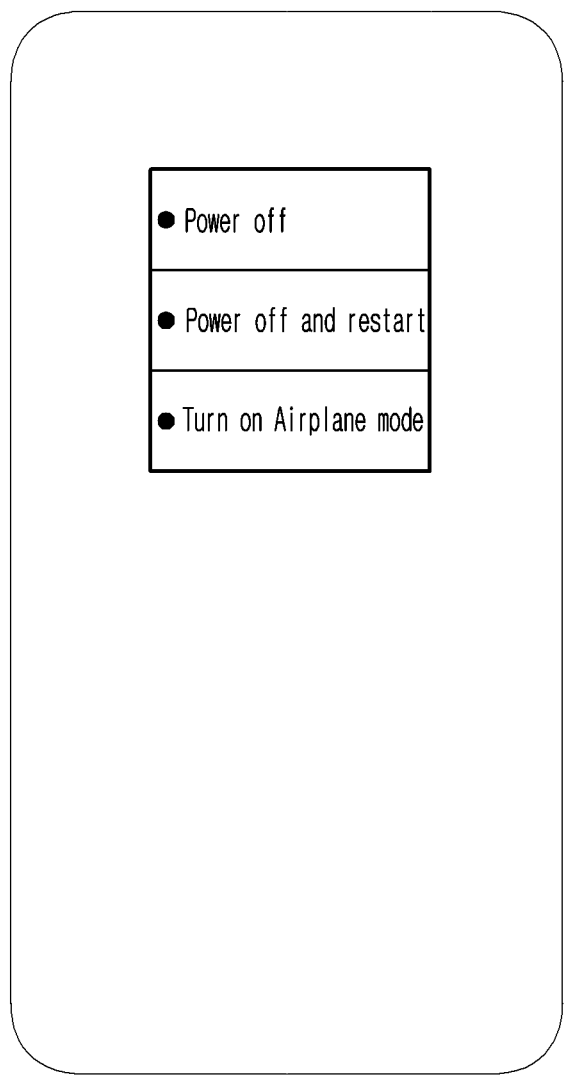
FIG. 46 is a view illustrating a user interface displayed when a user long-presses a power button as a front cover part of a mobile terminal case in a mobile terminal is closed.

FIG. 46 is a view illustrating a user interface displayed when a user long-presses a power button as a front cover part of a mobile terminal case coupled with the mobile terminal is closed according to another embodiment of the present invention.

The long press input is an input of continuously pressing a button for more than a predetermined time. In contrast, the short press input is an input of continuously pressing a button for less than a predetermined time.

When a front cover part of a mobile terminal case coupled with a mobile terminal is closed, if a user provides a short press input on a power button, an operation of the mobile terminal is as follows. The sensing unit 140 detects the short press input of the power button. When the short press input of the power button is detected, the control unit 180 determines whether a current display unit is turned on. If the current display unit 151 is turned on, the control unit 180 turns off the display unit 151. If the current display unit 151 is not turned on, the control unit 180 turns on the display unit 151. Since the front cover part 220 of the terminal case 200 is closed, the control unit 180 determines a current user interface mode as the first user interface mode. That is, an application is executed through the first user interface. At this point, a basic application of the first user interface in execution may be changed by a user's selection. Or, a basic application of the first user interface may be the last executed application in the first user interface mode. According to an embodiment of the present invention, the clock application 500 may be the basic application. However, while a music player application 510 plays music, the control unit 180 may execute the music player application 510 when determining a user interface in order for user's convenient use regardless of a basic application.

When the front cover part 200 of the mobile terminal 100 is closed and a user provides a long press input on a power button, the control unit 180 executes a power application through the first user interface. At this point, the running power application provides power off, power off and restart, and plane mode switching functions. A user may control the power of the mobile terminal 100 by selecting one of the above functions through a touch input on the first user interface 200. Accordingly, a user may turn off the power of the mobile terminal 100 easily or may switch a mode of the mobile terminal 100 into a plane mode without opening the front cover part 220 of the terminal case 200.

FIG. 47 is a view illustrating a user interface displayed when a user provides a volume button input as a front cover part of a mobile terminal case is closed according to another embodiment of the present invention.

FIG. 47(A) illustrates a first user interface as a user presses a volume key when the front cover part 220 of the terminal case 200 is closed during a call. The control unit 180 adjusts a call volume according to the volume key input of a user and displays its numerical value on a first display area through a first user interface.

FIG. 47(B) illustrates a first user interface as a user presses a volume key when the front cover part 220 of the terminal case 200 is closed and the music player application 510 plays music. The control unit 180 adjusts a music playback volume according to the volume key input of a user and displays its numerical value on a first display area through a first user interface.

FIG. 47(C) illustrates a second user interface as a user presses a volume key when the front cover part 220 of the terminal case 200 is closed and the music player application 510 plays music. The control unit 180 may adjust the size of an application screen to fit for the first user interface as switching the second user interface mode into the first user interface mode. That is, the control unit 180 adjusts the screen size of the music player application 510 to the size of the entire display unit 151.

Additionally, the control unit 180 may obtain a user's voice input and on the basis of the obtained voice input, may execute a music search function in addition to next track playback, playback, and pause.

Various embodiments described herein may be realized in a computer or device similar thereto readable recording medium by using software, hardware, or a combination thereof.

Figure 48:
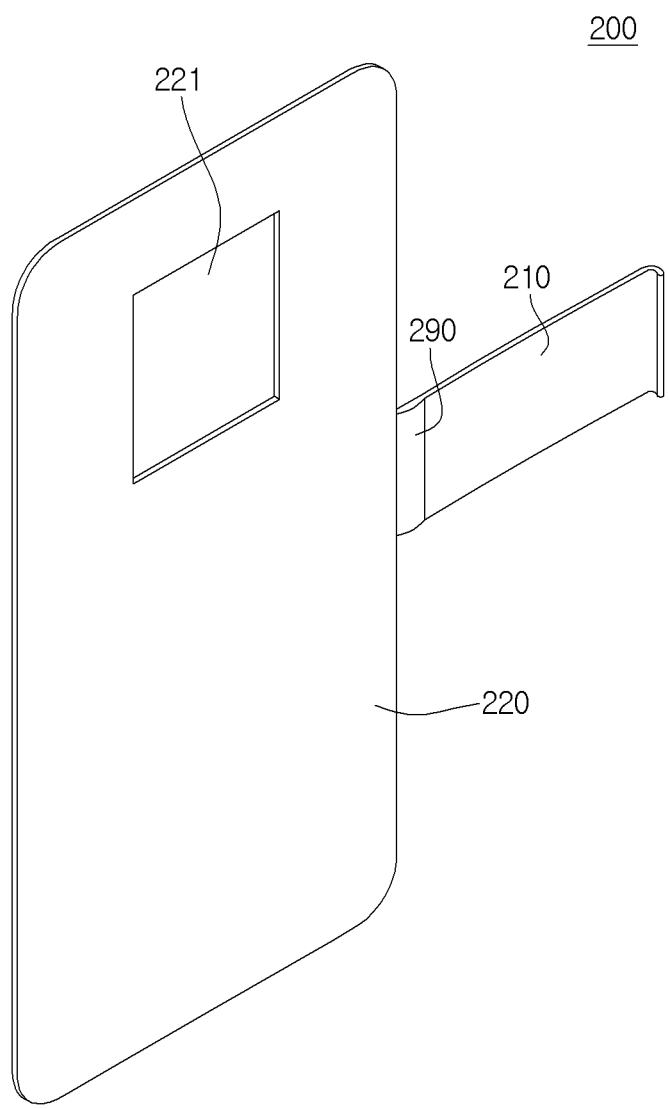
FIG. 48 is a view illustrating a terminal case according to another embodiment of the present invention.
Figure 49:
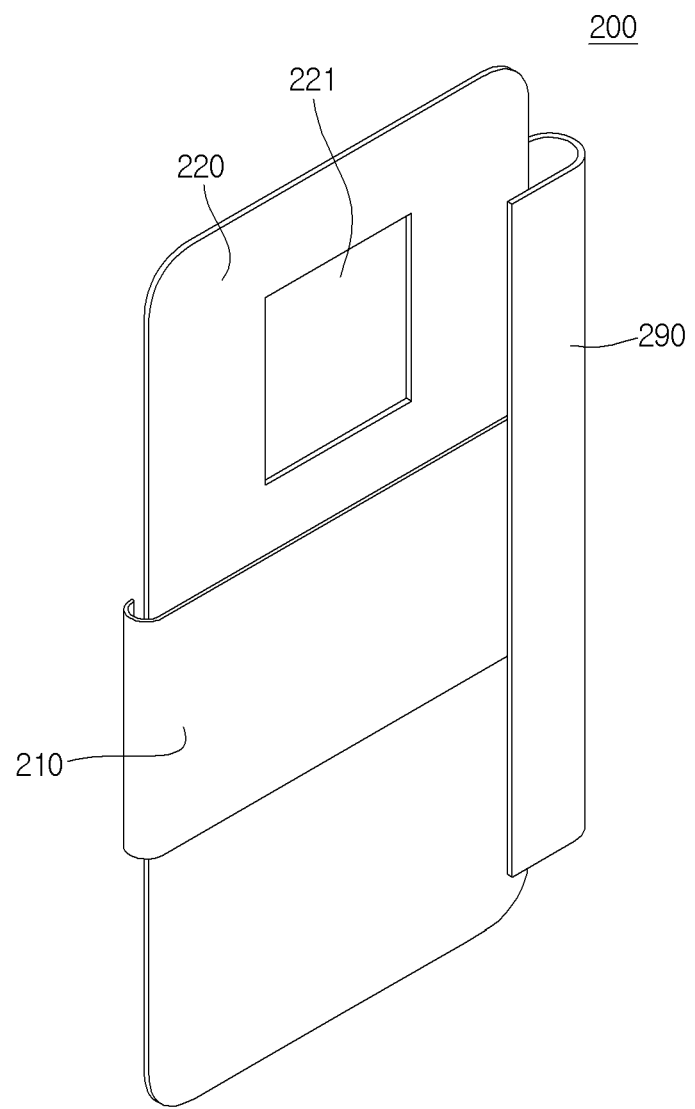
FIG. 49 is a view illustrating a terminal case according to another embodiment of the present invention.
Figure 50:
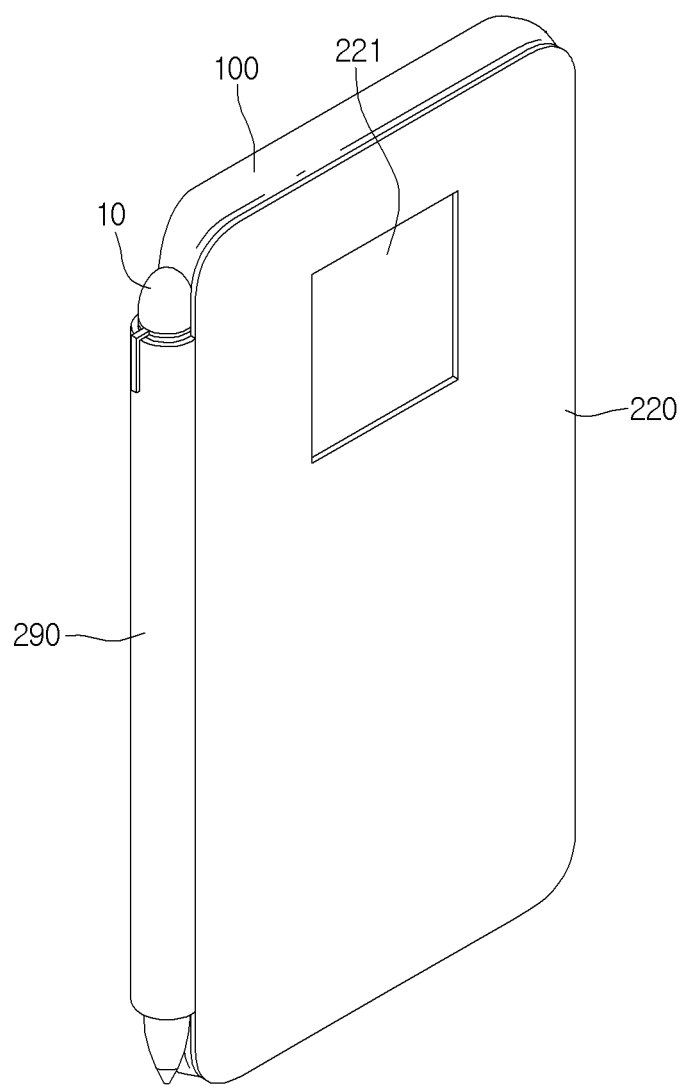
FIG. 50 is a perspective view when a stylus pen and a mobile terminal are coupled with a mobile terminal case of FIG. 49.

Moreover, the terminal coupling part 210 in the terminal case 200 may have forms as shown in FIGS. 48 to 50.

Referring to FIG. 48, the terminal case 200 includes a terminal coupling part 210 allowing the mobile terminal 100 to be detachable and a front cover part 220 foldably coupled with the terminal coupling part 210 to cover the front of the mobile terminal 100. Additionally, the terminal case 200 further comprises a connection part 290 connecting the terminal coupling part 210 and the front cover part 220.

The terminal coupling part 210 may have a band-shaped member extending in a horizontal direction. The terminal coupling part 210 has a form in which a central part extends flat and bends toward the front around the left and right end parts and protrudes. The terminal coupling part 210 may be formed of an elastically deformable material, for example, metal. The distance between the left and right end parts of the terminal coupling part 210 is formed to be narrower than the horizontal width of the mobile terminal 100. Accordingly, when the mobile terminal 100 is coupled, the left and right end parts are elastically deformed and opened. After the mobile terminal is coupled, the left and right end parts of the mobile terminal 100 are pressed inwardly by elastic restoring force. Therefore, a coupling state between the mobile terminal 100 and the terminal coupling part 210 may be maintained.

Since a configuration and function of the front cover part 220 including the front incision part 221 and the connection part 290 are identical to those in the embodiment of FIG. 1, their overlapping descriptions are omitted.

FIG. 49 is a perspective view illustrating the terminal case 200 according to another embodiment of the present invention. FIG. 50 is a perspective view when a stylus pen 10 and a mobile terminal 100 are coupled with the mobile terminal case 200 of FIG. 49.

Referring to FIGS. 49 and 50, the terminal case 200 includes a terminal coupling part 210 allowing the mobile terminal 100 to be detachable and a front cover part 220 foldably coupled with the terminal coupling part 210 to cover the front of the mobile terminal 100. Additionally, the terminal case 200 further comprises a connection part 290 connecting the terminal coupling part 210 and the front cover part 220.

As shown in FIGS. 49 and 50, since a configuration and function of the terminal coupling part 210 and the front cover part 220 are identical to those in the embodiment of FIG. 48, their overlapping descriptions are omitted. Only the connection part 290 that is different from FIG. 48 is described.

Referring to FIG. 49, the connection part 290 connects the terminal coupling part 210 and the front cover part 220. Accordingly, one end of the connection part 290 is couple with the terminal coupling part 210 and the other end is coupled with the front cover part 220. The connection part 290 is formed of a flexible material. The forward-backward direction of the connection part 290 is formed to be longer than the forward-backward direction width of the coupled mobile terminal 100. Accordingly, when the front cover part 220 covers the front of the mobile terminal 100, the connection part 290 may bend to have a semicircular or elliptical cross-section. Then, the bent inner space forms a stylus pen receiving part. Referring to FIG. 50, the stylus pen 10 is coupled with the inner space formed by bending the connection part 290.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal assembly comprising:
    a terminal case; and
    a mobile terminal detachably coupled to the terminal case, wherein the terminal case comprises:
    a terminal coupling part covering rear surface of the mobile terminal; and
    a front covering part covering a front surface of the mobile terminal and including a front incision part,
    wherein the mobile terminal comprises:
    a camera module for capturing images;
    a display unit for displaying images transmitted from the camera module, wherein the front covering part is configured to selectively cover the display unit, wherein the display unit is configured to display a first user interface displaying information which is recognizable through the front incision part when the front covering part is oriented in a closed position, and wherein the display unit is further configured to display a second user interface displaying information which is recognizable through an entire area of the display unit when the covering part is oriented in an opened position;
    a memory storing a camera application configured to control the camera module;
    and
    a control unit configured to control the display unit and the camera application,
    wherein the display unit includes:
    a first display area corresponding to the front incision part when the front covering part is oriented in the closed position; and
    a second display area corresponding to the entire area thereof,
    wherein, when the front covering part is oriented in the closed position, the camera application is configured to executed through the first user interface, such that an image captured by the camera module is displayed only through the first display area.

2. The mobile terminal assembly of claim 1, wherein, when the camera application is executed when the front covering part is oriented in the closed position, and wherein a capture mode interface is displayed through the front incision part.

3. The mobile terminal assembly of claim 2, wherein the capturing of the image by the camera module is initiated by a touch input to the capture mode interface.

4. The mobile terminal assembly of claim 3, wherein the front incision part is defined as an opening portion which is formed by cutting a portion of the front covering part, and wherein the capture mode interface is displayed on the display area corresponding to the front incision part.

5. The mobile terminal assembly of claim 2, wherein, when the front covering part is moved to the opened position, the capture mode interface is configured to be displayed in the entire area of the display unit.

6. The mobile terminal assembly of claim 1, wherein an image display and a touch input are restricted through an area other than an area corresponding to the first user interface when the first user interface is displayed.

7. The mobile terminal assembly of claim 6, wherein pixels in an area other than the first display area are turned off when the first user interface is displayed.

8. The mobile terminal assembly of claim 1 further comprising;
    a front cover sensing unit sensing whether the front covering part is opened or closed and controlling whether the first user interface or the second user interface is displayed.

9. The mobile terminal assembly of claim 1, wherein a change of size or position of the first display area varies based on a change of size or position of the front incision part.

10. The mobile terminal assembly of claim 9, wherein the change of size or position of the first display area is initiated by receiving a touch input signal for a movement or a size change of the graphics defining the first display area.

11. A mobile terminal comprising:
    a camera;
    a display unit; and
    a memory storing a camera application configured to control the camera; and
    a control unit configured to control the display unit and the camera application,
    wherein the mobile terminal is configured to detachably couple with a terminal case comprising a front covering part covering and a front incision part,
    wherein the front covering part is configured to selectively cover the display unit,
    wherein the display unit is configured to display a first user interface viewable through the front incision part when the front covering part is in a closed position, and further configured to display a second user interface viewable through an entire area of the display unit when the front covering part is in an opened position, the display unit including a first display area corresponding to the front incision part when the front covering part is in the closed position and a second display area corresponding to the entire area thereof, and
    wherein, the camera application is executable through the first user interface when the front covering part is in the closed position, such that an image captured by the camera is displayed through the first display area.

12. The mobile terminal of claim 11, wherein the camera application is executable when a capture mode interface is displayed through the front incision part.

13. The mobile terminal of claim 12, wherein the capturing of the image by the camera is initiated by a touch input to the capture mode interface.

14. The mobile terminal of claim 12, wherein the capture mode interface is displayed over the entire area of the display unit when the front covering part is in the opened position.

15. The mobile terminal of claim 11 further comprising:
a front cover sensing unit configured to sense whether the front covering part is in the opened position or the closed position, and generating a signal that controls whether the first user interface or the second user interface is displayed.

* * * * *